United States Patent [19]

Gregoli et al.

[11] Patent Number: 4,983,319

[45] Date of Patent: * Jan. 8, 1991

[54] PREPARATION OF LOW-VISCOSITY IMPROVED STABLE CRUDE OIL TRANSPORT EMULSIONS

[75] Inventors: Armand A. Gregoli, Tulsa, Okla.; Andrew M. Olah, Spencer, Ohio; John A. Hamshar, Owasso; Daniel P. Rimmer, Broken Arrow, both of Okla.

[73] Assignee: Canadian Occidental Petroleum Ltd., Calgary, Canada

[*] Notice: The portion of the term of this patent subsequent to Feb. 16, 2005 has been disclaimed.

[21] Appl. No.: 218,902

[22] Filed: Jul. 14, 1988

Related U.S. Application Data

[63] Continuation-in-part of Ser. No. 114,204, Oct. 27, 1987, which is a continuation-in-part of Ser. No. 934,683, Nov. 24, 1986, Pat. No. 4,725,287.

[51] Int. Cl.$^5$ .......................... B01J 13/00; C10L 1/32; F17D 1/16
[52] U.S. Cl. ..................................... 252/314; 44/301; 137/13; 252/8.554; 252/311.5; 252/312; 431/2
[58] Field of Search .................. 252/311.5, 311.5, 312, 252/314; 44/51; 137/4, 13; 431/2

[56] References Cited

U.S. PATENT DOCUMENTS

| | | | |
|---|---|---|---|
| 1,733,496 | 10/1929 | Kirschbraun | 252/314 |
| 3,380,531 | 4/1968 | McAuliffe et al. | 166/45 |
| 3,410,794 | 11/1968 | Li | 208/308 |
| 3,425,429 | 2/1969 | Kane | 137/13 |
| 3,467,195 | 9/1969 | McAuliffe et al. | 166/314 |
| 3,491,835 | 1/1970 | Gagle | 166/305 |
| 3,572,354 | 3/1971 | Tinsley et al. | 137/13 |
| 3,785,620 | 1/1974 | Huber | 366/174 |
| 3,923,288 | 12/1975 | King | 239/432 X |
| 3,943,954 | 3/1976 | Flournoy et al. | 137/13 |
| 4,099,537 | 6/1978 | Kalfoglou et al. | 137/13 |
| 4,108,193 | 8/1978 | Flournoy et al. | 137/13 |
| 4,152,290 | 5/1979 | Flournoy et al. | 252/355 |
| 4,239,052 | 12/1980 | McClaflin | 137/13 |

(List continued on next page.)

FOREIGN PATENT DOCUMENTS

| | | |
|---|---|---|
| 556683 | 4/1958 | Canada . |
| 723145 | 12/1965 | Canada . |
| 756646 | 4/1967 | Canada . |
| 818423 | 7/1969 | Canada . |
| 853575 | 10/1970 | Canada . |
| 868251 | 4/1971 | Canada . |
| 879750 | 8/1971 | Canada . |
| 1023288 | 12/1977 | Canada . |
| 1103205 | 9/1981 | Canada . |
| 1113529 | 12/1981 | Canada . |
| 1117568 | 2/1982 | Canada . |
| 1127845 | 7/1982 | Canada . |
| 1135150 | 11/1982 | Canada . |
| 1135644 | 11/1982 | Canada . |
| 1149302 | 7/1983 | Canada . |
| 1157267 | 11/1983 | Canada . |

(List continued on next page.)

OTHER PUBLICATIONS

Down–Hole Emulsification for Improving Viscous Crude Production by Simon et al., 1968, Journal of Petroleum Technology.

Down–Hole Water Injection Helps Pump Viscous Crude by Franco, 1966, Oil & Gas Journal.

The Flow Mechanism of Dilute, Stable Emulsions in (List continued on next page.)

Primary Examiner—Richard D. Lovering
Attorney, Agent, or Firm—John Wade Carpenter

[57] ABSTRACT

A process for the preparation of low-viscosity improved stable crude oil transport emulsions. The process comprises producing a hydrocarbon crude, and mixing the produced hydrocarbon crude with an emulsifying composition(s) which contains water and is capable of assisting the formation of an oil-in-water emulsion. The amount of the emulsifying composition(s) that is mixed with the produced hydrocarbon crude is sufficient to form an oil-in-water emulsion having water content of from about 10 percent to about 60 percent by weight water and a viscosity sufficiently low for allowing the transport of the formulated oil-in-water emulsion.

29 Claims, 5 Drawing Sheets

U.S. PATENT DOCUMENTS

| | | | |
|---|---|---|---|
| 4,246,919 | 1/1981 | McClaflin | 137/13 |
| 4,249,554 | 2/1981 | McClaflin | 137/13 |
| 4,251,229 | 2/1981 | Naka et al. | 44/51 |
| 4,265,264 | 5/1981 | Sifferman | 137/13 |
| 4,285,356 | 8/1981 | Sifferman | 137/13 |
| 4,287,902 | 9/1981 | McClaflin et al. | 137/13 |
| 4,333,488 | 6/1982 | McClaflin | 137/13 |
| 4,406,499 | 9/1983 | Yildirim | 299/17 |
| 4,614,236 | 9/1986 | Watkins et al. | 166/304 |
| 4,618,348 | 10/1986 | Hayes et al. | 44/51 |
| 4,627,458 | 12/1986 | Prasad | 137/13 |
| 4,646,771 | 3/1987 | Prasad et al. | 137/13 |
| 4,666,457 | 5/1987 | Hayes et al. | 44/51 |
| 4,684,372 | 8/1985 | Hayes et al. | 44/51 |
| 4,725,287 | 2/1988 | Gregoli et al. | 44/51 |
| 4,736,795 | 4/1988 | Karas | 166/274 |

FOREIGN PATENT DOCUMENTS

| | | |
|---|---|---|
| 1192743 | 9/1985 | Canada . |
| 1200697 | 2/1986 | Canada . |
| 0256979 | 2/1988 | European Pat. Off. . |
| 0261793 | 3/1988 | European Pat. Off. . |
| 0261794 | 3/1988 | European Pat. Off. . |
| 1147939 | 4/1969 | United Kingdom . |

OTHER PUBLICATIONS

Porous Media by Soo et al., 1984, Ind. Eng. Chem. Fundam.

Use of Emulsions for Mobility Control During Steamflooding by French et al., 1986, Society of Petroleum Engineers.

Crude-Oil-In-Water Emulsions to Improve Fluid Flow in an Oil Reservoir by McAuliffe, 1973, Journal of Petroleum Technology.

The Contribution of Chemistry to New Marangoni Mass-Transfer Instabilities at the Oil/Water Interface by Nakache, 1983, Faraday Discuss Chem. Soc.

Separation of Metal Ions by Ligand-Accelerated Transfer through Liquid Surfactant Membranes by Wasan et al., 1984, Faraday Discuss Chem. Soc.

Transfer of Alkali-Metal and Hydrogen Ions Across Liquid/Liquid Interfaces Mediated by Monensin, by Koryta et al., 1984, Faraday Discuss Chem. Soc.

Chemical Kinetics and Mechanisms in Solvent Extraction of Copper Chelates by Flett, 1977, Solvent Extraction.

Theory of Oil Detachment from a Solid Surface, In Situ Emulsification and Enhanced Production of Heavy Oils by a Novel Chemical Huff-and-Puff Method by Ostrovsky, 1987, Colloids and Surfaces.

The Use of Oil/Water Emulsions as a Blocking and Diverting Agent by Faroug Ali et al., 1987, Advances in Petr. Recovery and Upgrading Technology.

Heavy and Extra-Heavy Crude Oil-In-Water Emulsions for Transportation: Their Formulation, Formation and Characterization, by Rivas et al., UNITAR/UNDP Information Centre for Heavy Crude and Tar Sands.

Viscous Crude Oil Transportation: The Presentation of Bitumen, Heavy and Extra-Heavy Crude Oil-In-Water Emulsions by Stockwell et al., UNITAR/UNDP Information Centre for Heavy Crude and Tar Sands.

Transportation of Viscous Crude Oil-in-Water Emulsions Through Pipes by Layrisse et al., UNITAK-/UNDP Information Centre for Heavy Crude and Tar Sands.

Chemicals by GAF®, pp. 11 through 15, 1985.

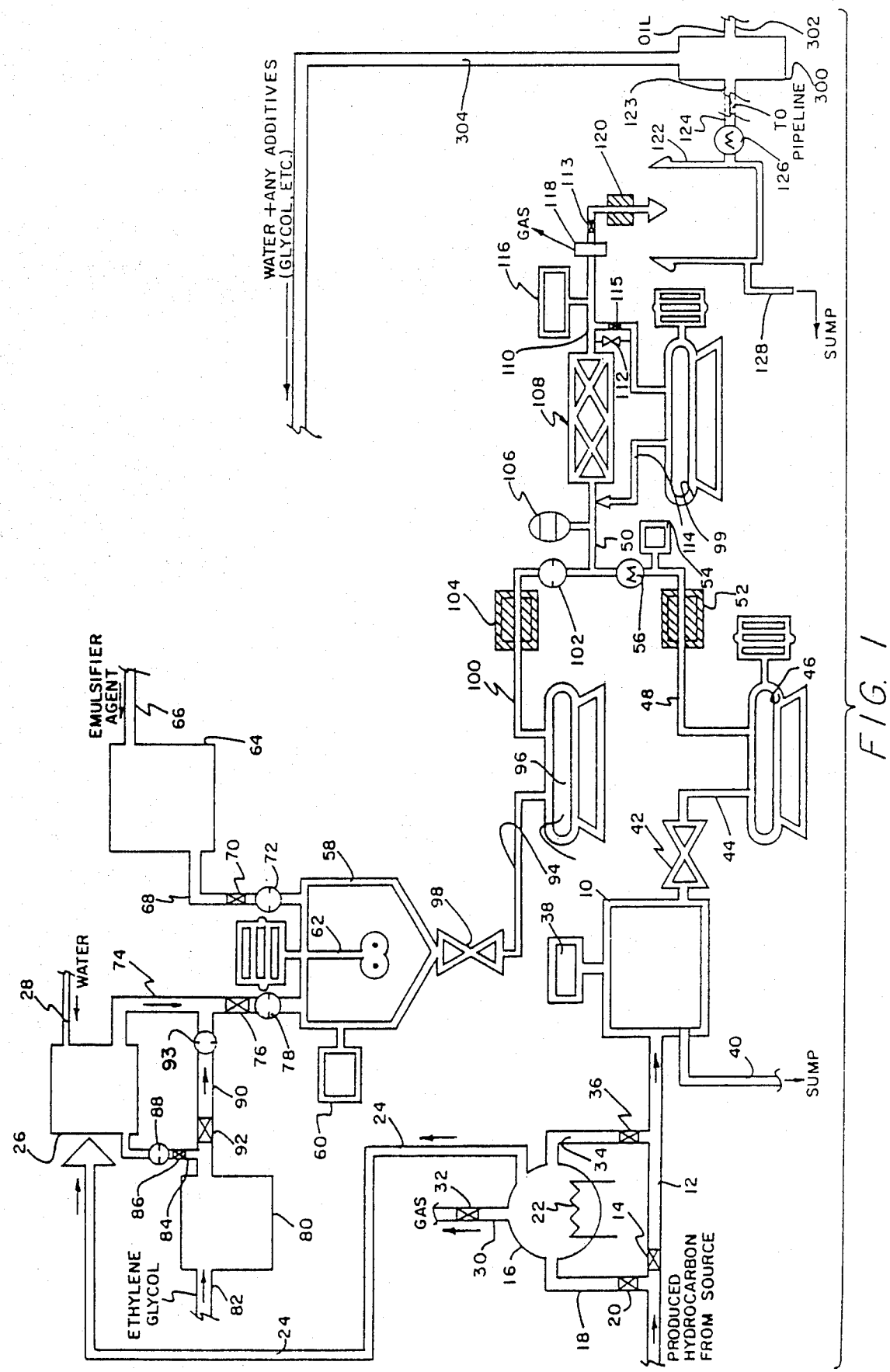

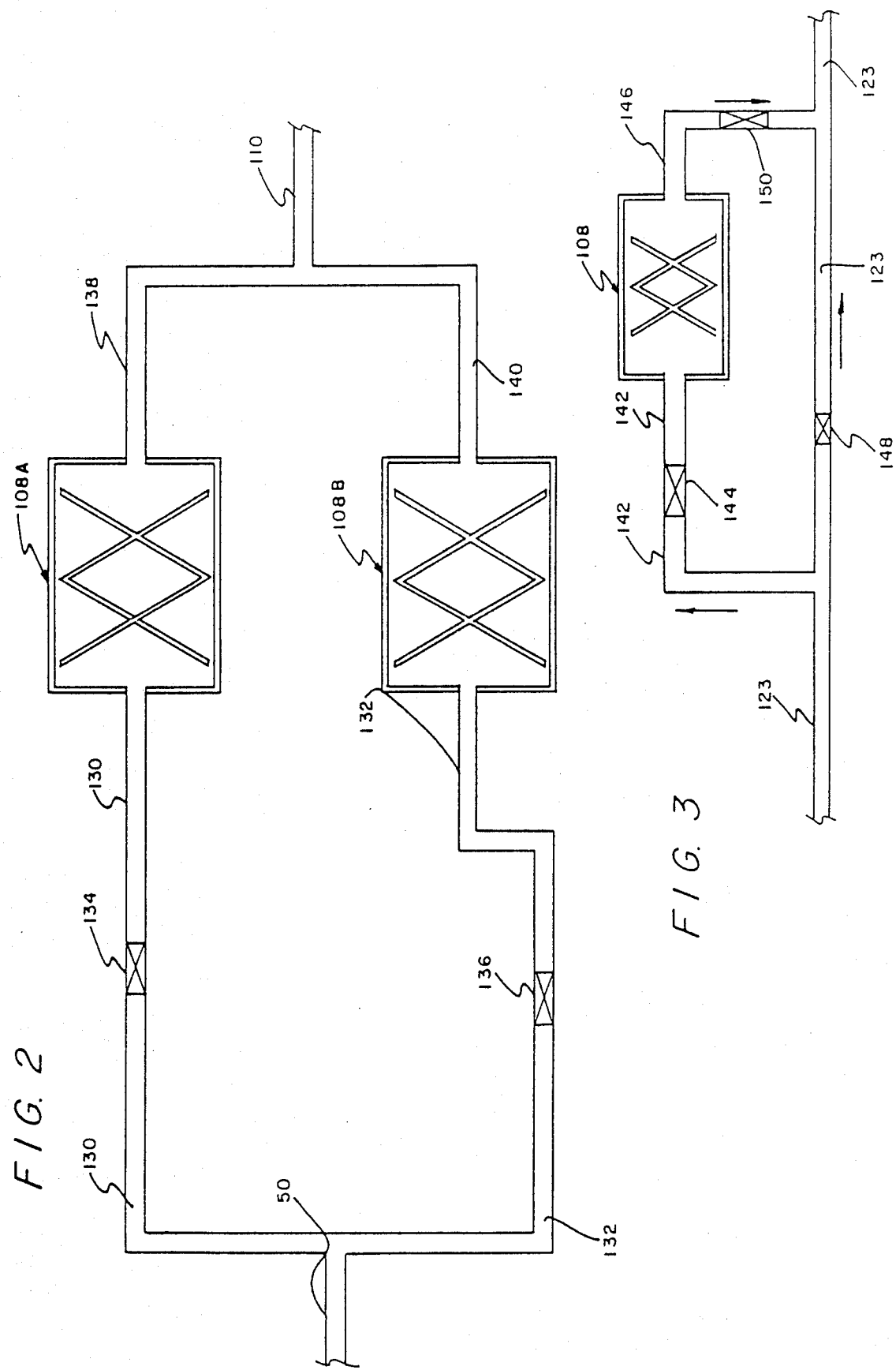

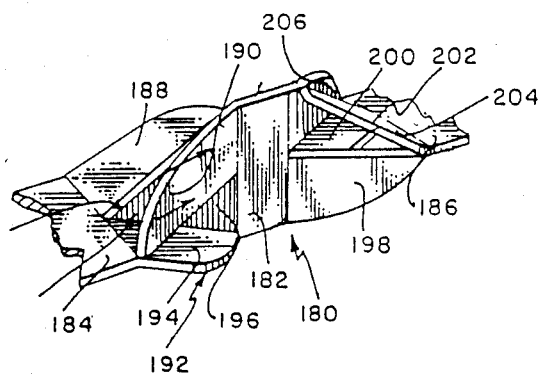
FIG. 12
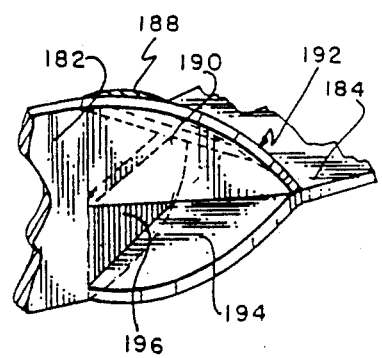
FIG. 13
FIG. 14
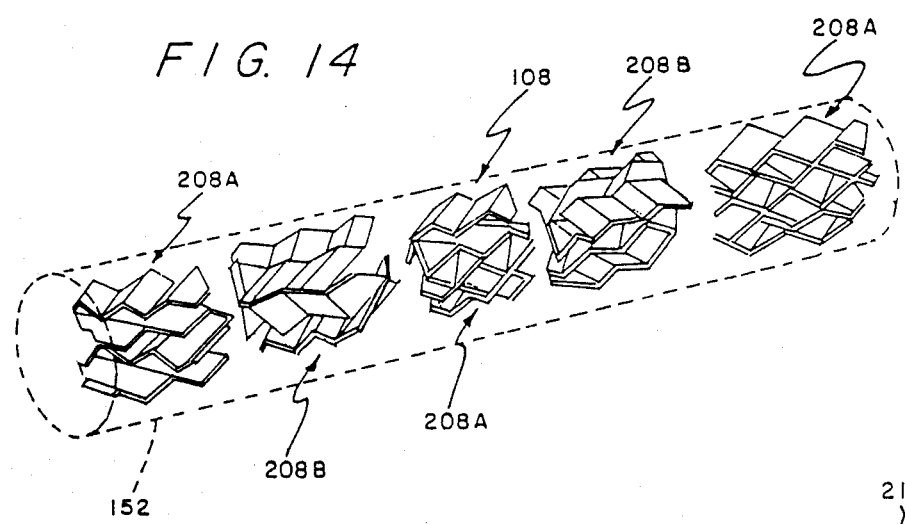
FIG. 15
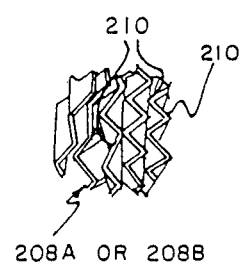

PREPARATION OF LOW-VISCOSITY IMPROVED STABLE CRUDE OIL TRANSPORT EMULSIONS

This is a continuation-in-part application of copending entitled "Preparation of Improved Stable Crude Oil Transport Emulsions" and having Ser. No. 114,204, filed Oct. 27, 1987. The copending application having Ser. No. 114,204, filed Oct. 27, 1987, is a continuation-in-part application of application Ser. No. 934,683, filed Nov. 24, 1986, now U.S. Pat. No. 4,725,287.

FIELD OF THE INVENTION

This invention is related to the production of oil-in-water emulsion(s). More specifically, this invention provides a process for the production of oil-in-water emulsion(s), especially for pipeline transmission.

BACKGROUND OF THE INVENTION

The formulation of pipeline-transportable crude oil-in-water emulsion can not generally be formulated by combining emulsifying agent(s) directly with produced hydrocarbon crude, and subsequently agitating with a dynamic mixer the mixture of produced hydrocarbon crude and emulsifying agent(s). The emulsifying agent(s) is not soluble in oil and is only soluble in an aqueous solution. By contacting directly the produced hydrocarbon crude with the emulsifying agent(s) without premixing the emulsifying agent(s) with water, brine, or the like, diffusion of the emulsifying agent(s) through the produced hydrocarbon crude to the oil/water interface is slow; and with some produced hydrocarbon crudes, such as Athabasca bitumen from the Athabasca tar sands in the province of Alberta, Canada, oil-in-water emulsion(s) can not be formulated. Also, through the use of a dynamic mixer, such as the rotor-stator mixer, not every produced hydrocarbon crude can be emulsified into a water continuous emulsion, even with premixing the emulsifying agent(s) with water prior to combining with produced hydrocarbon crude. A high shear field cannot be obtained with a dynamic mixer unless the mixture of produced hydrocarbon crude and emulsifying agent(s) (including any water solvent) makes numerous passes through the dynamic mixer. Transport oil-in-water emulsion(s) is shear-sensitive, and a dynamic mixer tends to cause either an overshear-damaged product or less than a perfectly mixed product, depending on the mixing severity employed with the dynamic mixer.

Large storage tanks and/or mixing tanks are generally required when utilizing dynamic mixers. If a dynamic mixer is separate from the storage tank, mixtures to be emulsified have to be recirculated from the storage tank, through the mixer, and back into the storage tank. The degree of mixing achieved by dynamic mixers depends on the mixing speed, impeller design, impeller position, length of mixing time, tank volume, tank geometry, etc. Dynamic mixers are prone to producing a large quantity of oil droplets having a diameter of less than 10 micron, which is detrimental to the transport of oil-in-water emulsion(s) as such small oil droplet increase the viscosity of the oil-in-water emulsion(s), and can cause the oil-in-water emulsion(s) to invert from a water continuous emulsion into an oil continuous emulsion, with an attendant increase in viscosity. Dynamic mixers are also susceptible to high maintenance expense because of their use of high-speed rotating devices.

What is needed and what has been invented by us is a process for the preparation of stable water-continuous crude oil, or other hydrocarbon, transport emulsions, and which can generally form an emulsion having a water-continuous phase of any produced hydrocarbon crude, especially Athabasca bitumen (e.g. Syncrude bitumen) from the Athabasca tar sands in the province of Alberta, Canada.

SUMMARY OF THE INVENTION

It is therefore an object of this invention to provide a process for the preparation of a stable oil-in-water emulsion(s).

It is another object of this invention to provide a process for the preparation of a stable oil-in-water emulsion(s) with the use of a static mixer.

It is yet another object of this invention to provide a process for the preparation of a stable oil-in-water emulsion(s) that is pipeline-transportable.

Still other objects will be apparent to those skilled in the art from the following description of this invention.

The foregoing objects are achieved according to the practice of this invention. Broadly, this invention comprises a process for the production of an oil-in-water emulsion that are particularly useful for pipeline transmission. The process comprises mixing a hydrocarbon with an emulsifying composition(s) which comprises water and an emulsifying agent(s) to produce an oil-in-water emulsion when the temperature of the mixture of hydrocarbon and emulsifying composition(s) is from about 100° F. to about 200° F. The amount of the emulsifying composition(s) that is mixed with the hydrocarbon is sufficient to form an oil-in-water emulsion having a selected water content of from about 10 percent to about 60 percent by weight water and a viscosity sufficiently low for pipeline transmission. The process additionally comprises shearing and mixing statically the mixture of hydrocarbon and emulsifying composition(s) when the mixture is at a temperature of from about 100° F. to about 200° F. to form an oil-in-water emulsion.

The hydrocarbon may be any hydrocarbon or hydrocarbon crude, or any fractionated or extracted part(s) thereof, that has a gravity of from about −6 degree API to about 23 degree API, preferably from about 5 degree API to about 15 degree API, and with which it is desired to formulate an oil-in-water emulsion(s) for any use, especially in order to facilitate the transmission or transportation of the hydrocarbon or hydrocarbon crude, or any fractionated or extracted part(s) thereof, through a pipeline, or the like. The hydrocarbon may be any of those hydrocarbons that have been typically termed atmospheric bottoms, vacuum bottoms, vacuum residuals, deasphalter bottoms, etc. Thus, whenever "hydrocarbon" and/or "hydrocarbon crude" is referred to herein, "hydrocarbon" and/or "hydrocarbon crude" is to be construed to mean any hydrocarbon or hydrocarbon crude, or any fractionated or extracted part(s) thereof, which is capable of forming with the emulsifying composition(s) of this invention, a stable oil-in-water emulsion. The formed oil-in-water emulsion may be employed for any suitable use including, but not limited to, burning in a boiler (or burner), transporting through a pipeline, etc.

The emulsifying composition(s) of this invention comprises an emulsifying agent selected from the compounds having the general formula:

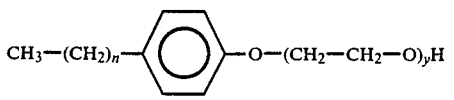

$$CH_3-(CH_2)_n-\langle O \rangle-O-(CH_2-CH_2-O)_yH \quad (1)$$

where n is from about 7 to about 20 and y is from about 4 to about 1000; or

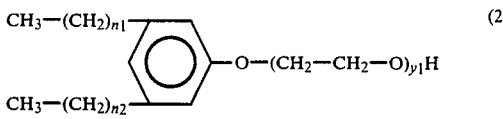

$$\begin{array}{c} CH_3-(CH_2)_{n1} \\ CH_3-(CH_2)_{n2} \end{array} \langle O \rangle -O-(CH_2-CH_2-O)_{y1}H \quad (2)$$

where $n_1$ is from about 7 to about 18, $n_2$ is from about 7 to about 18, and $y_1$ is from about 4 to about 1000. In compound(s) (1) and/or compound(s) (2), each of y and $y_1$ is an integer that represents the average number of ethylene oxide units or segments in the emulsifying agent(s) which is the mean of a normal Gaussian distribution curve. The hexagon with a circle in the center in compound(s) (1) and/or compound(s) (2), and throughout this specification and in the claims, represents a benzene ring.

A mixture of compound(s) (1) and compound(s) (2) may be employed. Depending on the particular emulsifying agent(s), the concentration of the emulsifying agent(s) employed may range from about 25 to about 15,000 ppm by weight of the hydrocarbon. The amount of the emulsifying agent(s) employed is preferably just sufficient to stabilize an oil-in-water emulsion or an oil-in-aqueous phase emulsion at a 10% by wt. to about 60% by wt. water-content or aqueous phase content.

The formulated oil-in-water emulsion(s) of this invention can be transported through a pipeline. If a proportion of the disperse oil droplet phase in the oil-in-water emulsion(s) at least partially coalesces in the water continuous phase to produce a mixture comprising the coalesced oil droplet phase and residual oil-in-water emulsion, the mixture may be further transported through the same pipeline, even without removing the mixture for treatment or reformulation of the original oil-in-water emulsion(s). It has been discovered that the mixture has a viscosity less than or equal to the viscosity of the originally formulated oil-in-water emulsion in spite of the fact that the at least partially coalesced oil droplet phase has a viscosity larger than the viscosity of the originally formulated oil-in-water emulsion(s). It has also been discovered that a substantial proportion of the originally formulated oil-in-water emulsion does not invert into a water-in-oil emulsion when the oil droplets within the originally formulated oil-in-water emulsion coalesce to produce a water continuous mixture comprising the coalesced oil droplets, and residual oil-in-water emulsion which is the remaining oil-in-water emulsion from the originally formulated oil-in-water emulsion and contains oil droplets that have not coalesced.

BRIEF DESCRIPTION OF THE DRAWINGS

FIG. 1 is a schematic flow diagram of an embodiment of the process for the preparation of stable oil-in-water emulsion(s);

FIG. 2 is a schematic flow diagram illustrating a pair of static mixing devices in parallel;

FIG. 3 is a schematic flow diagram disclosing a pump and a static mixing device for producing or reproducing a multimodal oil-in-water emulsion(s);

FIG. 12 is a partial perspective view of the baffle element for the static mixing device of FIG. 8 with the direction of the arrows representing cross-current mixing action for the mixture of produced hydrocarbon crude and emulsifying composition(s);

FIG. 13 is a partial perspective view of another embodiment of an end of the baffle element for the static mixing device of FIG. 8;

FIG. 14 is a partially cut-away perspective view of yet another embodiment of the static mixing device for the present invention; and FIG. 15 is a top plan view of one of the baffle elements for the static mixing device of FIG. 13.

DETAILED DESCRIPTION OF THE INVENTION

Figure 4:
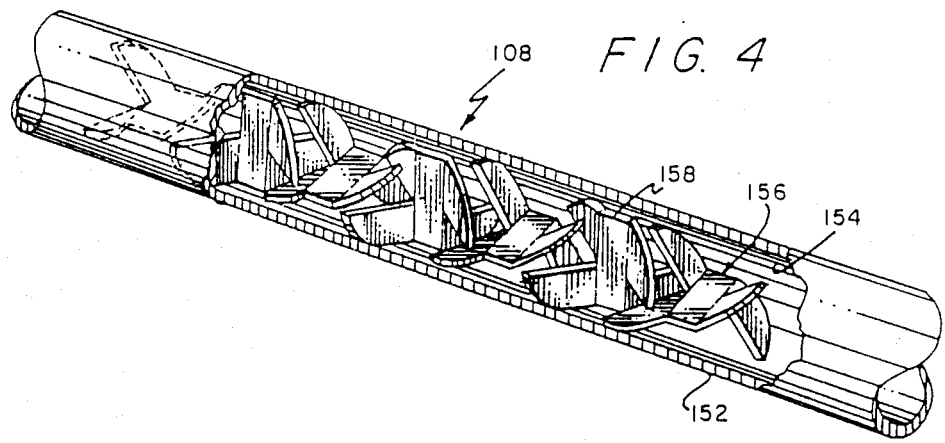
FIG. 4 is a partially cut-away perspective view of one embodiment of the static mixing device for the present invention.

Referring in detail now to the drawings, and initially more particularly to FIG. 1, a stream of hydrocarbon crude is produced from a source and is transported into a crude oil tank 10 through a conduit 12. A valve 14 within the conduit 12 controls the flow of the crude through the same. The hydrocarbon crude may be any hydrocarbon and/or hydrocarbon crude, or any fractionated or extracted part(s) thereof, that preferably has a gravity of from about −6 degree API to about 23 degree API.

The source of the produced hydrocarbon crude may be any source wherefrom a hydrocarbon crude may be obtained, produced, or the like. The source may be one or more producing wells in fluid communication with a subterranean oil reservoir. The producing well(s) may be under thermal recovery conditions, or the producing well(s) may be in a heavy oil field where the hydrocarbon crude or oil is being produced from a reservoir having a strong water-drive. Generally, hydrocarbon crude produced from producing well(s) under a strong water-drive include high water-cuts, and appropriate artificial lift systems (e.g. submersible electrical pumps) are employed to assist the flow of the hydrocarbon crude because of its high water content. As will be discussed in greater detail hereinafter, this invention is particularly suitable for when the source of the produced hydrocarbon crude is from the Athabasca tar sands in the province of Alberta, Canada. Hydrocarbon crude from this source has generally been termed "Athabasca bitumen". No matter what the source is for the stream of produced hydrocarbon crude, the crude may essentially contain no water, or it may include water in various forms. The produced crude may also include some associated gas. For the purposes of the present invention, it will be assumed that the stream of produced hydrocarbon crude has a low gas/oil ratio (i.e. less than about 10% by wt. of $C_1$–$C_5$).

Any water present in the stream of produced hydrocarbon crude can be classified into two categories: "bound" water and "free" water. "Bound" water is that water which is locked up as water-in-oil emulsion(s) that may be contained in the produced hydrocarbon crude. Separating "bound" water from the produced hydrocarbon crude typically requires applying the appropriate combination of heat, mixing and chemical additive(s). "Free" water is that water which is relatively loosely held up by the produced hydrocarbon crude and can be removed by merely heating the produced hydrocarbon crude to an appropriate temperature or providing sufficient residence time in tankage. The quantity of "free" water which can be removed will depend upon the temperature to which the stream of produced hydrocarbon crude is heated.

In the event that the stream of produced hydrocarbon crude contains a substantial amount of water-in-oil emulsion(s) and/or "free" water and/or associated gas, the crude may be fed into a "free" water knock-out unit (FWKO) 16 through a conduit 18 that includes a valve 20 to regulate and control the flow of the crude. To accomplish this change in direction of flow of the produced hydrocarbon crude, valve 20 in conduit 18 is opened, and valve 14 in conduit 12 is closed. The FWKO 16 is an optional of equipment and is not mandatory with respect to this invention, especially when Athabasca bitumen is being processed to formulate an oil-in-water emulsion for pipeline transportation. Athabasca bitumen contains essentially no associated gases and no water in any form, such as "free" water and/or water-in-oil emulsion(s) wherein the contained water is "bound" water.

To accomplish the purposes of this invention, the stream of produced hydrocarbon crude may by-pass the FWKO 16, even if the produced crude contains water-in-oil emulsion(s) and/or "free" water and/or associated gas. The stream of produced hydrocarbon crude can contain an oil/water mixture in any proportion. Pipeline-transportable oil-in-water emulsion(s) may be formulated in accordance with the principles of this invention by directly converting, changing or altering, or the like, a substantial part of a stream of produced hydrocarbon crude of water-in-oil emulsion(s), with or without "free" water and with or without associated gases, into pipeline-transportable oil-in-water emulsion(s). However, to facilitate the formulation of such pipeline-transportable oil-in-water emulsion(s), there may be occasions where it is desirable to use the FWKO 16, such as when the produced hydrocarbon crude contains extremely high cuts of "free" water and/or associated gases.

The FWKO 16 may be operated under pressure and has a heating unit 22 in it which allows the stream of produced hydrocarbon crude to be heated to any preset temperature within the unit design constraints in order to assist in removal of "free" water and/or associated gas. In some instances the stream of produced hydrocarbon crude enters the FWKO 16 at a high enough temperature so that the heating unit 22 does not have to be energized. In the FWKO 16, depending on the temperature, a portion or substantially all of the "free" water will be removed from the stream of produced hydrocarbon crude, and can be drained and/or transmitted from the FWKO 16 through a conduit 24 to a water tank 26, which is also in communication with a source of water, brine, or aqueous phase, or the like, through a conduit 28. This water, brine, or the like, provides the aqueous phase with which the emulsifying agent(s) of this invention can be mixed to produce the emulsifying composition(s) of this invention. Any associated gases coproduced with the produced hydrocarbon crude generally should separate from the stream of produced hydrocarbon crude in the FWKO 16 and vent through a conduit 30 which includes a valve 32. The separated associated gases may be transmitted for further use, or otherwise disposed.

The effluent from the FWKO 16 may be essentially a mixture of water-in-oil emulsion(s) and residual "free" water, if any. The effluent exits the FWKO 16 through a conduit 34 which is in communication with the conduit 12, as illustrated in FIG. 1. Conduit 34 contains a valve 36 which controls and regulates the flow of the effluent from the FWKO 16 through conduit 34 and into conduit 12 where it is transported into the crude oil tank 10. It should be re-emphasized that the stream of produced hydrocarbon crude may be essentially void of any of the various forms of water and/or gases, and may not and does not have to include any water-in-oil emulsion(s) and/or "free" water and/or associated gas for the features of this invention to produce or formulate a pipeline-transportable oil-in-water emulsion(s) by directly converting, changing, or altering the stream of produced hydrocarbon crude. The emulsifying composition(s) of this invention in combination with other features, will generally produce pipeline-transportable oil-in-water emulsion(s) regardless of any water-in-oil emulsion(s) and/or "free" water and/or associated gases contained within the stream of produced hydrocarbon crude.

Crude oil tank 10 has a temperature indicator 38 which monitors the temperature of the produced hydrocarbon crude. Crude oil tank 10 also includes a drain 40 which can drain off to a sump (not shown in the drawings) extra water (if desired) which settles to the bottom of the crude oil tank 10. When pipeline-transportable oil-in-water emulsion is to be formed in accordance with the principles of this invention, a valve 42 in a conduit 44 which is in communication with the crude oil tank 10, is opened and a crude oil pump 46 may be energized to transport produced hydrocarbon crude through a conduit 48 for eventual mixing, commingling, adding, or the like, with the emulsifying composition(s) at the entrance of a conduit 50. It should be understood that while the mixing or adding of the produced hydrocarbon crude with the emulsifying composition(s) is being represented as taking place at the entrance of conduit 50, other systems and/or means of mixing or adding together the produced hydrocarbon crude with the emulsifying composition(s) are within the spirit and scope of this invention. For example, if conduit 50 is a straight line extension of conduit 48 and integral therewith such that conduit 48 does not have a separate identity, the emulsifying composition(s) would be introduced into the conduit 48, either normal to or angular therewith. Likewise, a pump [preferably a rotating (e.g. centrifugal) pump] may be positioned in conduit 50 to further or additionally mix the produced hydrocarbon crude with the emulsifying composition(s).

As the produced hydrocarbon crude is being pumped by pump 46 through the conduit 48, it passes through a heat exchanger 52 to either heat or cool the crude to a temperature such that when the produced hydrocarbon crude is mixed with or added to the emulsifying composition(s), the temperature of the crude emulsifying composition(s) mixture is from about 100° F. to about 200° F. preferably from about 130° F. to about 170° F., as the pipeline-transportable oil-in-water emulsion(s) is to be formed at these temperatures. It is the temperature of the mixture of the produced hydrocarbon crude plus emulsifying composition(s) that should be at a temperature of from about 100° F. to about 200° F., and not the produced hydrocarbon crude alone. Certain produced hydrocarbon crudes, such as Athabasca bitumen from the Athabasca tar sands, may have a temperature well above 200° F. as it is being processed from the crude oil tank 10. In those instances, and depending on the temperature of the emulsifying composition(s), the heat exchanger 52 may function as a cooling unit to cool down the crude such that the crude-emulsifying composition(s) mixture would possess the required temperature (i.e. from about 100° F. to about 200° F. as previously indicated) to formulate the oil-in-water emulsion(s). Obviously, whether the heat exchanger 52 cools or heats the produced hydrocarbon crude would depend on the temperature of the emulsifying composition(s).

Temperature indicator 54 monitors the temperature of the stream of produced hydrocarbon crude as it exits heat exchanger 52 and flows through conduit 48. The rate of flow through conduit 48 is monitored either by a meter 56 and/or the pumping speed of pump 46. Meter 56 may also include a cut monitor and a sampler to monitor the composition of the stream of hydrocarbon crude with respect to "free" water content, water-in-oil emulsion(s), and associated gases.

The emulsifying composition(s) is formed or produced in the emulsifying composition tank 58 (hereinafter referred to only as "tank 58") which comprises a temperature indicator 60 to monitor the temperature of the emulsifying composition(s) and a mixer means 62 to homogenize and maintain homogenized the emulsifying composition(s). The emulsifying composition(s) of this invention comprises at least one emulsifying agent(s); water, brine, or the like, which hereinafter will be referred to only as "water"; and, optionally, a compound that lowers the freezing point of water, preferably ethylene glycol, in order to lower the freezing point of the emulsifying composition(s) and the eventually formed pipeline-transportable oil-in-water emulsion(s). Other compounds that may be employed to lower the freezing point of water include, but are not limited to, glycerol, propylene glycol, and various sugars, etc., and fall within the spirit and scope of this invention.

The emulsifying agent(s) of this invention is introduced into an emulsifying tank 64 through a conduit 66, and is dispensed into tank 58 through a conduit 68. Conduit 68 includes a valve 70 and a flow-meter 72 to regulate and meter, respectively, the flow of the emulsifying agent(s) through the conduit 68. The amount of emulsifying agent(s) used in the present invention may range from about 25 (or less) to about 10,000 (or more) ppm weight-to-weight of the produced hydrocarbon crude, preferably from about 300 to about 5,000 ppm by weight. Stated alternately, the emulsifying composition(s) preferably comprises from about 0.05 vol. % to about 4.0 vol. % of the emulsifying agent(s).

If the produced hydrocarbon crude bypasses the FWKO 16, the actual water-content of the produced hydrocarbon crude may vary widely. The produced hydrocarbon crude may contain up to about 95% by volume water, or it may be a relatively dry oil containing less than the amount of water required to form a low viscosity oil-in-water emulsion that is pipeline-pumpable. The object is to provide an oil-in-water emulsion containing from about 10% by weight to about 60% by weight water, preferably from about 25% by weight to about 35% by weight water. To accomplish this objective, water tank 26 is used to furnish water to tank 53. This water may be recovered from the as-received stream of produced hydrocarbon crude by separation in FWKO 16 (which is optional), or may be water externally derived from a source which is introduced into water tank 26 through conduit 28. The amount of emulsifying agent(s) added from emulsifer tank 64 is controlled so as to form a generally stable oil-in-water emulsion with an emulsifying agent(s) concentration suited for low-viscosity pipeline pumping. Any extra water will be loosely bound and should separate easily. Excess emulsifying agent(s) is expensive and should be avoided. The introduction of too little emulsifying agent(s) is to be also avoided because an oil-in-water emulsion will not form suitable for pipeline transportation. However, the employment of too little emulsifier agent(s), or not enough emulsifier agent(s) for transportation through a long pipeline (such as over 1,000 miles long), is not critical because one of the features of this invention is that although the formulated oil-in-water emulsion may fail and/or breakdown in a pipeline into a mixture comprising an at least partially (i.e. partially or substantially) coalesced oil droplet phase and residual oil-in-water emulsion, the resulting mixture has a viscosity that is less than or equal to the viscosity of the original oil-in-water emulsion(s) notwithstanding the fact that the at least partially coalesced oil droplet phase itself has a viscosity larger than the viscosity of the original oil-in-water emulsion(s). An attendant feature to this feature of the invention is that if and when the oil-in-water emulsion(s) of this invention fails or breaks down in a pipeline into the mixture comprising an at least partially coalesced oil droplets and residual oil-in-water emulsion(s), it is done so without a substantial proportion of the formulated oil-in-water emulsion(s) being inverted into a water-in-oil emulsion. These features enable the mixture of coalesced oil droplets and residual oil-in-water emulsion to be continuously transported through the pipeline without having to remove the mixture to reformulate the oil-in-water emulsion(s).

A conduit 74 transports water from the water tank 26 into the tank 58 wherein water and the emulsifying agent(s) are mixed or combined together into the emulsifying composition(s). The pH of the emulsifying composition(s) in tank 58 may be modified by chemical addition. A filter (not shown in the drawings) may be installed in conduit 74 to remove sediment. A valve 76 and a flow meter 78 are in conduit 74 to control and meter, respectively, the flow of the water. It is important that the emulsifying agent(s) of this invention be mixed or combined with water such that the emulsifying composition(s) contain water. If water is absent from the emulsifying composition(s), and the emulsifying agent(s) in a pure or relatively pure state contacts and/or mixes with the produced hydrocarbon crude, a pipeline-transportable oil-in water emulsion(s) cannot be produced or formulated, even if water is added separately to the produced hydrocarbon crude, or the crude contains water in any of its various forms. The emulsifying agent(s) of this invention is essentially insoluble in hydrocarbon crude and would not form a homogeneous solution with the hydrocarbon crude. Also, unless water is present with the emulsifying agent(s) of this invention, diffusion of the emulsifying agent(s) through the hydrocarbon crude to the interface of the crude and water (which was separately added or already contained within the crude) is much too slow, if it occurs at all. This is especially true for Athabasca bitumen. Therefore, one of the salient features of this invention is the mixing of the emulsifying agent(s) with water prior to any emulsifying agent(s) contacting the produced hydrocarbon crude.

As was previously mentioned, a suitable freezing point depressant may be mixed with the water to lower the freezing point of the water and/or the emulsifying composition(s) and/or the eventually forded oil-in-water emulsion(s). For the purposes of illustrating this invention, ethylene glycol will be employed as the freezing point depressant. To accomplish the mixing of water with ethylene glycol, conduit 82 supplies an ethylene glycol tank 80 with ethylene glycol. Ethylene glycol can be introduced directly into the water tank 26 through a conduit 84 that contains a valve 86 for regulating the flow of ethylene glycol therethrough. A flow meter 88 is also provided within conduit 84 to monitor the direct flow of ethylene glycol into the water tank 26. Alternatively, ethylene glycol can be introduced directly through a conduit 90 into water that is flowing within conduit 74 from the water tank 26. Similarly to conduit 84, conduit 90 is provided with a valve 92 and a flow meter 94 to regulate and meter, respectively, the flow of ethylene glycol through conduit 90. To effect the flow of ethylene glycol through conduit 84, valve 86 in conduit 84 is opened and valve 92 in conduit 90 is closed; and to effect the flow of ethylene glycol through conduit 90, valve 92 in conduit 90 is opened and valve 86 in conduit 84 is closed. Optionally, to accomplish the purpose for using ethylene glycol, instead of introducing and mixing directly the ethylene glycol with the water, ethylene glycol may be introduced into and mixed directly with the emulsifying agent(s), or with the mixture of water and emulsifying agent(s) within the tank 58.

The emulsifying composition(s) of this invention is pumped out of tank 58 through a conduit 94 by an emulsifying composition pump 96. Before commencing the pumping of the emulsifying composition(s) through the conduit 94 with the pump 96, valve 98 at the bottom of the tank 58 and within the conduit 94 is opened. Emulsifier composition pump 96 further pumps or transports the emulsifying composition(s) through a conduit 100 to meet with, combine or mix with, or the like, the stream of produced hydrocarbon crude at the entrance of the conduit 50. Conduit 100 is provided with a flow meter 102 to monitor and indicate the flow of the emulsifying composition(s) en route to its meeting with the produced hydrocarbon crude. Conduit 100 passes through a heat exchanger 104 which is provided in order to control and provide the emulsifying composition(s) with a sufficient temperature such that when it meets and mixes with the produced hydrocarbon crude at the entrance to conduit 50, the temperature of the mixture of emulsifying composition(s) and produced hydrocarbon crude within conduit 50 is from about 100° F. to about 200° F. As was previously indicated, maintaining the temperature of the mixture of emulsifying composition(s) and produced hydrocarbon crude from about 100° F. to about 200° F. is important in order to form the oil-in-water emulsion(s), as well as to produce and/or maintain a viscosity of the mixture that enables the mixture to be pumped or transported through a pipeline. This is especially true when the produced hydrocarbon crude is Athabasca bitumen which may at times possess a temperature above 200° F. and/or a high viscosity (e.g. 20,000 cp at about 100° F.) that would render it difficult to pump or transport through a pipeline. Thus, heat exchanger 104, depending on the temperature of the produced hydrocarbon crude at the temperature indicator 54 and/or the temperature of emulsifying composition(s) from tank 58, may at times have to heat the emulsifying composition(s); and at other times may have to cool the emulsifier composition(s) instead of heating it, in order that the mixture of produced hydrocarbon crude and emulsifying composition(s) possesses the appropriate temperature of from about 100° F. to about 200° F.; more preferably from about 160° F. to about 195° F. when the produced hydrocarbon crude is Athabasca bitumen because of the high viscosity factor of the Athabasca bitumen.

The pressure drop across the mixer is monitored as it travels through conduit 50 by a pressure and flow meter monitor 106. Conduit 50 leads or terminates into a static shearing and static mixing means or device, generally illustrated as 108, which produces the oil-in-water emulsion(s) when the mixture is passed at a certain velocity therethrough and at the temperature of from about 100° F. to about 200° F. In a preferred embodiment of the invention, the device 108 is not preceded or followed by any dynamic shearing and mixing device (such as in-line blenders, rotor-stator, homogenizer, etc.) because the quality of the produced oil-in-water emulsion(s) may be affected if sheared and/or mixed dynamically, especially for certain species of emulsifier agent(s) which will be more fully setforth hereinafter. With respect to these certain species of emulsifer agent(s) when used to formulate oil-in-water emulsion(s) with dynamic mixing and/or dynamic shearing, such formulated oil-in-water emulsion(s) tend to fail and/or breakdown into the previously indicated mixture comprising an at least partially (i.e. partially or substantially) coalesced oil droplets in the water continuous phase, and residual oil-in-water emulsion. As was previously mentioned, not withstanding such failure and/or breakdown, the resulting coalesced oil droplets-residual emulsion mixture would still have a viscosity less than or equal to the original oil-in-water emulsion(s). Therefore, such mixture may be continually transported or pumped through a pipeline, or the like, without any concerns for non-effective pipeline-viscosity that may have resulted from the failure and/or breakdown due to dynamic shearing and/or dynamic mixing. The effectiveness of other species of the emulsifier agent(s) of this invention is not affected by any form or means of agitation, including but not limited to dynamic shearing and/or dynamic mixing. Thus, while static shearing and/or static mixing may be a preferred means for formulating the oil-in-water emulsion(s) of this invention, dynamic shearing and/or dynamic mixing is within the spirit and scope of this invention for certain embodiments thereof.

The velocity of the mixture of produced hydrocarbon crude and emulsifying composition(s) through the static shearing and static mixing device 108 may be any suitable velocity as the oil-in-water emulsion(s) of the present invention may be formed or produced under laminar or turbulent flow conditions. However, in a preferred embodiment of the present invention, crude oil pump 46 and emulsification composition pump 96 should be fixed or set such that when the mixture of emulsifying composition(s) and produced hydrocarbon crude enters the static shearing and static mixing device 108, the velocity of the mixture is from about 20 in./sec. to about 140 in./sec., more preferably from about 35 in./sec., to about 115 in./sec. The viscosity of the mixture may be any viscosity that enables the mixture to be pumped, but is preferably from about 100 cp. to about 10,000 cp. At a velocity ranging from about 20 in./sec. to about 140 in./sec., and depending on the viscosity of the mixture, the presssure drop across the mixture within conduit 50 is from about 10 psi. to about 150 psi., preferably from about 20 psi. to about 60 psi.

The static shearing and static mixing device 108 simultaneously shears and mixes the mixture of emulsifying composition(s) and the produced hydrocarbon crude together when the mixture is at the temperature of from about 100° F. to about 200° F. to form the pipeline-transportable oil-in-water emulsion(s), and is also one of the salient features of this invention. The objective of this device 108 is to coalesce most or all of the water present, including any water that might be present in the produced hydrocarbon crude as water-in-oil emulsion and/or as "free" water, into one continuous phase, and simultaneously disperse all the oil in the form of small droplets in this continuous water phase. Water, if any, present in the produced hydrocarbon crude in the form of water-in-oil emulsion and/or "free" water is converted, changed, or altered in the device 108 into oil-in-water emulsion(s). The degree of conversion or alteration sought is 100%. In order to avoid production of an inverted-phase emulsion (i.e. an oil continuous emulsion), the emulsion composition(s) is preferably initially passed through the device 103 in a relatively pure state (i.e. not combined or mixed with the produced hydrocarbon crude) before being combined or admixed with the produced hydrocarbon crude at the entrance of conduit 50 in order to wet the mixer internals of the device 108 with the desired water continuous phase. As will be discussed below in greater detail, the device 108 has various embodiments (as illustrated in FIGS. 4–14) and may be employed singly (see FIG. 3), or in parallel (see FIG. 2), to produce multimodal oil-in-water emulsion(s) having a lower viscosity than the viscosity of a unimodal oil-in-water emulsion(s). The static shearing and static mixing device 108 is preferably cylindrical with any suitable diameter, such as from about 0.2 inches to about 6.0 feet.

The effluent of the static shearing and static mixing device 108 is discharged into a conduit 110 and is substantially a water-external, oil-in-water emulsion(s) that is suitable for pipeline transportation. However, this oil-in-water emulsion(s) may contain extra water relative to that required to achieve a certain pipeline viscosity. A sampler 112 is provided within conduit 110 such that the oil-in-water emulsion(s) leaving the static shearing and static mixing device 108 passes through the sampler 112 whereby the quality of oil-in-water emulsion(s) achieved (including any water-in-oil emulsion(s) that might have been initially contained within the produced hydrocarbon crude and subsequently converted or changed in the static shearing and static mixing device 108 into the oil-in-water emulsion(s)) can be checked and determined. Conduit 110 also includes a valve 113 for regulating or terminating the flow of oil-in-water emulsion(s) therethrough.

If needed, and optionally, the formulated oil-in-water emulsion(s) can be recycled through a line 114, using a recycle pump 99, and back to the point of where the mixture of emulsifying composition(s) and produced hydrocarbon crude is introduced into the static shearing and static mixing device 108 to ensure formation of proper oil-in-water emulsion(s). To accomplish this recycle operation, recycle pump 99 is energized after valve 113 in conduit 110 is closed and a valve 115 (which is normally closed) in conduit 114 is opened. A temperature indicator 116 is provided in conduit 110 to monitor the temperature of the oil-in-water emulsion(s) flowing therethrough. Optionally, degassing boot 118 may also be provided in conduit 110 if degassing of the oil-in-water emulsion(s) is desired or needed. After the degassing boot 118, the pipeline-transportable oil-in-water emulsion(s) flows through a heat exchanger 120 and into an emulsion tank 122, or directly to a pipeline 123. The objective of the heat exchanger 120 is to provide an option for cooling the oil-in-water emulsion(s) flowing through conduit 110 to a temperature below about 120° F., preferably below about 100° F., more preferably from about 80° F. to about 100° F. Some oil-in-water emulsion(s) of this invention are temperature sensitive. At high temperatures (i.e. above about 120° F.) these oil-in-water emulsion(s) may have reduced stability. In order to achieve a more stable oil-in-water emulsion(s), the temperature of the oil-in-water emulsion(s) flowing through the conduit 110 should be lowered below about 120° F. At temperatures below about 120° F., tne stability of the oil-in-water emulsion(s) of this invention increases.

In the emulsion tank 122, the pipeline-transportable oil-in-water emulsion(s) is ready to be transmitted or transported through a conduit 124 to the pipeline 123. The quality of the oil-in-water emulsion(s) may be checked by another meter 126 having a cut monitor and sampler and, if satisfactory, it is sent to the pipeline 123 for transportation to a desired destination.

It should be noted that as long as the temperature of the oil-in-water emulsion(s) within the emulsion tank 122 is below about 120° F., there should be no problems with the oil-in-water emulsion(s) with respect to stability. Similarly, as long as the quantity of water in the effluent oil-in-water emulsion(s) is greater than what is needed, there should be no problems with the oil-in-water emulsion(s) with respect to pipeline-viscosity standpoint, especially for Athabasca bitumen. Excess water in the oil-in-water emulsion(s) is of no major concern when the oil-in-water emulsion(s) is to be transported through a pipeline that is not too long, such as one (1) to two (2) miles. However, excess water for a long pipeline should not be too large because there may be limitations in the pipeline from a pumping-capacity standpoint. There could be a problem, especially when the produced hydrocarbon crude is Athabasca bitumen, if the amount of water in the effluent oil-in-water emulsion(s) is less than what is required from an effective pipeline-viscosity standpoint. Once the amount of water in the formulated oil-in-water emulsion(s) is the appropriate amount for an effective pipeline-viscosity, the formulated oil-in-water emulsion(s) may be pumped or transported through a pipeline of any length (such as over 1,000 miles) without any fears or concerns about the formulated oil-in-water emulsion(s) failing and/or breaking down into a mixture or phases that do not possess an effective viscosity for pipeline transportation. As was previously indicated, a salient feature of the oil-in-water emulsion(s) of this invention is that although the formulated oil-in-water emulsion may fail and/or break down in a pipeline into a mixture comprising an at least partially (i.e. partially or substantially) coalesced oil droplets in the water continuous phase and residual oil-in-water emulsion(s), the mixture has a viscosity that is less than or equal to the viscosity of the original oil-in-water emulsion(s) in spite of the fact that the coalesced oil droplet phase itself has a viscosity larger than the viscosity of the original oil-in-water emulsion(s). It should be understood that the mixture may include some (but not a substantial amount) formed oil-in-water emulsion that has inverted into a water-in-oil emulsion. Such water-in-oil emulsion may be part of the coalesced oil droplet phase and/or the residual oil-in-water emulsion and/or separate from both the coalesced oil droplet phase and the residual oil-in-water emulsion. With the emulsifier agent(s) of this invention in combination with other features of this invention, when the oil-in-water emulsion(s) fail or breakdown in a pipeline into the mixture comprising at least partially coalesced oil droplets and a residual oil-in-water emulsion(s), a substantial proportion of the original, formulated oil-in-water emulsion(s) is not inverted into a water-in-oil emulsion. The residual oil-in-water emulsion(s) may be defined as the remaining oil-in-water emulsion(s) from the original oil-in-water emulsion(s) whose contained dispersed oil droplets have not at least partially coalesced. These features of the present invention enable the mixture comprising the at least partially coalesced oil droplets and residual oil-in-water emulsion to be continuously pumped or otherwise transported through the same pipeline (i.e. pipeline 123) that the original oil-in-water emulsion(s) was introduced into, without the need for removing the mixture to reformulate the oil-in-water emulsion(s). However, one of the desirable qualities of the oil-in-water emulsion(s) of this invention is that if there is a breakdown or failure in the original oil-in-water emulsion(s) into the coalesced oil droplet-residual emulsion mixture, the original oil-in-water emulsion(s) may be easily reformulated by merely passing the mixture through another device 108 which may be situated within the pipeline that is transporting the oil-in-water emulsion(s) or off to the side of the pipeline in a bypass loop, as illustrated in FIG. 3. Thus, if desired, such reformulation may be easily accomplished even though it is not necessary to do so to continue the pumping or transportation of the failed or broken down original oil-in-water emulsion(s).

The emulsifying agent(s) of this invention used in the preparation of the oil-in-water emulsions may gradually become inactivated during pipeline flow, depending on the original concentration or quantity of emulsifying agent(s) employed, the temperature of the emulsion-forming constituents (i.e. crude and emulsifying composition) at formulation, etc. Regardless of any formulation condition, the formed oil-in-water emulsion will eventually separate into the two-phase mixture (i.e. the coalesced oil droplet-residual emulsion mixture) which, as was indicated above, will continue to flow under ordinary circumstances. The total distance through a pipeline in which an oil-in-water emulsion may be pumped or otherwise transported prior to separation into the two-phase mixture also depends on the original concentration or quantity of the emulsifying agent(s) employed, and the temperature of the emulsion forming constituents at formulation, as well as other properties of the hydrocarbon crude oil and aqueous phase (i.e. water, brine, or the like), and pipeline and pumping conditions. If, for any reason, the oil-in-water emulsion can not be prepared with sufficient stability to be pumped (or otherwise transported) over the total length of a pipeline, another embodiment of the present invention provides for remedial procedures to restore the oil-in-water emulsion in order to allow for the continued transportation of the formed oil-in-water emulsion through a pipeline for any desired distance. More specifically, it has been discovered that through the addition of additional aqueous phase and/or the addition of additional concentrated emulsifying composition [or additional pure emulsifying agent(s)] into the pipeline that has been transporting the original formed oil-in-water emulsion that has separated into the two-phase mixture (or the coalesced oil droplet-residual emulsion mixture), the separated oil-in-water emulsion can be restored into the original formed oil-in-water emulsion with sufficient agitation, such as by pumping or the like. The selection of additional aqueous phase and/or additional concentrated emulsifying composition [or pure emulsifying agent(s)] depends on the condition or state of the separated oil-in-water emulsion, the pipeline and pumping conditions, the desires of the pipeline operator and refiner or other receiver of the oil-in-water emulsion, and etc. Depending further on the pipeline and pumping conditions, it has been discovered that should even the original formed oil-in-water emulsion completely fail or otherwise transform into a highly viscous oil continuous system, such oil continuous system can be restored into the original formed oil-in-water emulsion through the addition or injection into the pipeline of additional emulsifying composition along with agitation, such as pumping or shearing and mixing statically. The use of this technique to correct a total oil-in-water emulsion failure would require that the necessary quantities of emulsifying composition be available and injection pumps be located at the location in the pipeline where the total failure has occurred.

The addition of additional aqueous phase into the pipeline transporting or carrying the separated oil-in-water emulsion allows the separated oil-in-water emulsion to be transported even if the separated emulsion should show a tendency to inversion or total failure into an oil continuous system. The amount of additional aqueous phase required depends on the properties of the crude, but is typically of an amount sufficient to increase or maintain the total aqueous phase concentration in a given volume of oil-in-aqueous phase emulsion in a range of from about 40% to about 60% (preferably 45% to 55%) volume percent. The utilization of the additional aqueous phase technique requires that the additional quantities of aqueous phase and injection pumps be available for use when and at the pipeline location where the originally formed oil-in-water emulsion separates into the emulsion mixture comprising the coalesced oil droplet phase and the residual oil-in-water emulsion phase. The amount of additional aqueous phase to be added must also be considered in relation to receiving tankage and treatment equipment at the pipeline termination.

The addition of additional concentrated emulsifying compositions [or additional pure emulsifying agent(s)] either alone or in combination with additional aqueous phase has some advantages over the employment of aqueous phase alone. A concentrated emulsifying composition may be defined as that amount of emulsifying composition that is necessary or equivalent for raising or maintaining the emulsifying agent(s) concentration of from about 250 ppm to 1500 ppm or higher of emulsifying agent(s) by weight of hydrocarbon oil/crude, after the emulsifying composition is added or injected into the separated oil-in-water emulsion. This procedure results in a lower emulsion mixture viscosity and a smaller increase in the total volume of the oil-in-water in-water emulsion. Additional concentrated emulsifying composition [or additional pure emulsifying agent(s)] either alone or in combination with additional aqueous phase should be added or injected into the pipeline before or soon after separation and before any substantial portion of the aqueous phase is absorbed into the hydrocarbon oil/crude phase.

The additional concentrated emulsifying composition [or additional pure emulsifying agent(s)] either alone or in combination with additional aqueous phase may be used on a routine basis to reduce the total quantity of emulsifying agent(s) initially employed or required by having one or more intermediate emulsifier injection points along the pipeline transporting the oil-in-water emulsion in order to periodically inject the additional concentrated emulsifying composition [or additional pure emulsifying agent(s)], either alone or in combination with additional aqueous phase. If all of the required emulsifying agent(s) are employed initially at the beginning of the pipeline, excess emulsifying agent(s) is required to provide the necessary safety margin needed to ensure that separation or total failure does not occur. By the use of one or more intermediate emulsifier injection points along the pipeline transporting the oil-in-water emulsion, the total quantity of emulsifying agent(s) to be used can be optimized such that there is no excess or waste of emulsifying agent(s) at any point along the pipeline. Thus, the total quantity of emulsifying agent(s) used along the entire length of the pipeline would be less than the quantity of emulsifying agent(s) used for a sole injection only at the beginning of the pipeline.

It should also be pointed out that solid pellets of pure emulsifying agent(s) may be placed or injected periodically into the pipeline (either at the beginning or at intermediate positions) carrying or transporting oil-in-water emulsion in order to maintain the oil-in-water emulsion in an emulsion state while preventing separation or total failure. The solid pellets of pure emulsifying agent(s) injection procedure is thus another means of optimizing the quantity of emulsifying agent(s) used because the solid pellets would constantly, gradually emit, put forth, or dissolve fine solid quantities of pure emulsifying agent(s) into the stream of oil-in-water emulsion as the solid pellets travel through the pipeline along with the oil-in-water emulsion, allowing the initial quantity of emulsifying agent(s) used to form the oil-in-water emulsion to be smaller or less than the quantity that would have to be used if the solid pellets were not employed. Therefore, another embodiment of the present invention provides for a method for restoring the properties of a water continuous emulsion with a hydrocarbon crude after the emulsion has experienced phase separation in a pipeline comprising either or a combination of the following steps: (1) adding on a continuous basis at one or more points along the pipeline additional aqueous phase to the flowing separated emulsion to increase the total water concentration from 40% to 60% by volume; (2) adding on a continuous basis at one or more points along the pipeline additional emulsifying composition (or emulsifying agent(s) which may be in solid pellet or particulate form) to the flowing separated emulsion to increase the stability of the oil-in-water emulsion in order that it may be pumped to the end of the pipeline without total failure or inversion into an oil continuous phase. The present invention further provides for a method for reducing the total quantity of emulsifying agent(s) necessary for pipeline transportation of a heavy crude or bitumen water continuous emulsion and simultaneously reducing the risk of emulsion separation comprising the following steps: (1) preparing an oil-in-water emulsion with a smaller quantity of emulsifying agent(s) necessary for transporting the formed oil-in-water emulsion over the entire length of the pipeline; (2) injecting at one or more points along the pipeline additional emulsifying compositions (or emulsifying agent(s) which may be in solid pellet or particulate form) in order to minimize and optimize the total quantity of emulsifying agent(s) required. The solid form of the emulsifying agent(s) may be placed in the formed oil-in-water emulsion at the beginning of the pipeline to flow with the flowing emulsion to gradually dispose of additional emulsifying agent(s) in the emulsion while flowing through the length of the pipeline.

After the oil-in-water emulsion(s) has been transported or pumped through the pipeline 123 to its final destination, the oil droplets are separated from the oil-in-water emulsion(s) in a separating station 300 that is positioned at the end of the pipeline 123. The separated oil leaves the separating station through pipeline 302 and the residual water product after the oil has been separated, which is water plus any additives (e.g. ethylene glycol, etc.), should be recycled back to the water tank 26, or the tank 58 through conduit 304, in order to be admixed with the produced hydrocarbon crude. Separating the oil droplets from the oil-in-water emulsion(s) may be accomplished by any suitable means, such as heating the oil-in-water emulsion(s) above the phase inversion temperature (P.I.T.), which is generally from about 180° F. to about 210° F., and/or adding deemulsifier(s). Any deemulsifier(s) added to the oil-in-water emulsion(s) and contained within the residual water product after the oil has been separated has little or no effect on the emulsifying agent(s) of this invention.

In another embodiment of the present invention, the formed oil-in-water emulsion is broken, destroyed, dissipated, or any of the like (hereinafter referred to as "breaking the oil-in-water emulsion") in order to recover the oil phase while simultaneously destroying any undesirable components resulting from degradation and/or reduction of the emulsifying agent(s) while in transit. Such undesirable components as phenols and other phenolic structure compounds may result from the emulsifying agent(s) of this invention degrading or being reduced while the formed oil-in-water emulsion is being transported through the pipeline. Thus, it becomes desirable to remove these undesirable components which are generally water soluble. It becomes even more desirable to remove these undesirable components while simultaneously breaking the formed oilin-water emulsion. In the present invention, such undesirable phenol components are removed while simultaneously breaking the formed oil-in-water emulsion through the use of potassium permanganate, preferably employed in a quantity or concentration of from about 500 ppm to about 15,000 ppm (more preferably 1000 to 2000 ppm) of potassium permanganate by weight of oil-in-water emulsion. Potassium permanganate breaks up the formed water continuous emulsion and simultaneously destroys any undesirable phenols in a single-step operation.

Potassium permanganate is a powerful oxidizing chemical which destroys phenolic compounds and other undesirable compounds containing benzene by attacking the double bonds. Potassium permanganate also reacts and/or breaks the $+CH_2-CH_2-O+_y$ repeat segments or units in the emulsifying agent(s) to break the water continuous emulsion. During the attack and/or reaction, water and manganese dioxide and carbon dioxide form, along with by-products. When potassium permanganate is utilized in removing phenol in a holding tank, the phenol is oxidized rapidly at a pH of 7.0 to 11.0, preferably 8.5 to 9.5. A retention time of from fifteen minutes to about six hours in a reactor and/or a retention time of fifteen minutes to two weeks in a tankage, is sufficient to insure complete oxidation of the phenol. The initial reaction takes place almost immediately, and almost 90% of the phenol is generally oxidized in the first ten minutes. Other suitable oxidizers for phenol treatment and breaking the water continucus emulsions are ozone ($O_3$), hydrogen peroxide ($H_2O_2$), and chlorine ($Cl_2$). These oxidizers are typically employed in any suitable manner (e.g. chlorination, ozonation, etc.) in quantities ranging from 500 ppm to 15,000 ppm of oxidizer by weight of oil-in-water emulsion.

A preferred procedure for treating the oil-in-water emulsion with potassium permanganate is to mix (either statically or dynamically and/or in a reactor) the water continuous emulsion with a diluted stream of potassium permanganate (i.e. a potassium permanganate-aqueous mixture having 85 wt. % to 99 wt. % of the aqueous phase). The potassium permanganate preferentially reacts with the emulsifying agent(s) as opposed to constituents in the hydrocarbon oil/crude. After thorough mixing, the mixture is preferably discharged into a conventional vessel for a quiescent period ranging from about fifteen minutes to about two weeks. Typically, during the quiescent period, the hydrocarbon oil/crude coagulates and rises to the top while the aqueous phase settles to the bottom. The hydrocarbon oil/crude is removed off of the aqueous phase as effluent and is fed into a desalter where separation of the mixture occurs into waste water and hydrocarbon oil/crude for refining purposes. The waste water may have to be further treated with an oxidizer (e.g. dilute $KMnO_4$, ozone, chlorine, etc.) and a mixer (e.g. static mixer, high shear pump, etc.) in accordance with the procedure as previously set forth for treating water continuous emulsions for phenols while simultaneously breaking the emulsion.

Alternatively to separating the oil droplets from the oil-in-water emulsion(s) or breaking the oil-in-water emulsions, the existing oil-in-water emulsion(s) can be used in its existing state, such as for fuel, and there would be no need to separate the oil droplets from the existing oil-in-water emulsion. Thus, in those instances where the oil-in-water emulsion(s) is to be burned as fuel, the oil-in-water emulsion(s) can be fed directly to a boiler (e.g. utility boiler, fluidized bed boiler, etc.). No separation step would have to be employed unless the BTU content of the oil-in-water emulsion(s) is too low.

The emulsifying agent(s) of this invention may be any emulsifying agent which, when combined with an appropriate amount of water, is capable of forming in the produced hydrocarbon crude an oil-in-water emulsion when the temperature of the crude-emulsifying agent mixture is from about 100° F. to about 200° F. Generally, unless a broad-based emulsifying agent is used, a mixture of at least two emulsifying agents is employed. Surface-active agents used to form oil-in-water emulsion(s) may be anionic, cationic, nonionic, amphoteric, and the like. A desired and preferred characteristic is a high degree of oil insolubility. Preferably, the surface active agents are substantially insoluble in oil. Most of the inexpensive and efficient candidates for forming crude oil-in-water emulsion(s) are either anionic or nonionic. Nonionics are presently preferred because they are generally cheaper and not affected by the salinity of the water.

The best known of all the anionic-active emulsifying agents are the soaps which are the salts of the long-chain fatty acids, derived from naturally occurring fats and oils, in which the acids are found as triglycerides. The soaps used as emulsifying agents may be obtained from natural oils, in which case they will consist of a mixture of fatty acids, the precise nature of the mixture depending on the fat or oil employed. The mixed fatty acids of tallow, coconut oil, palm oil, and the like, are those commonly employed. The acids derived from tallow, for instance, may be partially separated by filtration or by pressing into "red oil" (principally oleic acid) and the so-called "stearic acid" of commerce, which is sold as single-, double-, or triple-pressed, depending on the extent to which oleic acid is separated. Such stearic acid is actually a mixture of stearic and palmitic acids.

The nonionic emulsifying agents can be classified into file types, namely, ether linkage, ester linkage, amide linkage, miscellaneous linkages, and multiple linkage. Preferred nonionic emulsifying agent(s) are substantially oil insoluble and are those selected from the compounds having the general formula:

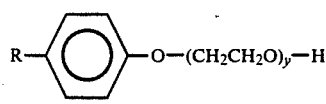

(1)

and

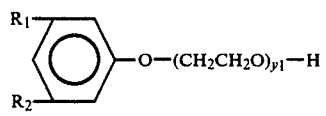

(2)

each of R, $R_1$ and $R_2$ is any hydrocarbon group, preferably an alkyl radical containing from about 8 to about 21 carbon atoms, and each of y and $y_1$ is an integer that represents the average number of ethylene oxide units or segments in the emulsifying agent(s), which is the mean of a normal Gaussian distribution curve. Preferably, each of y and $y_1$ ranges from about 4 to about 100, more preferably from about 30 to about 100. Most preferably, each of R, $R_1$, and $R_2$ is $C_9H_{19}$, and each of y and $y_1$ is 40 or 100. When the oil-in-water emulsion(s) of this invention are formulated with the nonionic emulsifying agent(s) represented by the general formula (1) and/or the general formula (2), the static shearing and static mixing device 108 is preferably employed without being preceded or followed by any dynamic shearing and mixing device, because it has been discovered that the longevity quality of the formulated oil-in-water emulsion(s) is affected if produced through the use of a dynamic shearing and/or mixing device. However, even it nonionic emulsifying agent(s) represented by the generla formula (1) and/or the general formula (2) is employed along with dynamic shearing and/or dynamic mixing; and the formulated oil-in-water emulsion(s) fails and/or breaks down while being transported through a pipeline, it has been discovered that the viscosity of the failed and/or brokendown mixture, which comprises coalesced and separated oil droplets in the water continuous phase and residual oil-in-water emulsion, is less than or equal to the original formulated oil-in-water emulsion(s). It has been discovered that this true even though the viscosity of coalesced and separated oil droplets is more than the original formulated oil-in-water emulsion(s). Thus, the failed and/or brokendown mixture may be continually pumped through the pipeline without any concerns for non-effective pipeline-viscosity.

Other preferred nonionic emulsifying agent(s), especially when the produced hydrocarbon crude is Athabasca bitumen, are those selected from the compounds which are substantially oil insoluble and have the general formula.

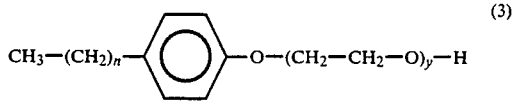
(3)

where n is from about 7 to about 20, preferably 11, and y is an integer that represents the average number of ethylene oxide units or segments in the emulsifying agent(s), which is the means of a normal Gaussian distribution curve and is from about 101 to about 250, preferably from about 120 to about 130, more preferably about 150; and

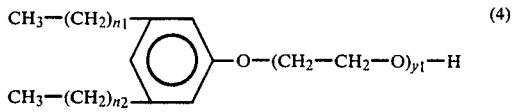
(4)

wherein $n_1$ is from about 7 to about 18, preferably about 8, $n_2$ is from about 7 to about 18, preferably about 8, and $y_1$ is an integer that represents the average number of ethylene oxide units or segments in the emulsifying agent(s), which is the mean of a normal Gaussian distribution curve and is from about 101 to about 250, preferably from about 120 to about 180, more preferably about 150.

Preferably, the nonionic emulsifying agent(s) of this invention is a combination of the compounds having the general formula (3) and the compounds having general formula (4), with the compounds having the general formula (4) being at least 40% by weight of the combination. More preferably, the compounds having general formula (4) are from about 50% by wt. to about 85% by wt. of the combination.

The most prominent members of the class of nonionic emulsifying agent(s) represented by the foregoing general formulas (1), (2), (3) and (4) are those compounds formed by the reaction of a hydrophobic hydroxyl-containing compound, e.g., an alcohol or phenol, with ethylene oxide. The ethylene oxide groups, for example, may be added to any desired extant.

The emulsifying composition(s) of this invention can comprise emulsifying agent(s) represented by the general formula (1) and/or the general formula (2) in combination with the emulsifying agent(s) represented by the general formula (3) and/or the general formula (4). Typically, when such combination or combinations are employed, the amount or quantity of emulsifying agent(s) represented by the general formula (3) and/or the general formula (4) would comprise from about 20% by wt. to about 80% by wt. of the total amount or quantity of the emulsifying agent(s) employed within the emulsifying composition(s).

It has been discovered that when the oil-in-water emulsion(s) of this invention are produced or formulated with the nonionic emulsifying agent(s) represented by the general formula (3) and/or the general formula (4), any form or means of agitation may be utilized for such production or formulation. Any dynamic shearer or mixer may be utilized, as well as the preferred static shearing and static mixing device 108.

Should a portion of the oil droplets in the oil-in-water emulsion(s) formulated with the nonionic emulsifying agent(s) represented by any of the general formulas (1)–(4), either taken singly or in combination, partially coalesce for any reason to form partially coalesced oil, the mixture comprising the oil-in-water emulsion including the partially coalesced oil may be continually transported or pumped through a pipeline for the same reasons that have been previously stated. To reiterate and to be more specific, the viscosity of the oil-in-water emulsion containing partially coalesced oil has a viscosity lower than or equal to the original oil-in-water emulsion(s) in spite of the fact that the viscosity of the partially coalesced oil droplets is larger than the viscosity of the originally formulated oil-in-water emulsion(s). Thus, the failed and/or brokendown mixture may even have a viscosity that makes it more favorable for pipeline transportation than the originally formulated oil-in-water emulsion(s).

The presently nonionic emulsifying agent(s) having an ester linkage include compounds of the following general formula:

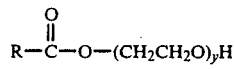

where R is any hydrocarbon group, preferably an alkyl radical containing from about 8 to about 21 carbon atoms, more preferably R is $C_9H_{19}$; and y is an integer that represents the average number of ethylene oxide units or segments in the emulsifying agent(s), which is the mean of a normal Gaussian distribution curve and is from about 4 to about 250, preferably from about 40 to 150, more preferably 40 or 100; and are substantially oil insoluble as defined above.

The esters formed by the reaction of the fatty acids with polyhydric alcohols are a particularly interesting group of nonionic emulsifiers, in that, depending on the nature of the alcohol used, they may be predominantly hydrophilic and are especially suitable as oil-in-water emulsifiers.

An example of an ester-linkage surfactant which is a good emulsifying agent is:

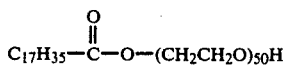

Nonionic emulsifying agent(s) with amide linkages are compounds of the general formula:

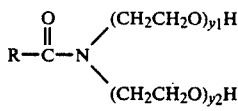

where R is any hydrocarbon group, preferably an alkyl radical containing from about 8 to about 21 carbon atoms, more preferably R is $C_9H_{19}$; and each of $y_1$ and $y_2$ is an integer that represents the average number of ethylene oxide units or segments in the emulsifying agent(s), which is the mean of a normal Gaussian distribution curve and is from about 4 to about 250, preferably from about 40 to 150, more preferably 40 or 100; and are substantially oil insoluble as defined above.

Another nonionic emulsifying agent(s) that has been found to be suitable in the process of this invention is polyethoxylated alcohol(s) having the general formula:

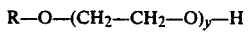

wherein R is an alkyl having from about 7 to about 20 carbon atoms and y is an integer that represents the average number of ethylene oxide units or segments in the emulsifying agent(s), which is the mean of a normal Gaussian distribution curve and is from about 4 to about 250. More preferably, R is an alkyl having from about 12 to about 18 carbon atoms and y is from about 120 to about 180.

In a more preferred embodiment of the present invention, the emulsifying agent(s) is or are those emulsifying agent(s) selected from the ethoxylated alkylphenol compounds having a molecular weight distribution with a dispersity of from about 1.0 to about 5.0, a weight average molecular weight of from about 1966 to about 9188, and the general formula:

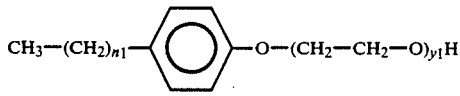

wherein $n_1$ is an integer and has a value of from about 7 to about 20, preferably 11, and $y_1$ is an integer having a value of from about 4 to about 1000; and wherein at least about 50% by weight of the emulsifying agent(s) comprises the ethoxylated alkylphenol compound having a molecular weight of from about 1966 to about 9188. The emulsifying agent(s) has at least one ethoxylated alkylphenol compound having the general formula:

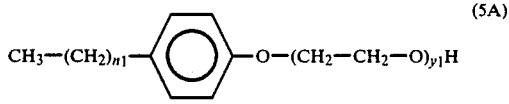

wherein $n_1$ has a value of from about 7 to about 20, preferably 11; and $y_1$ is greater than 100, preferably greater than 100 but less than 1000, and the ethoxylated alkylphenol compound of general formula (5A) preferably comprises at least 1% by weight (more preferably from 1% to 90% by weight) of the emulsifying agent(s).

More preferably, the dispersity of the molecular weight distribution of the emulsifying agent(s) represented by general formula (5) is from about 1.0 to about 2.5, most preferably about 1.0 to 2.0. The weight average molecular weight of the emulsifying agent(s) is more preferably from about 3726 to about 6548, most preferably from about 4606 to 5668. More preferably, at least about 70% by weight (most preferably, at least about 85% by weight) of the emulsifying agent(s) comprises the ethoxylated alkylphenol compound having a molecular weight of from about 1966 to about 9188.

The emulsifying agent(s) in the present invention may also be those emulsifying agent(s) selected from the ethoxylated dialkylphenol compounds having a molecular weight distribution with a dispersity of from about 1.0 to about 5.0, a weight average molecular weight of from about 2519 to about 11,627, and the general formula:

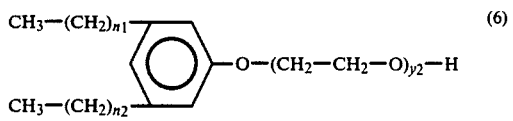

wherein $n_1$ is an integer and has a value of from about 7 to about 18, $n_2$ is an integer and has a value of from about 7 to about 18, and $y_2$ is an integer having a value of from about 4 to about 1000; and wherein at least about 50% by weight of the emulsifying agent(s) comprises the ethoxylated dialkylphenol compound having a molecular weight of from about 2519 to about 11,627. The emulsifying agent(s) has at least one ethoxylated dialkylphenol compound having the general formula:

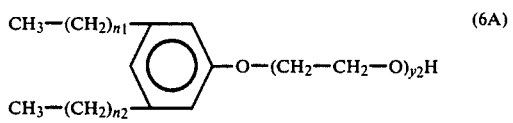

wherein $n_1$ has a value of from about 7 to about 18, $n_2$ has a value of from about 7 to about 18, and $y_2$ is greater than 100, preferably greater than 100 but less than 1000; and the ethoxylated dialkylphenol compound of general formula (6A) preferably comprises at least 1% by weight (more preferably from 1% to 90% by weight) of the emulsifying agent(s).

More preferably, the dispersity of the molecular weight distribution of the emulsifying agent(s) represented by the general formula (6) is from about 1.0 to about 2.5, most preferably about 1.0 to 2.0. The weight average molecular weight of the emulsifying agent(s) is more preferably from about 4714 to about 8547, most preferably from about 6039 to about 7227. More preferably, at least about 70% by weight (most preferably, at least about 85% by weight) of the emulsifying agent(s) comprises the ethoxylated dialkylphenol compound having a molecular weight of from about 2519 to about 11,627.

The emulsifying agent(s) may be a combination of the ethoxylated alkylphenol compounds having the general formula (5) and the ethoxylated dialkylphenol compounds having the general formula (6) in any percent by weight proportion provided that the dispersity of the molecular weight distribution of the entire combination is from about 1.0 to about 5.0 (more preferably about 1.0 to about 2.5 and most preferably about 1.0 to 2.0), and the weight average molecular weight in the combination of the emulsifying agent(s) [or in general formula (5) and/or in general formula (6)] is about 1966 to about 11,627 (more preferably about 3726 to about 8547, most preferably about 4606 to about 7227). Furthermore, the entire combination should comprise at least 50% by weight (more preferably at least about 70% by weight, most preferably at least about 85% by weight) of the ethoxylated alkylphenol compound and the ethoxylated dialkylphenol compound wherein the ethoxylated alkylphenol compound has a molecular weight of from about 1966 to about 9188 and the ethoxylated dialkylphenol compound has a molecular weight of from about 2519 to about 11,627. More preferably, the compounds having the general formula (5) are from about 30% by weight to about 80% by weight of the combination. Furthermore, at least 1% bu weight (preferably 1% to 90% by weight) of the combination of the ethoxylated alkylphenol compound having the general formula (5) and the ethoxylated dialkylphenol compound having the general formula (6) comprises the ethoxylated alkylphenol compound having the general formula (5A) and/or the ethoxylated dialkylphenol compound having the general formula (6A), where $y_1$ and $y_2$ are both greater than 100, preferably greater than 100 but less than 1000.

Dispersity of the molecular weight distribution of tne polymeric emulsifying agent(s) is defined as the ratio of the weight-average molecular weight ($\overline{M}_w$) of the emulsifying agent(s) to the number-average molecular weight ($\overline{M}_n$) of the emulsifying agent(s), or $\overline{M}_w/\overline{M}_n$. $\overline{M}_n$ is biased toward the lower molecular weight fractions in the polymeric emulsifying agent(s) while $\overline{M}_w$ is biased toward the higher molecular weight fractions. Dispersity depends on the breadth of the molecular weight distribution for the polymeric emulsifying agent(s) and measures the polydispersity in the polymeric emulsifying agent(s).

The weight-average molecular weight $\overline{M}_w$ is obtained from conducting light scattering measurements on the emulsifying agent(s) and is defined as $$M_w = \Sigma\, w_x M_x$$

where $w_x$ is the weight-fraction of molecules those weight is $M_x$. $\overline{M}_w$ can also be defined as $$M_w = \frac{\Sigma\, C_x M_x}{\Sigma\, C_x} = \frac{\Sigma\, C_x M_x}{C} = \frac{\Sigma\, N_x M_x^2}{\Sigma\, N_x M_x}$$

where $C_x$ is the weight concentration of $M_x$ molecules, C is the total weight concentration of all the polymeric emulsifying agent(s) molecules, $N_x$ is the number of moles whose weight is $M_x$, and the following relationships hold:

$$W_x = \frac{C_x}{C}$$

$$C_x = N_x M_x$$

$$C = \Sigma\, C_x = \Sigma\, N_x M_x$$

The number-average molecular weight $\overline{M}_n$ is determined by the measurement of colligative properties such as freezing point depression (cryoscopy), boiling point elevation (ebulliometry), osmotic pressure, and vapor pressure lowering. $\overline{M}_n$ is defined as the total weight w of all the molecules in the polymeric emulsifying agent(s) divided by the total number of moles present. Stated alternatively, the number-average molecular weight is defined by:

$$M_n = \frac{w}{\Sigma\, N_x} = \frac{\Sigma\, N_x M_x}{\Sigma\, N_x}$$

where the summations are from 1 to the number of different sizes of polymer molecules in the emulsifying agent(s), and $N_x$ is the number of moles whose weight is $M_x$.

For a comprehensive discussion of dispersity, $\overline{M}_w$, and $\overline{M}_n$, and other macromolecular science properties, such as the physical and organic chemistry of the reactions by which polymer molecules are synthesized, see the following publications: *Principles of Polymerization* by Odian (copyright and published in 1970 by McGraw-Hill Inc.); *Introduction to Polymer Science and Technology: An SPE Textbook* by Kaufman et al. (copyright and published in 1977 by John Wiley & Sons Inc.); *Principles of Polymer Chemistry* by Flory (copyright and published in 1953 by Cornell University); and *Macromolecules* by Elias (Volume 1 and 2; copyright in 1977 by Plenum Press, New York, and published in 1977 by John Wiley & Sons, Ltd.). All of these publications are incorporated entirely herein by reference thereto.

As will be more thoroughly discussed hereinafter in the Examples for the more preferred emulsifying agent(s) represented by the general formulas (5) and/or (6), the shear life (the measure of the stability of an emulsion) of formed oil-in-water emulsions utilizing the more preferred emulsifying agent(s) are commercially acceptable (i.e. equal an emulsion shear stability to or greater than 40 mins.) provided that the following parameters are conformed to or are followed:

(1) the dispersity of the molecular weight distribution for the emulsifying agent(s) is from about 1.0 to about 5.0 (more preferably 1.0–2.5, most preferably 1.0–2.0);

(2) the weight average molecular weight of the emulsifying agent(s) has a value of from about 1966 to about 11,627 (more preferably from about 3726 to about 8547, most preferably from about 4606 to about 7227), depending on which of the emulsifying agent(s) are employed, those represented by the general formula (5) and/or those represented by the general formula (6); and (3) that at least 50% by weight (more preferably at least about 70% by weight, most preferably at least about 85% by weight) of the emulsifying agent comprises the ethoxylated alkylphenol compound having a molecular weight of from about 1966 to about 9188 and/or the ethoxylated dialkylphenol compound having a molecular weight of from about 2519 to about 11,627.

In another more preferred embodiment of the present invention, especially when the oil-in-water emulsion(s) are to be subterraneously formed in a short period of time (e.g. 0.10 to 20 secs.), the emulsifying agent(s) is or are those emulsifying agent(s) selected from the ethoxylated alkylphenol compounds having a molecular weight distribution with a dispersity of from about 1.0 to about 5.0, a weight average molecular weight of from about 558 to about 2504, and the general formula:

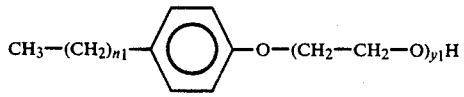 (7)

wherein $n_1$ is an integer and has a value of from about 7 to about 14, preferably 8, and $y_1$ is an integer having a value of from about 4 to about 200; and wherein at least about 50% by weight of the emulsifying agent(s) comprises the ethoxylated alkylphenol compound having a molecular weight of from about 558 to about 2504. The emulsifying agent(s) has at least one ethoxylated alkylphenol compound having the general formula:

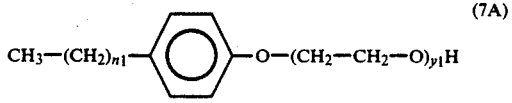 (7A)

wherein $n_1$ has a value of from about 7 to about 14, preferably 8; and $y_1$ is greater than 100, preferably greater than 100 but less than 200, and the ethoxylated alkylphenol compound of general formula (7A) preferably comprises at least about 1% by weight (more preferably from about 1% to about 10% by weight) of the emulsifying agent(s).

More preferably, the dispersity of the molecular weight distribution of the emulsifying agent(s) represented by general formula (7) is from about 1.0 to about 3.0, most preferably about 1.0 to 2.0. The weight average molecular weight of the emulsifying agent(s) is more preferably from about 646 to about 1844, most preferably from about 866 to 1404. More preferably, at least about 70% by weight (most preferably, at least about 85% by weight) of the emulsifying agent(s) comprises the ethoxylated alkylphenol compound having a molecular weight of from about 558 to about 2504.

The emulsifying agent(s) may be a combination of the ethoxylated alkylphenol compounds having the general formula (7) and emulsifying agent(s) selected from the ethoxylated alkyl compounds having a weight distribution with a dispersity of from about 1.0 to about 5.0, a weight average molecular weight of from about 2458 to about 4218, and the general formula:

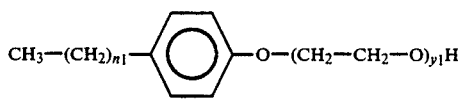 (8)

wherein $n_1$ is an integer and has a value of from about 9 to about 14, preferably 11, and $y_1$ is an integer having a value of from about 4 to about 300; and wherein at least about 50% by weight of the emulsifying agent(s) comprises the ethoxylated alkylphenol compound having a molecular weight of from about 2458 to about 4218. The emulsifying agent(s) represented by general formula (8) has at least one ethoxylated alkylphenol compound having the general formula:

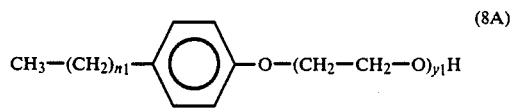 (8A)

wherein $n_1$ has a value of from about 9 to about 14, preferably 11; and $y_1$ is greater than 100, preferably greater than 100 but less than 300, and the ethoxylated alkylphenol compound of general formula (8A) preferably comprises at least about 1% by weight (more preferably from about 1% to about 75% by weight) of the emulsifying agent(s).

More preferably, the dispersity of the molecular weight distribution of the emulsifying agent(s) represented by general formula (8) is from about 1.0 to about 3.0, most preferably about 1.0 to 2.0. The weight average molecular weight of this emulsifying agent(s) is more preferably from about 2898 to about 3778, most preferably from about 3118 to 3558. More preferably, at least about 70% by weight (most preferably, at least about 85% by weight) of the emulsifying agent(s) comprises the ethoxylated alkylphenol compound represented by general formula (8) having a molecular weight of from about 2458 to about 4218.

The ethoxylated alkylphenol compounds having the general formula (7) and the ethoxylated alkylphenol compounds having the general formula (8) are preferably combined or mixed in a percent by weight proportion such that the ethoxylated alkylphenol compounds having the general formula (7) preferably comprise from about 60% by weight to about 85% by weight of the combination or mixture, and the ethoxylated alkylphenol compounds having the general formula (8) preferably comprise from about 15% by weight to about 40% by weight of the combination or mixture. More preferably, the combination or mixture of the ethoxylated alkylphenol compounds having the general formula (7) and the ethoxylated alkylphenol compounds having the general formula (8) comprises from about 70% by weight to about 80% by weight of the ethoxylated alkylphenol compounds having the general formula (7) and from about 20% by weight to about 30% by weight of the ethoxylated alkylphenol compounds having the general formula (8).

The emulsifying agent(s) selected from the ethoxylated alkylphenol compounds having the general formula (7) are particularly valuable in subterraneously forming (i.e., "down hole") oil-in-water emulsions in a commercially acceptable period of time and having a commercially acceptable shear life. A commercially acceptable period of time may be defined as that period of time ranging from about 0.10 secs. to about 20 secs. A commercially acceptable shear life has been defined as an emulsion shear stability equal to or greater than 40 mins. For down hole purposes it is desired that oil-in-water emulsion(s) be formed quickly and with a commercially acceptable shear life so that the high viscosity hydrocarbon being produced can be readily transported to the surface of the earth without the high viscosity hydrocarbon plugging the well tubing and/or retarding the transportation of the produced high viscosity hydrocarbon, and/or otherwise curtailing the production of the high viscosity hydrocarbon. Should the well tubing become plugged such as from failure of the oil-in-water emulsion because of a commercially unacceptable shear life, it may be necessary to pull the well tubing to unplug or replace well tubing.

Subterranean oil-in-water emulsions are formed with the emulsifying agent(s) selected from the ethoxylated alkylphenol compounds having the general formula (7) by agitating (e.g. dynamically and/or statically) the produced hydrocarbon with an emulsifying composition at a temperature of from about 35° F. to about 170° F. and wherein the emulsifying composition comprises an aqueous phase and a minor amount of the emulsifying agent(s) selected from the ethoxylated alkylphenol compounds having the general formula (7). The agitating comprises mixing below the surface of the earth and in proximity to the producing hydrocarbon formation the produced hydrocarbon with the emulsifying composition for a period of time ranging from about 0.10 sec. to about 20 secs., and preferably in a shear field with an intensity ranging from about 50 sec.$^{-1}$ to about 10,000 sec.$^{-1}$ (preferably 50 sec.$^{-1}$ to 5,000 sec.$^{-1}$). The emulsifying agent(s) selected from the ethoxylated alkylphenol compounds represented by the general formula (7) cause excellent oil-in-water emulsions(s) to be formed with a commercially acceptable shear life and within 0.10 to 20 secs. when mixed with an aqueous phase and a produced hydrocarbon at a temperature of from about 35° F. to about 170° F.

As will be more thoroughly discussed hereinafter in the Examples for the other more preferred emulsifying agent(s) represented by the general formula (7), the time to form quality oil-in-water emulsions utilizing the other more preferred emulsifying agent(s) represented by the general formula (7) is commercially acceptable (i.e., if formed within 0.10 to 20 secs.) provided that the following parameters are conformed to or are followed:

(1) the dispersity of the molecular weight distribution for the emulsifying agent(s) is from about 1.0 to about 5.0 (more preferably 1.0–3.0, most preferably 1.0–2.0);

(2) the weight average molecular weight of the emulsifying agent(s) has a value of from about 558 to about 2504 (more preferably from about 646 to about 1844, most preferably from about 866 to about 1404);

(3) that at least 50% by weight (more preferably at least about 70% by weight, most preferably at least about 85% by weight) of the emulsifying agent comprises the ethoxylated alkylphenol compound having a molecular weight of from about 558 to about 2504; and (4) the temperature of the emulsifying composition (and hydrocarbon) is from about 35° F. to about 170° F.

It has been discovered that if the temperature of the emulsifying composition, or hydrocarbon plus emulsifying composition, including those emulsifying agent(s) selected from the ethoxylated alkylphenol compounds represented by general formula (7), is above about 170° F., oil-in-water emulsion(s) do not form, unless the emulsifying agent(s) selected from the ethoxylated alkylphenol compounds represented by general formula (7) are admixed with or otherwise combined with emulsifying agent(s) selected from those ethoxylated alkylphenol compounds having general formula (8). As was previously mentioned, the combination or admixture of the ethoxylated alkylphenol compounds having the general formula (7) and the ethoxylated alkylphenol compounds having the general formula (8) comprises from about 60% by weight to about 85% by weight (more preferably 70% to 80% by weight) of the ethoxylated alkylphenol compounds having the general formula (7), and from about 15% by weight to about 40% by weight (more preferably 20% to 30% by weight) of the ethoxylated alkylphenol compounds having the general formula (8). By the admixing or the otherwise combining of the ethoxylated alkylphenol compounds having general formula (7) with the ethoxylated alkylphenol compounds having general formula (8), the temperature of the emulsifying composition (or the emulsifying composition plus hydrocarbon) may be as high as the boiling point temperature of the emulsifying composition (or the emulsifying composition plus hydrocarbon) which typically is about 212° F., depending on the subterranean pressure, the exact consistency (and the mixing proportion of the various constituencies) of the emulsifying composition and the hydrocarbon, etc.

As will be more thoroughly discussed hereinafter in the Examples for the other more preferred emulsifying agents comprising the mixture or combination of the emulsifying agent(s) represented by the general formula (7) and the general formula (8), the time to form quality oil-in-water emulsions utilizing the mixture or combination of the emulsifying agent(s) represented by the general formula (7) and/or with the emulsifying agent(s) represented by the general formula (8) is commercially acceptable (i.e., if formed within 0.10 to 20 secs.) provided that the following parameters are conformed to or are followed:

(1) the dispersity of the molecular weight distribution for the emulsifying agent(s) represented by general formula (7) is from about 1.0 to about 5.0 (more preferably 1.0–3.0, most preferably 1.0–2.0);

(2) the weight average molecular weight of the emulsifying agent(s) represented by general formula (7) has a value of from about 558 to about 2504 (more preferably from about 646 to about 1844, most preferably from about 866 to about 1404);

(3) that at least 50% by weight (more preferably at least about 70% by weight, most preferably at least about 85% by weight) of the emulsifying agent comprises the ethoxylated alkylphenol compound represented by general formula (7) having a molecular weight of from about 558 to about 2504; and (4) the dispersity of the molecular weight distribution for the emulsifying agent(s) represented by general formula (8) is from about 1.0 to about 5.0 (more preferably 1.0–3.0, most preferably 1.0–2.0);

(5) the weight average molecular weight of the emulsifying agent(s) represented by general formula (8) has a value of from about 2458 to about 4218 (more preferably from about 2898 to about 3778, most preferably from about 3118 to about 3558);

(6) that at least 50% by weight (more preferably at least about 70% by weight, most preferably at least about 85% by weight) of the emulsifying agent comprises the ethoxylated alkylphenol compound represented by general formula (8) having a molecular weight of from about 2458 to about 4218;

(7) $n_1$ in general formula (8) is from about 9 to about 14, as if $n_1$ is below 9 or above 14, it has been discovered that oil-in-water emulsions of commercial acceptability do not generally form; and (8) from about 60% by weight to about 85% by weight of the mixture or combination is the emulsifying agent(s) represented by general formula (7), and if less than 60% by weight or greater than 85% by weight of the emulsifying agent(s) represented by general formula (7) is employed, it has been discovered that oil-in-water emulsions of commercial acceptability do not generally form.

The emulsifying agent(s) used in the practice of the invention must enable formation of the oil-in-water emulsion(s) at elevated temperatures and retention of stability at ambient temperatures. Unless broad-based for such functionality, a mixture of two or more emulsifiers is employed, and is particularly preferred.

As has been previously stated, the emulsifying agent(s) of this invention has to be mixed with a water or the pipeline-transportable oil-in-water emulsion(s) of this invention cannot be formulated. The emulsifying agent(s) should not contact the produced hydrocarbon crude directly before being admixed with water. Stated alternatively, the emulsifying composition(s) of this invention which is to be admixed or combined with the produced hydrocarbon crude have to contain water, or the oil-in-water emulsion(s) of this invention will not be produced to be pipeline-transportable.

As has also been previously stated, the freezing point of the emulsifying composition(s) and/or the oil-in-water emulsions may be lowered by the addition of a compound which lowers the freezing point of water, which for the purpose of this invention is preferably ethylene glycol. The oil-in-water emulsion(s) of this invention are water continuous and through the addition of ethylene glycol into the emulsifying composition(s), the freezing point of the continuous phase (i.e. water) of the oil-in-water emulsion(s) is lowered. Preferably, ethylene glycol is added to the emulsifying composition(s) such that the emulsifying composition(s) and/or the water continuous phase of the oil-in-water emulsion(s) comprise from about 0.5% by wt. to about 80% by wt. ethylene glycol, more preferably from about 0.5% by wt. to about 30% by wt.

In order to form a more stable oil-in-water emulsion (or water continuous emulsion) when the produced hydrocarbon crude is Athabasca bitumen, the water or aqueous phase preferably has a pH of above 4.0, preferably from about 6.0 to about 13.0, such as 7 to 9 and 6 to 8. This is especially true when brine is employed as the aqueous phase. If brine is being utilized, salinity becomes another factor. It has been found that with brine as the aqueous additive for the produced hydrocarbon crude, the salinity of the brine should be at least about 1.5% by wt. salt (i.e. NaCl). It should be pointed out that no upper limit on salt concentration has been determined and may be that quantity of salt which supersaturates the brine, or that upper amount of salt which goes into solution.

More stable oil-in-water emulsion(s) are formed, especially when the produced hydrocarbon crude is Athabasca bitumen, with the use of the biopolymer xanthan which is an additional stability enhancer. Biopolymer xanthan is added to the emulsifying composition(s) such that the emulsifying composition(s) and/or the water continuous phase of the oil-in-water emulsion(s) such that the oil-in-water emulsion(s) comprises biopolymer xanthan in a ratio of from about 25 ppm to about 5,000 ppm by weight of the produced hydrocarbon crude. Stated alternatively, biopolymer xanthan is provided in a concentration of from about 25 to about 5,000 ppm by weight of the produced hydrocarbon crude.

Xanthan has outstanding resistance to shear degradation, and is insensitive to waters with high salt content. Xanthan contains D-glucose, D-mannose, and D-glucuronic acid. It is believed to have a cellulose-like backbone composed of repeating $\beta$-D-(1-4) glucose units with mannose and glucuronic acid present in side chains, and mannose partially modified with acetyl and pyruvate ketol groups.

Xanthan molecular weight is reported to be greater than one million. The biopolymer exists in solution as a helix in native form. The presently accepted structure for xanthan is as follows:

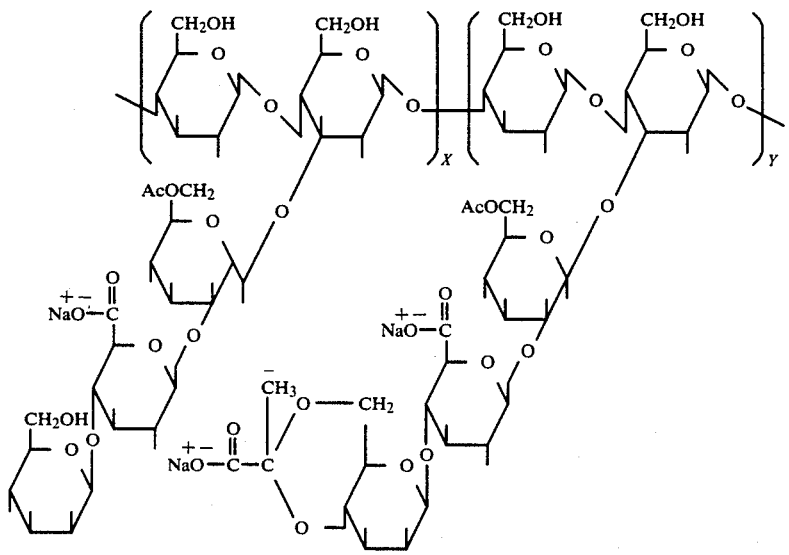

Biopolymer xanthan may be purchased commercially as FLOCON ® Biopolymer 4800 from Pfizer Inc.

In another embodiment of the present invention, the viscosity of the effluent oil-in-water emulsion(s) through and/or from conduit 110, or in the emulsion tank 122, may be controlled and/or reduced to facilitate the transportation of the oil-in-water emulsion(s) of this invention. This result is achieved by tailoring the droplet size distribution in the produced oil-in-water emulsion. Lower viscosity for the oil-in-water emulsion(s) reduces the power required for pipeline pumping operations, and also decreases the stress placed on the oil-in-water emulsion(s) which could cause oil droplets in the oil-in-water emulsion(s) to coalesce and increase in size. Formation of water continuous emulsions with a tailored oil droplet size, results in a lower emulsion viscosity for the effluent oil-in-water emulsion(s).

The viscosity of a suspension of oil particles or oil droplets is a function of the viscosity of the water continuous phase, the concentration of the oil particles, and the distribution of oil particle size. An approximation of the viscosity of an oil-in-water emulsion is given by the following equation:

$$M = M_o \exp \frac{2.5\phi}{1 - (\phi/\phi_p)}$$

where
- $M$ = oil-in-water emulsion viscosity (cs)
- $M_o$ = viscosity of the water continuous phase (cs)
- $\phi$ = volume fraction of the dispersed oil phase
- $\phi_p$ = maximum packing fraction for the emulsion oil droplet size distribution The equation illustrates that the viscosity of an oil-in-water emulsion may be reduced if the oil droplet size distribution results in a larger maximum packing fraction. This reduction may be accomplished by forming the oil-in-water emulsion such that a wide range of oil droplet sizes results, or by the formation of a bimodal oil droplet size distribution. By way of example only, in comparision to a monodisperse oil-in-water emulsion with $\phi=0.5$, a bimodal oil-in-water emulsion with an oil droplet size ratio of 5 to 1 theoretically has a viscosity reduced by a factor of about 10, assuming spherical and non-interacting oil particles.

The viscosity of the effluent oil-in-water emulsion(s) of the present invention may be controlled and/or reduced by varying the flow rate (and the shear rate) of the mixture of emulsifying composition(s) and the produced hydrocarbon crude through the static shearing and mixing device 108; or alternatively, by splitting (as illustrated FIG. 2) the flow of the mixture of emulsifying composition(s) and produced hydrocarbon crude in conduit 50 into conduit 130 and conduit 132, and flowing the respective split mixture through the conduit 130 and conduit 132 at distinguishable or different shear rates [shear rate (8×velocity in inches/sec.) divided by static mixer diameter in inches]. In order to control these two flow rates and to ensure that the respective shear rates are distinguishable or different, flow rate control valve 134 and flow rate control valve 136 are provided within conduit 130 and 132, respectively. Valves 134 and 136 may be set and controlled such that the shear rates of the respective mixtures of the emulsifying composition(s) and produced hydrocarbon crude through static shearing and mixing means 108A and 108B are indeed different. The shearing and mixing means 108A and 108B may have the same or different diameter. The respective effluent oil-in-water emulsion(s) from static shearing and mixing means 108A and 108B are conducted or transported through conduits 138 and 140, respectively, and into the conduit 110 of FIG. 1 wherethrough the two admixed or combined mixtures are sent to the emulsion tank 122 (see FIG. 1). As illustrated in FIG. 1, before settling into the emulsion tank 122, the temperature of the two admixed emulsion mixtures should be reduced below about 120° F. with heat exchanger 120 in order to increase the stability of the formulated bimodal or multimodal oil-in-water emulsion(s) that has a lower viscosity than either the viscosity of the effluent oil-in-water emulsion(s) in conduit 138 or the viscosity of the effluent oil-in-water emulsion(s) conduit 140. The viscosity of the formulated bimodal oil-in-water emulsion(s) comprising the two effluent oil-in-water emulsion(s) from conduits 138 and 140 is not the average or mean of the viscosity of the two effluent oil-in-water emulsion(s) in conduits 138 and 140, but is lower than either. It is to be understood that while only a pair of parallel static shearing and mixing devices 108A and 108B have been illustrated and represented, three (3) or more parallel devices may be employed within the spirit and scope of this invention.

A bimodal or multimodal oil-in-water emulsion(s) may also be formed in the emulsion tank 122 by varying the flow rate (and the shear rate) of the mixture of emulsifying composition(s) and produced hydrocarbon crude through the static shearing and mixing device 108, and collecting the effluent oil-in-water emulsion(s) produced from the static shearing and mixing device 108 at various flow (and shear) rates in the emulsion tank 122. The collected effluent oil-in-water emulsion(s) produced from various flow rates through device 108 mix and combine in the emulsion tank 122 to form bimodal or multimodal oil-in-water emulsion(s) having a lower viscosity than the viscosity of oil-in-water emulsion(s) produced from the static shearing and mixing device 108 with one flow (and shear) rate. Thus, by way of example only, the viscosity of a bimodal oil-in-water emulsion(s) produced by flowing a mixture of emulsifying composition(s) and produced hydrocarbon crude through device 108 at 50 in./sec. for 10 minutes, and combining resulting oil-in-water emulsion(s) with the oil-in-water emulsion(s) formulated from subsequently flowing the same mixture through the device 108 at 30 in./sec. for 10 minutes, would be lower than the respective viscosities of the oil-in-water emulsion(s) produced at 50 in./sec. or 30 in./sec.

The size of the oil droplets in the oil-in-water emulsion(s), or in the bimodal oil-in-water emulsion(s), of the present invention tend to increase in size during flow through a pipe, such as pipeline 123. This effect could change the benefits of this invention by changing the oil droplet size distribution through augmentation of the size of oil droplets. To maintain within the pipeline 123, or the like, a bimodal or multimodal nature of the oil-in-water emulsion(s), or to even initially unimodal produce a bimodal or multimodal oil-in-water emulsion(s) from a oil-in-water emulsion, a stream of the multimodal oil-in-water emulsion(s) or the unimodal oil-in-water emulsion(s) may be withdrawn periodically from the pipeline 123, such as through a conduit 142 as illustrated in FIG. 3, and subjected to static shearing and mixing through the use of a flow rate control valve 144 and the static shearing and mixing device 108. As depicted in FIG. 3, flow rate control valve 144 would control the flow rate of any multimodal or unimodal emulsion(s) through the device 108 to reduce the size of the oil droplet within the particular type of emulsion(s) such that when the effluent oil-in-water emulsion(s) exiting the device 108 through a conduit 146 that is in communication with the pipeline 123 is recombined with the stream of flowing oil-in-water emulsion(s) that has by-passed conduit 142, the bimodal or multimodal nature of the oil-in-water emulsion(s) is re-established. Valve 148 is a variable flow rate valve that restricts the flow of oil-in-water emulsion(s) therethrough such that some of the oil-in-water emulsion(s) flowing through pipeline 123 is forced to flow through conduit 142. Valve 150 would control the flow of oil-in-water emulsion(s) and effluent oil-in-water emulsion(s) (from device 108) through the conduit 146. This withdrawal process may be conducted as many times as necessary along the pipeline 123 to maintain water continuous emulsion(s) which have a lower viscosity than if the withdrawal process was not employed. Instead of using static shearing and mixing device 108 in the withdrawal process in order to maintain lower viscosity in the flowing oil-in-water emulsion(s), a centrifugal pump (of the type used in commercial pipelines) may be utilized to reshear the flowing oil-in-water emulsion(s). Any of the mixing and/or reshearing step(s) may be accompanied by the addition of more emulsifying composition(s) if needed.

In another embodiment of the present invention, a bimodal or multimodal oil-in-aqueous phase emulsion(s) may be formed with any of the emulsifying agent(s) of the present invention by varying the residence times and/or the shear rate of the mixture of emulsifying composition(s) and produced hydrocarbon crude in any suitable dynamic shearer and mixer (e.g. a rotor stator mixer, etc.), and collecting the effluent oil-in-aqueous phase emulsion(s) emanating from the dynamic shearer and mixer at various residence times and/or shear rates in any suitable tank or container, such as emulsion tank 122. The collected effluent oil-in-aqueous phase emulsion(s) produced from various residence times and/or shear rates in any suitable dynamic shearer and mixer combine in the emulsion tank 122 to form bimodal or multimodal oil-in-aqueous phase emulsion(s) having a lower viscosity of oil-in-aqueous phase emulsion(s) produced from one dynamic shearer and mixer having a fixed shear rate and/or residence time of the emulsifying composition(s) and the produced hydrocarbon crude in the dynamic shearer and mixer; or from the static shearing and mixing device 108 with one flow (and shear) rate. Thus, by way of example only, the viscosity of a bimodal oil-in-aqueous phase emulsion(s) produced by positioning for 4 secs. a mixture of emulsifying composition(s) and produced hydrocarbon crude in a dynamic shearer and mixer having a shear field intensity of 500 sec.$^{-1}$, and combining the resulting oil-in-aqueous phase emulsion(s) with the oil-in-aqueous phase emulsion(s) formulated from subsequently positioning for 4 secs. the same mixture in the same dynamic shearer and mixer having a shear field intensity of 6,000 sec.$^{-1}$, would be lower than the respective viscosities of the oil-in-aqueous phase emulsion(s) produced with an intensity of 500 sec.$^{-1}$ or 6,000 sec.$^{-1}$. Similar results can be obtained by varying the residence time while holding the shear field intensity generally constant or fixed. In this embodiment of the present invention, a bimodal or multimodal oil-in-aqueous phase emulsion(s) may be formed with two or more dynamic shearers and mixers in parallel, or with one (or more) dynamic shearers and mixers in parallel with one (or more) static shearing and mixing device, such as device 108. The collected effluent oil-in-aqueous phase emulsions produced from the two (or more) dynamic shearers and mixers having different shear rates (or shear field intensities) and/or with different residence times for the mixture of emulsifying composition(s) and hydrocarbon crude in the respective dynamic shearers and mixers combine to form bimodal or multimodal oil-in-aqueous phase emulsion(s) having a lower viscosity than the viscosity of oil-in-aqueous phase emulsion(s) produced from any one of the two (or more) dynamic shearers and mixers. Similarly, the collected effluent oil-in-aqueous phase emulsions produced from one (or more) dynamic shearers and mixers in parallel with one (or more) static shearing and mixing devices combine to form bimodal or multimodal oil-in-aqueous phase emulsion(s) having a lower viscosity than the viscosity of oil-in-aqueous phase emulsion(s) produced from any single one dynamic shearer and mixer or from any single one static shearing and mixing device. Typically, each dynamic shearer and mixer has a different shear rate (or shear field intensity) and/or the residence times of the emulsifying composition-crude mixture in each dynamic shearer and mixer are distinct from each other. Typically further, each static shearing and mixing device has or produces a different shear rate from the other static shearing and mixing devices. Thus, by way of example only, a bimodal or multimodal oil-in-aqueous phase emulsion may be produced by positioning for a generally known period (e.g. 0.10 sec. to 5 mins. or higher) a portion of an emulsifying composition-hydrocarbon crude mixture in a first dynamic shearer and mixer having a predetermined or known shear rate (e.g. a shear field intensity from 50 sec.$^{-1}$ to about 10,000 sec.$^{-1}$ or higher) to produce a first oil-in-aqueous phase emulsion having a first viscosity, leaving a remaining portion of the emulsifying composition-hydrocarbon crude mixture that has not been positioned in the first dynamic shearer and mixer. The remaining emulsifying composition-hydrocarbon crude mixture is positioned for a generally known period of time in a second dynamic shearer and mixer (or passed through a static shearing and static mixing device at a predetermined velocity for a predetermined period of time). The second dynamic shearer and mixer has a shear rate that is different from the shear rate of the first dynamic shearer and mixer, and produces a second oil-in-aqueous phase emulsion having a second viscosity. When the first oil-in-aqueous phase emulsion is mixed or commingled with the second oil-in-aqueous phase emulsion, an oil-in-aqueous phase emulsion is produced having a viscosity lower than the first viscosity of the first oil-in-aqueous phase emulsion and lower than the second viscosity of the second oil-in-aqueous phase emulsion. The one or more dynamic shearers and mixers and/or one or more static shearing and mixing devices may be in any relationship to each other, such as in parallel or in series.

The static shearing and mixing device 108 (and 108A and 108B) of this invention may be any static, in-line mixer that is capable of producing the oil-in-water emulsion(s) of the invention. Not any static, in-line mixer may be capable of this production. We have discovered that suitable static shearing and mixing devices 108, 108A, and 108B for this invention are those that employ a stationary baffle means installed within a pipe, conduit, or the like, such that the energy of the flowing mixture of emulsifying composition(s) and produced hydrocarbon crude produces the required shearing and mixing to produce the oil-in-water emulsion(s). The stationary baffle means may not be just any baffle means which may give unpredictable mixing efficiency as equipment size and flow conditions change. Also, just any baffle means may provide appreciable shearing and mixing only under turbulent flow conditions, whereas the oil-in-water emulsion(s) of this invention are to be produced under both laminar and turbulent flow conditions.

The static shearing and mixing devices 108, 108A and 108B of this invention are to employ a baffle means that provides precise geometric paths for fluid flow in order to obtain consistent, predictable mixing performance, regardless of the flow rate of the mixture of emulsifying composition(s) and produced hydrocarbon crude, or equipment dimensions. Preferred static shearing and mixing devices 108, 108A and 108B have been determined to be certain of the motionless mixers manufactured by Komax Systems Inc., Long Beach, Calif. and Koch Engineering Company, Inc., Wichita, Kans. The motionless mixers produced by these two companies and suitable in the process of the present invention to produce the oil-in-water emulsion(s) employ a baffle means in a conduit that shears and mixes simultaneously. Similar designs by other manufactures may work equally well.

Figure 5:
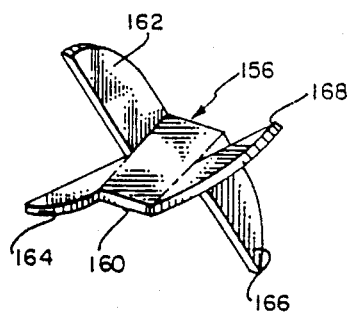
FIG. 5 is a perspective view of one baffle element for the static mixing device of FIG. 4.
Figure 6:
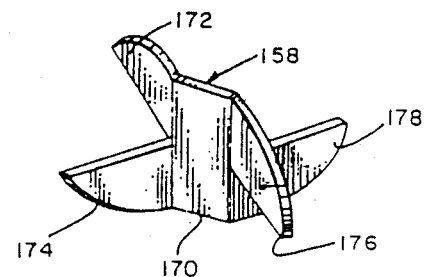
FIG. 6 is a perspective view of another baffle element for the static mixing device of FIG. 4.

A preferred static shearing and mixing device 108 (or 108A or 108B) manufactured by Komax Systems, Inc. is illustrated in FIGS. 4, 5, 6, and 7, and is more particularly described and illustrated in U.S. Pat. No. 3,923,288 which is incorporated herein by reference. Referring in detail now to FIGS. 4-6, there is seen one embodiment for the static shearing and mixing device 108 (or 108A or 108B) of this invention which comprises a conduit 152 having an internal chamber 154 in which a plurality of baffle elements, generally illustrated as 156 and 158, are sized and fitted. Internal chamber 154 is open at the two ends of the conduit 152 such that the mixture of emulsifying composition(s) and produced hydrocarbon crude may pass over and through the plurality of baffle elements 156 and 158 to effect the required shearing and mixing to produce the oil-in-water emulsion(s). A longitudinal axis passes through the length of the chamber 154 which has a generally cylindrical configuration as is illustrated in FIG. 4. Baffle element 156 is shown in greater detail in FIGS. 5 and 7 and is the mirror image of baffle element 158 which is shown in greater detail in FIGS. 6 and 7.

Baffle element 156 comprises a flat generally rectangular central portion 160, the plane of which is to be generally aligned with the longitudinal axis of the chamber 154. A first set of ears 162 and 164 are integrally bound to one side of the central portion 160, and are arcuate and configured at their outer peripheries for a general fit against the internal wall of the chamber 154. The first set of ears 162 and 164 are bent respectively in an upward and downward direction relative to the plane of the central portion 160. A second set of ears 166 and 168 are integrally bound to the opposite side of the central portion 160, and like the first set of ears 162 and 164, are bent upward and downward relative to the plane of the central portion 160. Ears 162 and 168 are located diagonally opposite one another across the central portion 160 and are bent in the same direction relative to the plane of the central portion 160. Likewise, ears 164 and 166 are also located diagonally opposite one another across the central portion 160 and are also bent in the same direction relative to the plane of the central position 160. The outside peripheral edges of the ears 166 and 168 are also arcuate and configured for a general fit to the wall of the chamber 154.

Baffle element 158 as was previously indicated is a mirror image of the baffle element 156, and in a similar manner comprises a central portion 170, a first set of ears 172 and 174, and a second set of ears 176 and 178. Ears 172 and 178, as well as ears 174 and 176, are diagonally positioned across the central portion 170 with respect to one another and are bent in the same direction relative to the plane of the central portion 170.

The angle between ears 162-164, 166-168, 172-174, and 176-178 may be any suitable angle that can provide the shearing and mixing of the mixture of emulsifying composition(s) and produced hydrocarbon crude to produce the oil-in-water emulsion(s) of this invention. Preferably, the angle between the respective set of ears is from about 30° to about 120°.

In a preferred embodiment for the mixing device 108 in FIGS. 4-7, a plurality of baffle elements 156 and 158 are employed in the conduit 152 in an alternating fashion, as illustrated in FIG. 4. The baffle elements 156 and 158 may be spacedly positioned with respect to each other, or preferably, as illustrated in FIG. 4, in an abutting relationship with respect to each other.

Figure 7:
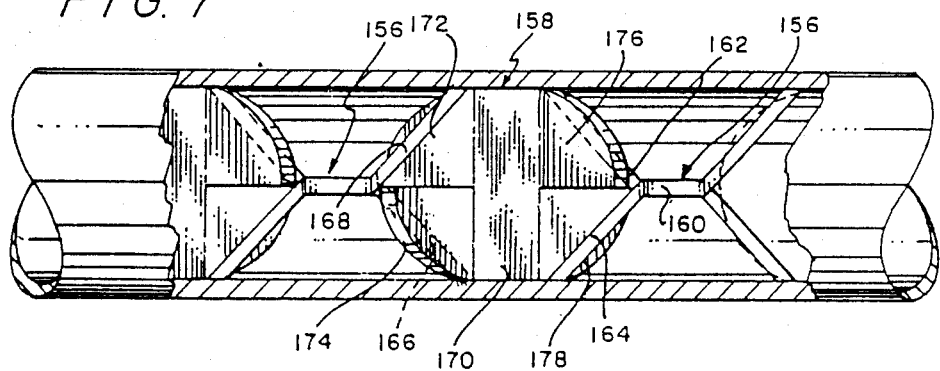
FIG. 7 is a cut-away plan view of the static mixing device of FIG. 4.

When the baffle elements 156 and 158 are in an abutting relationship, ears 172 and 174 of baffle element 158 inter-mesh and/or overlap with ears 166 and 168 of baffle element 156. Similarly, ears 162 and 164 of element 156 inter-mesh and/or overlap with ears 176 and 178 of element 158; all as illustrated in FIG. 7. The total number of baffle elements 156 and 158 used depends on the viscosity of the produced hydrocarbon crude and the degree of mixing desired for the emulsifying composition(s) and the produced hydrocarbon crude. Typically, 6 to 8 baffle elements would be employed in the conduit 152.

When at least one each of the baffle elements 156 and 158 are installed in conduit 152 in an abutting relationship, there is a shearing and a mixing action taking place on the mixture of emulsifying composition(s) and produced hydrocarbon crude that is being passed in direction of the arrow in FIG. 1 through the conduit 152. A counter-clockwise velocity vector or rotational vector is imposed by ears 166 and 168 of element 156 to back-mix the emulsifying composition(s) and the produced hydrocarbon crude and eliminate the streaming or tunneling effects that can occur with conventional static mixers. The central flat portion 160 transforms the counter-clockwise or rotational vector to a lateral or radial vector. After the mixture of emulsifying composition(s) and the produced hydrocarbon crude passes the central flat portion 160, ears 162 and 164 impose an additional counter-clockwise or rotational velocity to the mixture which adds somewhat to the lateral or radial vector that is being produced by the central flat portion 160. Ears 162 and 164 impose a substantially outward directed radial velocity vector, whereas ears 166 and 168 impose a substantially inward directed radial velocity vector, on the mixture of emulsifying composition(s) and produced hydrocarbon crude that is moving longitudinally through the conduit 152. When the mixture leaves baffle element 156 and is passed over baffle element 158, the ears 176 and 178 and 172 and 174 impose both a clockwise rotating velocity vector, as well as a generally inward and outward radial vector, respectively.

FIGS. 8-12 shows another embodiment for the baffle means which is to be fitted into the conduit 152 having the chamber 154 to define the static shearing and mixing device 108. The baffle means of FIGS. 8-12 comprises a plurality of generally identical baffle elements, each generally illustrated as 180, that are interbound with one another.

Figure 9:
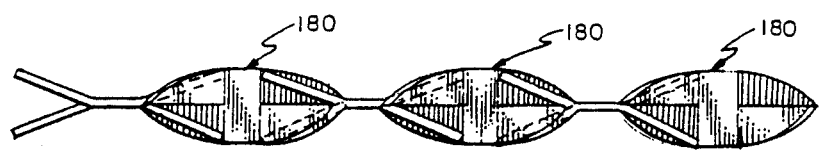
FIG. 9 is a partial perspective view of three interconnected baffle elements for the static mixing device of FIG. 8.

Each baffle element 180 comprises a central part 182 which is flat and generally rectangular with a plane that is to be generally aligned with the longitudinal axis of the chamber 154. Each baffle element 180 also comprises a flat generally rectangular first part 184 and a flat generally rectangular second part 186. The respective planes of the first part 184 and the second part 186 are generally normal with the longitudinal axis of the chamber 154 and the plane of the central part 182. When the baffle elements 180 connect with one another, the first part 184 of one baffle element 180 attaches integrally to the second part 186 of another baffle element 180, as illustrated in FIG. 9.

Figure 8:
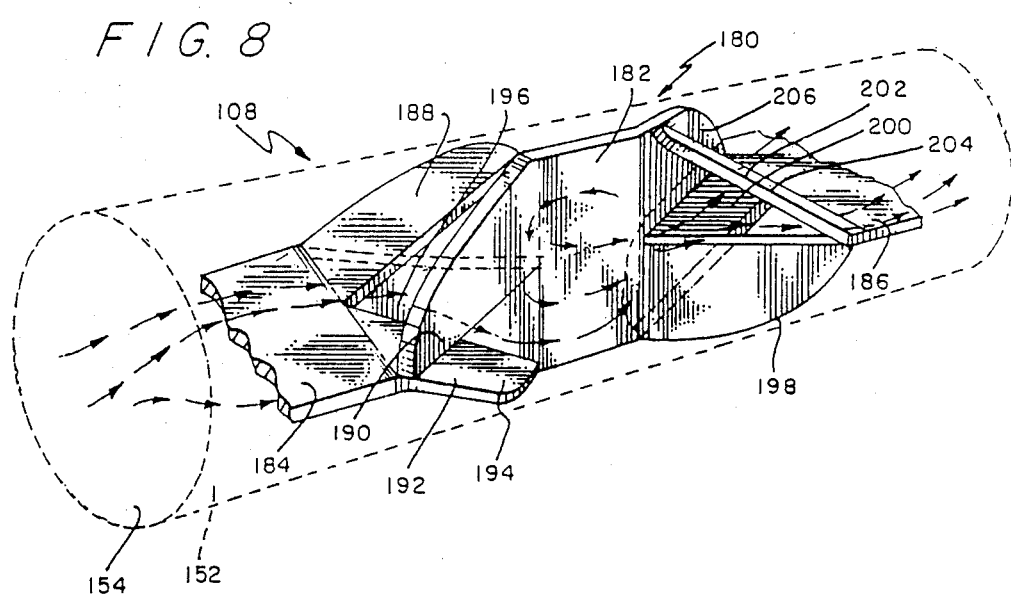
FIG. 8 is a partially cut-away perspective view of another embodiment of the static mixing device for the present invention.

Each baffle element 180 also comprises a first pair of arms 188 and 190 forming a generally V-shape and extending from one half (i.e. the upper half relative to when the central part 182 is situated as in FIG. 8) of the central part 182 to the first part 184 where it binds therewith. A channeling member, generally illustrated as 192, extends from the first part 184 to another half (i.e. the lower half relative to when the central part 182 is situated as in FIG. (8) of the central part 182. The channeling member 192 includes a base 194 and a channeling partition 196 that secures to and is generally normal to the base 194, and attaches to the other half of the central part 182. As illustrated in the drawings, there is one opening above the partition 196 and underneath arm 188, and another opening between the base 194 and underneath the arm 190.

Between the second part 186 and the central part 182 on the other side of the central part 182 is an inverted mirror image of the pair of arms 188–190 and the channeling member 192 including the base 194 and the partition 196. More specifically, on the other side of the central part 182 there is seen a second pair of arms 198 and 200 forming a generally V-shape and extending from one-half (i.e. the lower half relative to when the central part 182 is situated as in FIG. 8) of the central part 182 to the second part 186 where they bind thereto. A channeling member, generally illustrated as 202, extends from the second part 186 to another half (i.e. the upper half relative to when the central part 182 is situated as in FIG. 8) of the central part 182. Similar to channeling member 192, channeling member 202 comprises a base 204 and a channeling partition 206 that is bound to the base 204 in a normal relationship, and attaches to the other half of the central part 182. There is one opening below the partition 206 and above the arm 200, and another opening between the base 204 and above the arm 198.

FIG. 13 represents another embodiment of an end for each of the baffle elements 180. In this embodiment, the channeling member 192 is positioned on the opposite side of the central part 182. The first pair of arms 188 and 190 form a generally V-shape and extend to the upper half of the central part 182 and binds therewith. The channeling member 192 extends from the first part 184 down to the lower half of the central part 182 and comprises the base 194 and the channeling partition 196 that attaches normally to the base 194. Partition 196 also attaches to central part 182 and tapers towards and attaches to the first part 184 as well as the arm 188. There is an opening above the partition 196 and below the arm 188, and another opening between the base 194 and below the arm 190.

Figure 10:
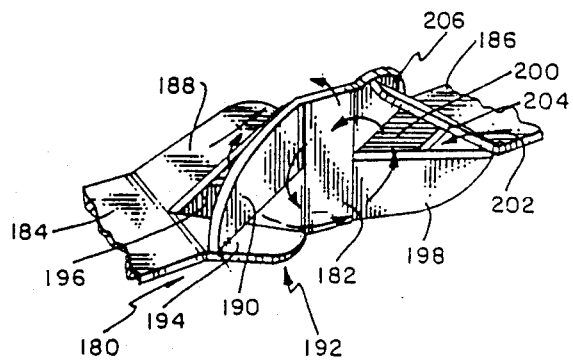
FIG. 10 is a partial perspective view of a baffle element for the static mixing device of FIG. 8 with the direction of the arrows representing back-mixing action for the mixture of produced hydrocarbon crude and emulsifying composition(s)
Figure 11:
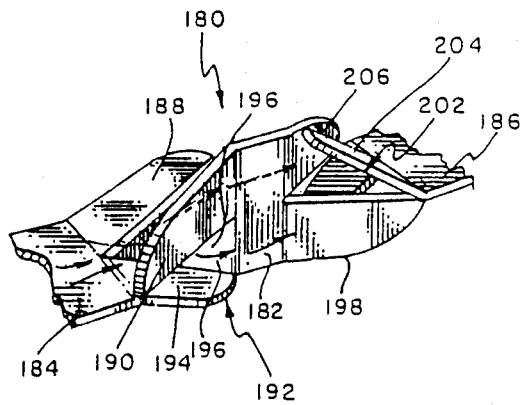
FIG. 11 is a partial perspective view of the baffle element for the static mixing device of FIG. 8 with the direction of the arrows representing a splitting action for the mixture of produced hydrocarbon crude and emulsifying composition(s)

By employing the baffle element 180 within the conduit 152, it is believed that a number of mixing actions are provided for the mixture of emulsifying composition(s) and produced hydrocarbon crude. A dividing action for the mixture is provided between the opening above the partition 196 and underneath arm 188 and the opening between the base 194 and underneath the arm 190 (see FIG. 11). A cross-current mixing is also provided by the same two openings as illustrated in FIG. 12. Another mixing action is illustrated in FIG. 10 and is back-mixing and counter-rotating vortices. Eliptical vortices rotating in opposite directions are produced on both sides of the central part 182 and eliminates the streaming or tunneling effects associated with other static mixing devices. In back-mixing, the mixture of emulsifying composition(s) and produced hydrocarbon crude is orbited in the vortex from the front to the back of an element before continuing downstream.

Another embodiment of the static mixing device 108 which can be employed in the process of this invention is manufactured by Koch Engineering Company, Inc., Wichita, Kans. and is illustrated in FIGS. 14 and 15. This embodiment of the static mixing device 108 is more particularly described in U.S. Pat. No. 3,785,620 which is incorporated herein by reference thereto. The static mixing device 108 for this embodiment of the invention comprises a plurality of baffle elements 208A and 208B which are substantially identical to each other. Baffle elements 208A and 208B are aligned within the conduit 152 in a contiguous generally abutting relationship with each baffle element 208B offset at approximately 90° relative to each baffle element 208A (see in FIG. 14 where the baffle elements 208A and 208B are spacedly positioned for clarity).

Referring to FIG. 15, each baffle element 208A and 208B has corrugated lamellas 210 which are welded to one another to form the particular baffle element, either 208A or 208B. As shown, different sizes or lengths of individual lamellas 210 are used which increase from the two outsides toward the middle so that a generally cylindrical shape results. The lamellas 210 are in a parallel relationship to the longitudinal axis of the conduit 152 and are preferably made of a sheet metal which does not corrode when contacted with the produced hydrocarbon crude and emulsifying composition(s). The corrugations of each lamella 210 are of substantially equal slope, with about 45° being the preferred slope of each corrugation such that when the corrugated lamellas 210 are adjoined to one another (such as by welding), a plurality of open, intersecting channels at 45° to the longitudinal axis of the conduit 152 is formed.

The mixture of produced hydrocarbon crude and emulsifying composition(s) enter the conduit 152 and are split into individual streams in the series of open, intersecting channels for fluid flow. These channels provide strong transversal flow and fluid exchange at the wall of the conduit 152. At each channel intersection, a part of the mixture of produced hydrocarbon crude and emulsifying composition(s) shears off into the crossing channel.

As was previously indicated, baffle elements 208A and 208B are positioned 90° relative to each other, so two-dimensional mixing takes place over the first baffle element (i.e. either 208A or 208B) and three-dimensional mixing over all successive baffle elements. Three-dimensional mixing ensures uniformity in the produced oil-in-water emulsion(s) leaving the conduit 152. Thus, the baffle elements 208A and 208B suitably mix the mixture of produced hydrocarbon crude and emulsifying composition(s) in longitudinal and transverse directions by directing the part-flows of the mixture in a plurality of criss-crossing zig-zag paths through the length of the baffle elements 208A and 208B. The various mixing actions obtained are such that oil-in-water emulsion(s) is easily and rapidly obtained over a relative short length for conduit 152.

Through the use of the emulsifying agents in combination with other features of the invention, oil-in-water emulsion(s) are formulated which contain a strong shear stability, enabling them to be suitable candidates for the pipeline transport of produced hydrocarbon crude, especially for Athabasca bitumen. One physical disadvantage inherent in Athabasca bitumen is its very high viscosity (e.g. about 20,000 cp at 100° F.; 300 cp at 200° F.). This physical fact imposes that the transport of this raw material by conventional pipeline at ambient temperatures is impossible. The alternative use of a diluent naphtha, or the like, is unsuitable due to the cost and long-term availability. The ability to transport Athabasca bitumen over long distances by conventional pipeline technology to existing facilities would reduce the production costs required for on-site upgrading of this petroleum source. The oil-in-water emulsion(s) formed in accordance with the invention are thermally stable and exhibit a strong shear stability.

The static shearing and mixing device 108 may be used to control the oil droplet size in the oil-in-water emulsion(s) of this invention. Generally, the further an oil-in-water emulsion(s) has to be transported through a pipeline, the smaller the oil droplet size in the oil-in-water emulsion(s) should be since the oil droplets in the oil-in-water emulsions tend to coalesce and augment as the emulsion(s) travel through a pipeline.

The intensity of the shear field on the mixture of emulsifying composition(s) and produced hydrocarbon crude within the static shearing and mixing device 108 is proportional to the rate of flow of the mixture through the device 108. As the shear rate (and the rate of flow) is increased through the operating range, the size of oil droplets from the produced hydrocarbon crude become progressively smaller. The shear rate or the rate of flow of the mixture of emulsifying composition(s) and produced hydrocarbon crude through the mixer should be large enough to impart sufficient shear on the mixture to produce an oil-in-water emulsion(s), but not too large as chaotic mixing can cause the oil droplets to recoalesce before being stablilized in the water continuous phase of the oil-in-water emulsion. In a preferred embodiment of the invention, the flow rate of the mixture of the emulsifying composition(s) and the produced hydrocarbon crude through the device 108 is from about 20 in./sec. to about 140 in./sec.

The oil droplet size within an oil-in-water emulsion(s) may be predicted by following equation:

$$d = CD^a N_{we}^{-b}$$

where d is the volumetric mean oil droplet size in microns; C is a constant ranging from about 750 to about 1,500, and represents a multiplier contributing to the absolute disposition in volumetric mean droplet size of the oil; D is the internal diameter in inches for the device 108; $N_{we}$ is the dimensionless Weber Number for the fluid flowing through the device 108 and ranges from about 50 to about 30(10$^6$); a is an exponent which is from about 0.3 to about 1.2, preferably about 0.6; and b is also an exponent ranging value from about 0.2 to about 0.8, preferably about 0.4. The exponents a and b are constants, which account for the relative variation in the volumetric means droplet size of the oil.

$N_{we}$ is the Weber Number, a commonly used dimensionless number relating shear forces imparted on the oil droplet to the cohesive forces holding the oil drop together, defined as $$N_{we} = \frac{.263 \, Dv^2 p}{\sigma}$$

where D is the internal diameter in inches of device 108; v is the velocity in inches per second of the fluid flowing through the device 108; p is the oil-in-water emulsion density in lbs. per cubic foot; $\sigma$ is the interfacial tension for the oil-in-water emulsion in dynes per cubic centimeter. The oil-in-water emulsion density p ranges from about 40 lbs./ft$^3$ to about 70 lbs./ft$^3$. The interfacial tension for the oil-in-water emulsion ranges from about 0.25 dynes/cm.$^3$ to about 25 dynes/cm$^3$. For a further and more comprehensive discussion of the formula to predict oil droplet size and the defined Weber Number see Industrial Engineering Chemistry Process Design & Development, Vol. 13, No. 1, 1974 by Stanley Middleman, which is entirely incorporated herein by reference thereto. This reference more specifically defines the formula to predict oil droplet size and the formula for the Weber Number, including each of the variables in the respective formulas and the manner of determining each.

The invention will be illustrated by the following set-forth examples which are given by way of illustration and not by any limitation. All parameters such as concentrations, mixing proportions, temperatures, pressure, rates, compounds, etc., submitted in these examples are not to be construed to unduly limit the scope of the invention.

EXAMPLE I

The oil samples used for these investigations were Westmin crude. The brine was Westmin field produced with a pH of about 6.2. The surface active agents used in the testing series were ethoxylated nonyl phenols (NP). They are all members of the general family of nonionic surface active agents of the formula:

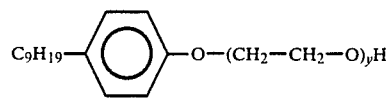

where y=40 (NP40) and y=100 (NP 100). Various concentrations of the respective surface active agents (ranging from 214.3 ppm to about 500 ppm by weight of Westmin Crude) were mixed with the brine to form emulsifying composition(s). The emulsifying composition(s) was mixed with the Westmin crude at a temperature of 160° F.±10° F. An oil-in-water emulsion was formed with the emulsifying-crude mixture by positioning the mixture in a rotor stator mixer. Mixing energies were 3,000 rpm for 60 secs. The oil-in-water emulsion(s) produced contained from about 15 percent to about 40 percent by weight brine. The following Table I discloses shear life (which is a measure of emulsion stability) that was detected for the various concentration of emulsifiers:

TABLE I

| Ratio and Concentration of NP40/NP 100 | Shear Life |
|---|---|
| (70:30) 500 ppm NP40 + 214.3 ppm NP100 | 17 min |
| (60:40) 428.6 ppm NP40 + 285.7 ppm NP100 | 13 |
| (50:50) 357.1 ppm NP40 + 357.1 ppm NP100 | 22 |
| (40:60) 285.7 ppm NP40 + 428.6 ppm NP100 | 18 |
| (30:70) 214.3 ppm NP40 + 500 ppm NP100 | 18 |

A 1:1 ratio on NP40 to NP100 produced an oil-in-water emulsion with a higher shear life than the other ratios.

EXAMPLE II

Repeat Example I but prepare the oil-in-water emulsion(s) only with a 2 inch diameter static shearer and mixer embodied by FIGS. 4–7 or FIGS. 8–13 or FIGS. 14–15 at a throughput velocity of from about 20 in./sec. to about 140 in./sec. and find that the shear life is greater for each ratio of NP40 to NP100 and also find that the 1:1 ratio of NP40 to NP100 produces the highest shear life when compared to the other ratios of NP40 to NP100. Thus, the oil-in-water emulsion(s) produced through a static shearer and mixer has a shear life greater than if the oil-in-water emulsion(s) was produced by dynamic mixing.

EXAMPLE III

Example I was repeated for Westmin crude having a pH of about 8.5. Table II below lists the shear life that was found for various concentrations of emulsifiers:

TABLE II

| Ratio and Concentration of NP 40/NP 100 | Shear Life |
| --- | --- |
| (70:30) 500 ppm NP40 + 214.3 ppm NP100 | 12 min |
| (60:40) 428.6 ppm NP40 + 285.7 ppm NP100 | 16 |
| (50:50) 357.1 ppm NP40 + 357.1 ppm NP100 | 22 |
| (40:60) 285.7 ppm NP40 + 428.6 ppm NP100 | 18 |
| (30:70) 214.3 ppm NP40 + 500 ppm NP100 | 18 |

A 1:1 ratio of NP40 to NP100 produced an emulsion with a higher shear life than the other ratios.

EXAMPLE IV

Repeat Example III but prepare the oil-in-water emulsion only with a 2 inch in diameter static shearer and mixer embodied by FIGS. 4–7 or FIGS. 8–13 or FIGS. 14–15 at a throughput velocity of from about 20 in./sec. to about 140 in./sec. and find that the shear life is larger for each ratio of NP40 to NP100 and also find that the 1:1 ratio of NP40 to NP100 produces the highest shear life when compared to the other ratios of NP40 to NP100.

EXAMPLE V

Repeat Examples I–IV but immediately the respective mixtures of the crudes plus the emulsifying composition below about 100° F. after the formation of the emulsion and find that the shear life increases for each oil-in-water emulsion. Thus, the stability of each oil-in-water emulsion is increased by immediately cooling the formed oil-in-water emulsion below about 100° F.

EXAMPLE VI

The oil samples used for these investigations were Jibaro crude. The brine was synthetic brine with a pH of from about 7.0 ±1.0 and a NaCl content of from about 5.0% by wt. ±3%. The emulsifiers used in the testing series were NP40 and NP100. Various concentrations (ranging from 0 ppm to about 1428.6 ppm by weight of Jibaro crude) of the respective surface active agents were mixed with the brine to form emulsifying composition(s). The emulsifying composition(s) was mixed with the Jibaro crude at a temperature of 160° F.±10° F. An oil-in-water emulsion was formed with emulsifier crude mixture by positioning the mixture in a rotor stator means. Mixing energies were 3,000 for 40 secs. The oil-in-water emulsion(s) produced contained from about 15 percent to about 60 percent by weight brine. The following Table III disclose shear life that was detected for the various concentration of emulsifiers:

TABLE III

| Ratio and Concentration of NP40/NP100 | Shear Life |
| --- | --- |
| (100:0) 1428.6 ppm NP40 + 0 ppm NP100 | 63 min |
| (50:50) 714.3 ppm NP40 + 714.3 ppm NP100 | 80 |
| (0:100) 0 ppm NP40 + 1428.6 ppm NP100 | 55 |
| (100:0) 1071.4 ppm NP40 + 0 ppm NP100 | 35 |
| (50:50) 535.7 ppm NP40 + 535.7 ppm NP100 | 42 |
| (0:100) 0 ppm NP40 + 1071.4 ppm NP100 | 33 |

A 1:1 ratio of NP40 to NP100 produced an oil-in-water emulsion with a higher shear life than the other ratios.

EXAMPLE VII

Repeat Example VI but prepare the oil-in-water emulsion only with a 2 inch diameter static shearer and mixer embodied by FIGS. 4–7 or FIGS. 8–13 or FIGS. 14–15 at a throughput velocity of from about 20 in./sec. to about 140 in./sec. and find that the shear life is larger for each ratio of NP40 to NP100 and also find that the 1:1 ratio of NP40 to NP100 produces the highest shear life when compared to the other ratios of NP40 to NP100.

EXAMPLE VIII

Repeat Examples VI–VII but immediately cool the respective mixtures of the crudes plus the emulsifier composition below about 100° F. after the formation of the emulsion and find that the shear life increases for each oil-in-water emulsion. Thus, the stability of each oil-in-water emulsion is increased by immediately cooling the formed oil-in-water emulsion below about 100° F.

EXAMPLE IX

The oil samples were Athabasca bitumen. The aqueous phase was brine comprising 3% by wt. NaCl. The emulsifier agent(s) were NP40 and NP100. A 1:1 ratio of NP40 (2857.1 ppm by weight of Athabasca bitumen) and NP100 (2857.1 ppm by weight of Athabasca bitumen) was added to the brine to form emulsifying composition(s). The emulsifying composition(s) was mixed with the Athabasca bitumen at a temperature of about 165° F. ±5° F. The emulsifying-bitumen mixture was placed in a rotor-stator mixer at 3000 rpm for 40 secs. No oil-in-water emulsion(s) was produced. Thus, NP40/NP100 could not produce an oil-in-water emulsion with Athabasca bitumen.

EXAMPLE X

Repeat Example IX with the emulsifying composition comprising the emulsifying agent as an ethoxylated alkyphenol compound having the general formula:

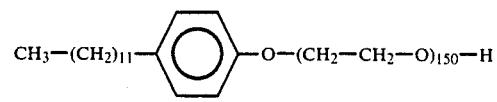

and employed in the brine at a concentration of about 1428.6 ppm by weight of Athabasca bitumen. The emulsifying composition was mixed with the Athabasca bitumen at a temperature of about 190° F.±5° F. The emulsifying-bitumen mixture was placed in a rotor-stator at 3000 rpm for 40 secs. An oil-in-water emulsion(s) was produced. Thus while NP40/NP100 could not produce an oil-in-water emulsion with Athabasca bitumen, the ethoxylated alkylphenol compound of this Example X does produce oil-in-water emulsion(s).

EXAMPLE XI

Repeat Example IX with any of the static shearer/mixer and find similar results.

EXAMPLE XII

Repeat Example X with any of the static shearer/mixer of this invention and find similar results.

EXAMPLE XIII

The oil samples were Athabasca bitumen. The aqueous phase was brine comprising 3% by wt. NaCl. A 1:1 ratio of NP40 (1428.6 ppm by weight of Athabasca bitumen) and NP100 (1428.6 ppm by weight of Athabasca bitumen) was added to the brine to form an emulsifying composition(s). The emulsifying composition(s) was mixed with the Athabasca bitumen at a temperature of about 160° F. The emulsifying-bitumen mixture was placed in a rotor-stator mixer at 3000 rpm for 40 secs. An oil-in-water emulsion(s) was produced, but only with a shear life less than one(1) minute. Thus, the NP40/NP100 could not produce with Athabasca bitumen an oil-in-water emulsion with any substantial shear life.

EXAMPLE XIV

Repeat Example XIII with the emulsifying composition comprising the emulsifying agent as an ethoxylated dialkylphenol compound having the general formula:

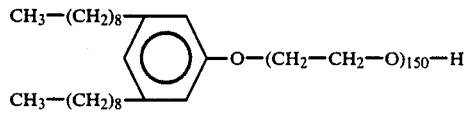

and employed in the brine at a concentration of about 1428.6 ppm by weight of Athabasca bitumen. The emulsifying composition was mixed with the Athabasca bitumen at a temperature of about 190° F.±5° F. The emulsifying-bitumen mixture was placed in a rotor-stator at 3000 rpm for 40 secs. An oil-in-water emulsion(s) was produced with a substantial shear life. Thus, while NP40/NP100 could not produce an oil-in-water emulsion with Athabasca bitumen, the ethoxylated dialkylphenol compound of this Example XIV does produce oil-in-water emulsion(s).

EXAMPLE XV

Repeat Example XIII with any of the static shearer/mixers of this invention and find similar results.

EXAMPLE XVI

Repeat Example XIV with any of the static shearer/mixers of the invention and find similar results.

EXAMPLE XVII

The crude for this Example was PCEJ bitumen. The aqueous phase was brine with about 1.7% by wt. NaCl. The surfactant was a mixture of 714.3 ppm NP40 (714.3 ppm of NP40 by weight of PCEJ bitumen) and 714.3 ppm NP100 (714.3 ppm of NP100 by weight of PCEJ bitumen). The brine and surfactants were mixed to form an emulsifying composition. The emulsifying composition and PCEJ bitumen were mixed and passed at a temperature of about 180° F. through a 2.07 in. diameter static mixer of FIGS. 8–13 at a rate of about 114 in./sec. to form an oil-in-water emulsion having a water concentration of about 25% by wt. The measured volumetric mean oil drop size was 27 microns. The predicted volumetric mean oil drop size from the formula $d = CD^a N_{we}^{-b}$ with $C = 1000$; $a = 0.5$; $b = 0.35$; $D = 2.07$ inches; and $N_{we} = 109,700$, was 25 microns. Thus, the predicted volumetric mean oil drop size was comparable to the measured volumetric mean oil drop size.

EXAMPLE XVIII

The crude for this Example was Manatokan. The aqueous phase was brine with about 1.7% by wt. NaCl. The surfactant was a mixture of 714.3 ppm ND40 (714.3 ppm of NP40 by weight of Manatokan) and 714.3 ppm ND100 (714.3 ppm of NP100 by weight of Manatokan). The brine and surfactants were mixed to form an emulsifying composition. The emulsifying composition and Manatokan were mixed and passed at a temperature of about 160° F. through a 0.20 in. diameter static mixer of FIGS. 4–7 at a rate of about 60 in./sec. to form an oil-in-water emulsion having a water concentration of about 28% by wt. The measured volumetric mean oil drop size was 34 microns. The predicted volumetric mean oil drop size from the formula $d = CD^a N_{we}^{-b}$ with $C = 1000$; $a = 0.5$; $b = 0.35$; $D = 0.20$ inches and $N_{we} = 1,920$, was 32 microns. Thus, the predicted volumetric mean oil drop size was comparable to the measured volumetric mean oil drop size.

EXAMPLE XIX

The Example is presented to prove that bimodal oil-in-water emulsion(s) has an improved viscosity. The crude was Manatokan. The aqueous phase was water. The surfactant was a mixture of 714.3 ppm NP40 (714.3 ppm of NP40 by weight of Manatokan) and 714.3 ppm NP100 (714.3 ppm of NP100 by weight of Manatokan). The emulsifying composition was prepared by mixing water with the surfactant. The oil-in-water emulsions were prepared by mixing a known amount of the emulsifying composition(s) with a known amount of the Manatokan and agitating with a rotor-stator mixer having a mixer energy of 3000 rpm for 40 secs. The first oil-in-water emulsion(s) had a mean oil droplet size (M) of 69.9, a dispersity of 3.27, and a viscosity (cp) of 221. The second emulsion with less Manatokan had a mean oil droplet size of 54.9, a dispersity of about 3.56, and a viscosity (cp) of about 198. When 1 liter of the first emulsion was mixed with 1 liter of the second emulsion a third oil-in-water emulsion was produced having a mean oil droplet size of about 61.7, a dispersity of about 3.88 and a viscosity (cp) of about 140. Thus, bimodal emulsion have a lower viscosity than any of its emulsion constituents.

EXAMPLE XX

The crude oil was Athabasca bitumen. The aqueous phase was brine comprising 3% by wt. NaCl with a pH of 7.0 to 8.0. The surfactant was a 50:50 mixture of

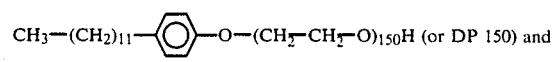

-continued

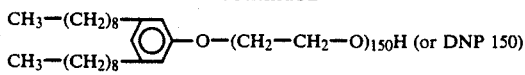
$CH_3-(CH_2)_8$ ... $-O-(CH_2-CH_2-O)_{150}H$ (or DNP 150)

The oil-in-water emulsion formation temperature was 164° F. with a rotor/stator at 3000 rpm for 300 sec. The following Table IV discloses the results of six (6) experimental runs wherein biopolymer xanthan was employed in three (3) of the six (6) runs:

TABLE IV

| Experimental Run | Surfactant Concentration | Xanthan Concentration | Percent Redisperse* |
|---|---|---|---|
| 1 | 11,428.6 PPM | 714.3 PPM | 100% |
| 2 | 11,428.6 PPM | 0 PPM | 75% |
| 3 | 8,571.4 PPM | 714.3 PPM | 100% |
| 4 | 8,571.4 PPM | 0 PPM | 30% |
| 5 | 5,714.3 PPM | 714.3 PPM | 20% |
| 6 | 5,714.3 PPM | 0 PPM | 0% |

*"Percent Redisperse" indicates the amount of emulsion redispersable one to two hours after initial emulsion formation. This is indicative of the oil droplets coalescing into a continuous oil phase as the emulsion stability fails. A value 85% or below is considered to represent an unstable emulsion (i.e. poor static stability).

The above data show that a stable water continuous Syncrude bitumen emulsion formed with a dynamic rotor-stator device cannot be formed without the biopolymer xanthan acting as a continuous, water phase thickener and emulsion stabilizer, and cannot be formed below a surfactant concentration of 8,571.4 PPM.

TABLE V-continued

| Experimental Run | Surfactant Concentration | Xanthan Concentration | % Redisperse | Shear Life* |
|---|---|---|---|---|
| 3 | 4,285.7 PPM | 0 PPM | 100% | 51 Min |
| 4 | 4,285.7 PPM | 0 PPM | 100% | 64 Min |
| 5 | 2,857.1 PPM | 0 PPM | 100% | 24 Min |
| 6 | 2,857.1 PPM | 0 PPM | 100% | 56 Min |

*"Shear Life" is a test measuring the shear stability of an emulsion. That is, an emulsion after formation is subjected to a shear field via the laboratory rotor-stator at 2000 RPM until the emulsion fails. The time until failure is defined as the "Shear Life" of an emulsion.

The above data indicates that redispersable emulsions can be formed with a static mixer without the biopolymer xanthan, and at surfactant concentration levels below 8,571.4 PPM.

EXAMPLE XXII

The surfactants for this Example were NP40 and NP100 in a 1:1 ratio, and DP150 and DNP150 in a 1:1 ratio. The aqueous phase was brine. The oil-in-water emulsions were formed with a ½ inch diameter static shearer and mixer embodied by FIGS. 4–7 or FIGS. 8–13. The surfactants used were subject to degradation over a long period under stress. If the surfactants are depleted by degradation, the oil-in-water emulsion may fail by either phase separation or by inversion into a water-in-oil emulsion. The following table illustrates that with the emulsifiers of this invention, such failure is by the phase separation mode and not by inversion:

TABLE VI

| Run # | Crude | Surfactant | Total PPM Of Surfactant To Crude, By Weight Of Crude | Static Mixer Type | Formation Temp. | % Nominal Crude to % Emulsifying Composition | Duration Hr. | Pipe Loop Diameter In. | Apparent Viscosity, cp Start | End |
|---|---|---|---|---|---|---|---|---|---|---|
| PL 64 | Manatokan | NP40/NP100 | 1800 | 0.5 in. Komax (FIGS. 8–13) | 160° F. | 65/35 | 56 | 0.88 | 114 | 28 |
| PL 69 | Manatokan | NP40/NP100 | 1676 | 0.5 in. Komax (FIGS. 8–13) | 160° F. | 65/35 | 113 | 0.88 | 90 | 22 |
| PL 68 | PCEJ bitumen | NP40/NP100 | 2142 | 0.5 in. Komax (FIGS. 8–13) | 175° F. | 70/30 | 245 | 0.88 | 330 | 40 |
| PL 81 | Athabasca bitumen | DP 150 DNP150 | 12,307 | 0.5 in. Komax (FIGS. 4–7) | 165° F. | 65/35 | 480 | 2.059 | 200 | 155 |

EXAMPLE XXI

The crude oil was Athabasca bitumen. The brine has a pH of about 8.5 and comprised 3% by wt. NaCl. The surfactant was a 50:50 mixture of DP150 and DNP150. The mixer was a static mixer of FIGS. 4–7. The flow rate was between 20 in./sec. and 140 in./sec. The oil-in-water emulsion formation temperature was 165° F. ±5° F. The following Table V discloses the results of six (6) experimental runs:

TABLE V

| Experimental Run | Surfactant Concentration | Xanthan Concentration | % Redisperse | Shear Life* |
|---|---|---|---|---|
| 1 | 8,571.4 PPM | 0 PPM | 100% | |
| 2 | 5,714.3 PPM | 0 PPM | 100% | 138 Min |

With the emulsifier(s) of this invention, failure by separation results in a slight decrease in fluid viscosity and permits continued pipeline operation. The pipe loop runs indicate that phase separation is the mode of transport emulsion failure for various crudes.

EXAMPLE XXIII

The surfactants for this Example were Triblock Pluronic plus tridecyl alcohol containing 150 moles ethylene oxide plus a biopolymer (other than xanthan). The aqueous phase was brine. Oil-in-water emulsion(s) were attempted to be formed with a 0.5 inch diameter Komax (FIGS. 8–13) or a dynamic mixer. The following Table VII illustrates that the oil-in-water emulsion(s) failed with the emulsifier(s) by inversion:

TABLE VII

| Run # | Crude | Surfactant | Total PPM Of Surfactant To Crude, By Weight Of Crude | Mixer Type | % Nominal Crude to % Emulsifying Composition | Duration Hr. | Pipe Loop Diameter In. | Comments |
|---|---|---|---|---|---|---|---|---|
| 78 | Athabasca bitumen | Triblock Pluronic + | 3571 | Static 0.5 in. Mixer | 70/30 | <5 min. | 2 in. | Inverted at start of |

TABLE VII-continued

| Run # | Crude | Surfactant | Total PPM Of Surfactant To Crude, By Weight Of Crude | Mixer Type | % Nominal Crude to % Emulsifying Composition | Duration Hr. | Pipe Loop Diameter In. | Comments |
|---|---|---|---|---|---|---|---|---|
| | | Tridecyl Alcohol + Biopolymer | | (FIGS. 8-13) | | | | Circulation* |
| 2 | Jibaro | Biopolymer Other Than Xanthan | 1298 | Dynamic | 77/23 | <5 min. | 1 in. | Inverted in Pipe Loop* |

*Viscosity and ΔP across pipeloop increased rapidly to limits of pump capacity.
Both of the oil-in-water emulsion failed by inversion and caused the viscosity to increase to values equal to greater than that of the original hydrocarbon crude. This resulted in pipeline blockage, and was caused by using emulsifiers other than the emulsifiers of this invention.

EXAMPLE XXIV

The oil samples used for these investigations were Manatokan crude. The aqueous phase was brine having a pH of greater than about 5.0. The surface active agents used in the testing series were the following ethoxylated nonyl phenols (NP): T-DET-N-20 (i.e. NP 20), T-DET-N-40 (i.e. NP 40), and T-DET-N-100 (i.e. NP 100). Each of the ethoxylated NP emulsifying agent(s) includes a collection of ethoxylated NP compounds wherein the number of $+(CH_2-CH_2-O+)_y$ repeat units or segments can vary from where y may have a value ranging from about 4 to about 1000. "T-DET" is a trademark of the Thompson-Hayward Chemical Corp., Kansas City, Mo. The respective ethoxylated nonyl phenols were purified of glycols by polyglycol separation. The emulsifying composition(s) was mixed with the Manatokan crude at a temperature of 125° F.±25° F. An oil-in-water (or oil-in-aqueous phase) emulsion was formed with the emulsifying-crude mixture by positioning the mixture in a rotor stator mixer. Mixing energies were 2,000 rpm to 4,000 rpm for 40 secs. to 80 secs. The oil-in-water emulsion(s) produced contained from about 15 percent to about 60 percent by weight brine. The following Table VIII discloses shear life (which is the measure of emulsion stability) that was detected for the various mixtures of NP 20/NP 40/NP 100:

mated quantity in % by weight of NP compounds in the 25/25/50 surfactant mixture having a molecular weight of between 1966 and 9188 was 51% by weight (which is greater than at least 50% by weight). The 50/25/25 mixture did not produce an acceptable oil-in-water emulsion having an emulsion shear stability greater than or equal to 40 mins. because the weight average molecular weight of the mixture was 1946 (which is not between 1966 and 9188), and further because the estimated quantity in % by weight of NP compounds in the 50/25/25 surfactant mixture having a molecular weight of 1966 to 9188 was 41% by weight (which is less than at least 50% by weight). The 25/50/25 mixture also did not produce an acceptable oil-in-water emulsion because the estimated quantity in % by weight of NP compounds in the 25/50/25 surfactant mixture having a molecular weight of 1966 to 9188 was 37% by weight, which is less than 50% by weight. Had this estimated quantity in % by weight been 50% by weight or greater, an acceptable oil-in-water emulsion would have been formed.

EXAMPLE XXV

The oil or hydrocarbon samples utilized for these investigations were Manatokan crude. The water or aqueous phase was brine with a pH of greater than about 4.5. The emulsifying agents were the following ethoxylated nonyl phenols (NP): T-DET-N-40 (i.e. NP

TABLE VIII

| Mixture of NP 20/NP 40/NP 100 (in % by wt. in mixture) | | | Weight Average Molecular Weight Of Mixture* | Dispersity Of Mixture* | Estimated Quanitity In % By Wt. Of NP Compounds In Mixture Having A M.W. Between 1966 and 9188 | Emulsion Shear Stability |
|---|---|---|---|---|---|---|
| NP 20 | NP 40 | NP 100 | | | | |
| 25% | 25% | 50% | 2301 | 1.77 | 51% | 49 mins. |
| 25% | 50% | 25% | 2089 | 1.69 | 37% | 38 mins. |
| 50% | 25% | 25% | 1946 | 1.91 | 41% | 29 mins. |

*Molecular weights, weight average molecular weight, and dispersity of mixture of emulsifying agent(s) were obtained by gel permeation chromatography. Each ethoxylated NP emulsifying agent comprises a collection of ethoxylated nonyl phenol compounds wherein the number of $+CH_2-CH_2-O+$ repeat units or segments may vary from about 4 to about 100. A molecular weight distribution for the total collection of all ethoxylated nonyl phenol compounds within the mixture of ethoxylated NP emulsifying agent(s) is obtained by the gel permeation chromatography. From this molecular weight distribution, the following parameters are determined: (a) weight average molecular weight of mixture, (b) estimated quantity in % by weight of NP compounds in mixture having a molecular weight between 1966 and 9188, and (c) dispersity of the mixture of ethoxylated NP emulsifying agent(s).

Assuming that for commercial purposes an emulsion shear stability of less than 40 mins. is unacceptable, the only emulsifying mixture in Table VIII producing an oil-in-water emulsion with an acceptable (i.e. commercially acceptable) emulsion shear stability is the 25/25/50 mixture of NP 20/NP 40/NP 100. The weight average molecular weight for this mixture was 2301 (which was between 1966 and 9188) and the dispersity of 1.77 was between 1.0 and 5.0. Furthermore, the esti- 40), T-DET-N-100 (i.e. NP 100), and T-DET-N-150 (i.e. NP 150). Similar to the emulsifying agent(s) in Example XXIV, each of these ethoxylated NP emulsifying agent(s) includes a collection of ethoxylated nonyl phenol compounds wherein the number of $-CH_2+CH_2-O+_y$ repeat units of segments can vary from where y may have a value of from about 4 to about 1000. All emulsifying agent(s) were purified of glycols by polyglycol separation. From about 100 ppm to about 5000 ppm (typically about 750 ppm) of emulsifying agent(s) by weight of Manatokan crude were mixed with each other in various proportions by weight and with the aqueous phase brine to form emulsifying composition(s). The Manatokan crude was mixed with the emulsifying composition(s) at a temperature of 135° F.± about 35° F. An oil-in-water (or crude-in-water) emulsion was formed with the emulsifying-crude mixture by positioning the mixture in a rotor stator mixer. Mixing energies were 2,000 rpm to 4,000 rpm (typically 3,000 rpm) for 30 secs. to 90 secs. The oil-in-water emulsion(s) produced contained from about 15 percent to about 60 percent by weight aqueous phase (i.e. brine). The following Table IX discloses shear life (or emulsion stability) that was measured or discovered for the various mixtures of NP 40/NP 100/NP 150:

a group or collection of ethoxylated nonyl phenol compounds wherein the $(CH_2—CH_2—O)_y$ repeat units range from where y has a value of about 4 to about 1000. NP 30 and/or NP 270 has at least one ethoxylated alkylphenol compound having the general formula:

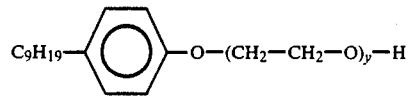

where y is greater than 100, more typically greater than 100 but less than 1000, and the ethoxylated alkylphenol compound preferably comprises at least 1% by weight (more preferably 1% to 90% by weight) of the entire mixture of NP 30 and NP 270 together. The emulsifying agent(s) are purified from glycols. From 100 ppm to

TABLE IX

| Mixture of NP 40/NP 100/NP 150 (in % by wt. in mixture) | | | Weight Average Molecular Weight | Dispersity | Estimated Quantity In % By Wt. Of NP Compounds In Mixture Having A M.W. Between | Emulsion Shear |
|---|---|---|---|---|---|---|
| NP 40 | NP 100 | NP 150 | Of Mixture* | Of Mixture* | 1966 and 9188 | Stability |
| 25% | 25% | 50% | 5629 | 1.27 | 83% | 83 mins. |
| 25% | 50% | 25% | 5153 | 1.25 | 87% | 87 mins. |
| 50% | 25% | 25% | 4909 | 1.27 | 80% | 65 mins. |

*Molecular weights, weight average molecular weight, and dispersity of mixture of emulsifying agent(s) were obtained by gel permeation chromatography. Each ethoxylated NP emulsifying agent comprises a collection of ethoxylated nonyl phenol compounds wherein the number of $(CH_2—CH_2—O)$ repeat units or segments may vary from about 4 to about 1000. A molecular weight distribution for the total collection of all ethoxylated nonyl phenol compounds within the mixture of ethoxylated NP emulsifying agent(s) is obtained by the gel permeation chromatography. From this molecular weight distribution, the following parameters are determined: (a) weight average molecular weight of mixture, (b) estimated quantity in % by weight of NP compounds in mixture having a molecular weight between 1966 and 9188, and (c) dispersity of the mixture of ethoxylated NP emulsifying agent (s).

All emulsifying mixtures produced a commercially acceptable (i.e. above 40 mins.) oil-in-water emulsion because for each mixture, the weight average molecular weights were between 1966 and 9188, the dispersities were between 1.0 and 5.0, and the % by weight of NP compounds (in the emulsifying agent mixture) having a molecular weight between 1966 and 9188 was at least 50% by weight. Had any particular emulsifying mixture had a dispersity greater than about 5.0 and/or a weight average molecular weight outside of the range of 1966 to 9188 and/or less than about 50% by weight of the NP compounds in the emulsifying agent mixture having a molecular weight of 1966 to 9188, the formed oil-in-water emulsion produced therefrom would not have been commercially acceptable.

EXAMPLE XXVI

The oil samples are Manatokan crude. The aqueous phase is brine with a pH above 4.0. The emulsifying agent(s) are NP 30 (i.e. T-DET-N-30) and NP 270 (i.e. T-DET-N-270). Each NP emulsifying agent comprises 5000 ppm of emulsifying agent(s) by weight of Manatokan crude are mixed with each other in an 80% NP 30/20% NP 270 proportion by weight and with the aqueous phase brine to form emulsifying composition(s). The Manatokan crude is mixed with the emulsifying composition(s) at a temperature of 110° F.± about 10° F. The mixture is placed in a rotor stator mixer and the latter is energized at a mixing energy between 2,000 rpm to 4,000 rpm for 40 to 60 secs. to form or produce oil-in-water emulsion(s) containing from about 15 percent to about 60 percent by weight aqueous phase (i.e. brine). The following Table X discloses emulsion stability that is found for the 80%/20% by weight mixture of NP 270:

TABLE X

| Mixture of NP 30/NP 270 (in % by wt. in mixture) | | Weight Average Molecular Weight | Dispersity | Estimated Quantity In % By Wt. Of NP Compounds In Mixture Having A M.W. Between | Emulsion Shear |
|---|---|---|---|---|---|
| NP 30 | NP 270 | OF Mixture* | Of Mixture* | 1966 and 9188 | Stability |
| 80% | 20% | 8538 | 2.34 | 0% | less than 25 mins. |

*Molecular weights, weight average molecular weight, and dispersity of mixture of emulsifying agent(s) were obtained by gel permeation chromatography. Each ethoxylated NP emulsifying agent comprises a collection of ethoxylated nonylphenol compounds wherein the number of $(CH_2—CH_2—O)$ repeat units or segments may vary from about 4 to about 1000. A molecular weight distribution for the total collection of all ethoylated nonyl phenol compounds within the mixture of ethoxylated NP emulsifying agent(s) is obtained by the gel permeation chromatography. From this molecular weight distribution, the following parameters are determined: (a) weight average molecular weight of mixture, (b) estimated quantity in % by weight of NP compounds in mixture having a molecular weight between 1966 and 9188, and (c) dispersity of the mixture of ethoxylated NP emulsifying agent(s).

The emulsifying mixture in this Example produces a commercially unacceptable oil-in-water emulsion. The reason for the unacceptable oil-in-water emulsion is that the estimated quantity in % by weight of NP compounds in the emulsifying mixture having a molecular weight of 1966 to 9188 is 0%.

EXAMPLE XXVII

Repeat Example XXVI but for 60% by weight NP 15 and 40% by weight NP 100 and find the following: a weight average molecular weight of 3790 for the 60% NP 15/40% NP 100 mixture, a dispersity of 1.59, and 40% by weight as the estimated quantity of NP compounds in the 60% NP 15/40% NP 100 mixture having a molecular weight between 1966 and 9188, and an emulsion shear stability of 25 mins. or less. The emulsion shear stability is unacceptable because of the 40% by weight of the estimated quantity of NP compounds in the 60% NP 15/40% NP 100 mixture.

EXAMPLE XXVIII

Repeat Example XXVI but for 45% by weight NP 10 and 55% by weight NP 50 and find the following: a weight average molecular weight of 1628 for the 45% NP 10/55% NP 50 mixture, a dispersity of 1.29, and 55% by weight as the estimated quantity of NP compounds in the 45% NP 10/55% NP 50 mixture having a molecular weight between 1966 and 9188, and an emulsion shear stability of less than 10 mins. The emulsion shear stability is unacceptable because of the 1628 weight average molecular weight.

EXAMPLE XXIX

Repeat Example XXVI but for 60% by weight NP 150 and 40% by weight NP 300 and find the following: a weight average molecular weight of 10,565 for the 60% NP 150/40% NP 300 mixture, a dispersity of 1.12, and 60% by weight as the estimated quantity of NP compounds in the 60% NP 150/40% NP 300 mixture having a molecular weight between 1966 and 9188, and an emulsion shear stability of less than 35 mins. The emulsion shear stability is unacceptable because of the 10,565 weight average molecular weight.

EXAMPLE XXX

Repeat Example XXVI but for 90% by weight NP 100 and 10% by weight NP 1000 and find the following: a weight average molecular weight of 15,900 of the 90% NP 100/10% NP 1000 mixture, a dispersity of 2.19, and 90% by weight as the estimated quantity of NP compounds in the 90% NP 100/10% NP 1000 mixture having a molecular weight between 1966 and 9188, and an emulsion shear stability of less than 35 mins. The emulsion shear stability is unacceptable because of the 15,900 weight average molecular weight.

EXAMPLE XXXI

The oil samples for these investigations are Manatokan crude. The aqueous phase is brine having a pH of greater than about 5.0. The surface active agents in the testing series are the following ethoxylated nonyl phenol compounds: T-DET-N-10.5 (i.e. NP 10.5), T-DET-N-20 (i.e. NP 20), and T-DET-N-30 (i.e. NP 30). Each of the ethoxylated NP emulsifying agent(s) includes a collection of ethoxylated NP molecules wherein the number of $-(CH_2-CH_2-O)_y-$ repeat units or segments can vary from where y may have a value ranging from about 4 to about 200. "T-DET" is a trademark of the Thompson-Hayward Chemical Corp., Kansas City, Mo. The respective ethoxylated nonyl phenols are purified of polyethylene glycol by polyethylene glycol separation. The emulsifying composition(s) is mixed with the Manatokan crude at a temperature of 125° F.±25° F. An oil-in-water (or oil-in-aqueous phase) emulsion is formed in some instances with the emulsifying-crude mixture by positioning and agitating the mixture in a rotor stator mixer. Mixing energies are 500 rpm to 4,000 rpm (typically 1,000 rpm) for 30 secs. to 90 secs. The oil-in-water emulsion(s) that are produced contain from about 15 percent to about 60 percent by weight brine. The following Table XI discloses time to form a water continuous emulsion and shear life of the water continuous emulsion after formation (which is the measure of emulsion stability) that is detected for the various mixtures of NP 10.5/NP 20/NP 30:

TABLE XI

LOW TEMP: VARIATION ABOUT NP-20: MID RANGE

| Mixture of NP 10.5/NP 20/NP 30 (in % by wt. in mixture) | | | Weight Average Molecular Weight Of Mixture | Dispersity Of Mixture* | Estimated Quantity In % by Wt. of NP Compounds In Mixture Having A M.W. Between 558 and 2504 | Time to Form A Water Continuous Emulsion | Emulsion Shear Stability |
|---|---|---|---|---|---|---|---|
| NP 10.5 | NP 20 | NP 30 | | | | | |
| 20% | 20% | 60% | 1430 | 2.50 | 42% | 32 secs. | 38 mins. |
| 20% | 60% | 20% | 1220 | 1.70 | 85% | 11 secs. | 49 mins. |
| 60% | 20% | 20% | 1100 | 3.00 | 37% | Did not form | Did not form |

*Molecular weights, dispersity and estimated quantity in % by wt. of NP compounds in mixture having a M.W. between 558 and 2504 are obtained by structural considerations based on a Gaussian (normal) distribution specified for each designated emulsifying agent.

Assuming that for commercial purposes a period of time greater than about 20 secs. to form a water continuous emulsion is unacceptable and a water continuous emulsion shear stability of less than 40 mins. is unacceptable, the only emulsifying mixture in Table XI producing an oil-in-water emulsion within an acceptable period of time and with an acceptable (i.e. commercially acceptable) emulsion shear stability is the 20/60/20 mixture of NP 10.5/NP 20/NP 30. The weight average molecular weight for this mixture is 1220 (which is between 558 and 2405) and the dispersity of 1.70 is between 1.0 and 5.0. Furthermore, the estimated quantity in percent by weight of NP compounds in the 20/60/20 surfactant mixture having a molecular weight of between 558 and 2504 is 85% by weight (which is greater than at least 50% by weight). The 60/20/20 mixture did not produce within an acceptable period of time of less than about 20 secs. an acceptable oil-in-water emulsion having an emulsion shear stability greater than or equal to 40 mins. because the estimated quantity in percent by weight of NP compounds in the 60/20/20 surfactant mixture having a molecular weight of 558 to 2504 is 37% by weight (which is less than at least 50% by weight). The 20/20/60 mixture also did not produce an acceptable oil-in-water emulsion because the estimated quantity in percent by weight of NP compounds in the 20/20/60 surfactant mixture having a molecular weight of 558 to 2504 is 42% by weight, which is less than 50% by weight. If this estimated quantity in percent by weight is 50% by weight or greater, an acceptable oil-in-water emulsion would be formed within an acceptable period of time.

EXAMPLE XXXII

The oil or hydrocarbon samples for these investigations are Manatokan crude. The water or aqueous phase is brine with a pH of greater than about 4.5. The emulsifying agents are the following ethoxylated nonyl phenol compounds: T-DET-N-20 (i.e. NP 20), T-DET-N-40 (i.e. NP 40), and T-DET-N-70 (i.e. NP 70). Similar to the emulsifying agent(s) in Example XXXI, each of these ethoxylated NP emulsifying agent(s) includes a collection of ethoxylated nonyl phenol molecules wherein the number of $+CH_2-CH_1-O+_y$ repeat units of segments can vary from where y may have a value of from about 4 to about 200. All emulsifying agent(s) are purified of polyethylene glycol by polyethylene glycol separation. From about 100 ppm to about 5,000 ppm (typically about 750 ppm) of emulsifying agent(s) by weight of Manatokan crude are mixed with each other in various proportions by weight and with the aqueous phase brine to form emulsifying composition(s). The Manatokan crude is mixed with the emulsifying composition(s) at a temperature of 135° F.± about 25° F. An oil-in-water (or crude-in-water) emulsion is formed in some instances with the emulsifying-crude mixture by positioning and agitating the mixture in a rotor stator mixer. Mixing energies are 500 rpm to 4,000 rpm (typically 1,000 rpm) for 30 secs. to 90 secs. The oil-in-water emulsion(s) that are produced contain from about 15 percent to about 60 percent by weight aqueous phase (i.e. brine). The following Table XII discloses time to form a water continuous emulsion and shear life of the water continuous emulsion after formation (or emulsion stability) that is measured or discovered for the various mixtures of NP 20/NP 40/NP 70:

in percent by weight of NP compounds in the 60/20/20 surfactant mixture having a molecular weight of between 558 and 2504 is 70% by weight (which is greater than at least 50% by weight). The 20/20/60 mixture did not produce within an acceptable period of time of less than about 20 secs. an acceptable oil-in-water emulsion having an emulsion shear stability greater than or equal to 40 mins. because the weight average molecular weight of the mixture is 3020 (which is not between 558 and 2504), and furthermore because the estimated quantity in percent by weight of NP compounds in the 20/20/60 surfactant mixture having a molecular weight of 558 to 2504 is 40% by weight (which is less than at least 50% by weight). The 20/60/20 mixture also did not produce an acceptable oil-in-water emulsion because the estimated quantity in percent by weight of NP compounds in the 20/60/20 surfactant mixture having a molecular weight of 558 to 2504 is 47% by weight, which is less than 50% by weight. If this estimated quantity in percent by weight is 50% by weight or greater, an acceptable oil-in-water emulsion would be formed within an acceptable period of time.

EXAMPLE XXXIII

The oil samples for these investigations are Manatokan crude. The aqueous phase is brine having a pH of greater than about 5.0. The surface active agents in the testing series are the following ethoxylated nonyl phenol compounds: T-DET-N-5 (i.e. NP 5), T-DET-N-10.5 (i.e. NP 10.5), and T-DET-N-20 (i.e. NP 20). Each of the ethoxylated NP emulsifying agent(s) includes a collection of ethoxylated NP molecules wherein the number of $+CH_2-CH_2-O+_y$ repeat units or segments can vary from where y may have a value ranging from about 4 to about 200. The respective ethoxylated nonyl phenols are purified of polyethylene glycol by polyethylene glycol separation. The emulsifying composition(s) are mixed with the Manatokan crude at a temperature of 125° F.±25° F. An oil-in-water (or oil-

TABLE XII

LOW TEMP: VARIATION ABOUT NP-20: HIGH RANGE

| Mixture of NP 20/NP 40/NP 70 (in % by wt. in mixture) | | | Weight Average Molecular Weight Of Mixture | Dispersity Of Mixture* | Estimated Quantity In % by Wt. of NP Compounds In Mixture Having A M.W. Between 558 and 2504 | Time to Form A Water Continuous Emulsion | Emulsion Shear Stability |
|---|---|---|---|---|---|---|---|
| NP 20 | NP 40 | NP 70 | | | | | |
| 20% | 20% | 60% | 3020 | 1.20 | 40% | 27 secs. | 35 mins. |
| 20% | 60% | 20% | 2363 | 1.30 | 47% | No emulsion | No emulsion |
| 60% | 20% | 20% | 2230 | 1.35 | 70% | 14 secs. | 45 mins. |

*Molecular weights, dispersity and estimated quantity in % by wt. of NP compounds in mixture having a M.W. between 558 and 2504 are obtained by structural considerations based on a Gaussian (normal) distribution specified for each designated emulsifying agent.

Assuming that for commercial purposes a period of time greater than about 20 secs. to form a water continuous emulsion is unacceptable and a water continuous emulsion shear stability of less than 40 mins. is unacceptable, the only emulsifying mixture in Table XII producing an oil-in-water emulsion within an acceptable period of time and with an acceptable (i.e. commercially acceptable) emulsion shear stability is the 60/20/20 mixture of NP 20/NP 40/NP 70. The weight average molecular weight for this mixture is 2230 (which is between 558 and 2504) and the dispersity of 1.20 is between 1.0 and 5.0. Furthermore, the estimated quantity in-aqueous phase) emulsion is formed with the emulsifying-crude mixture by positioning the mixture in a rotor stator mixer. Mixing energies are 520 rpm to 4,000 rpm (typically 1,000 rpm) for 30 secs. to 90 secs. The oil-in-water emulsion(s) that are produced contain from about 15 percent to about 60 percent by weight brine. The following Table XIII discloses time to form a water continuous shear life of the water continuous emulsion after formation (which is the measure of emulsion stability) that is detected for the various mixtures of NP 5/NP 10.5/NP 20:

TABLE XIII
LOW TEMP: VARIATION ABOUT NP-20: LOW RANGE

| Mixture of NP 5/NP 10.5/NP 20 (in % by wt. in mixture) | | | Weight Average Molecular Weight Of Mixture | Dispersity Of Mixture* | Estimated Quantity In % by Wt. of NP Compounds In Mixture Having A M.W. Between 558 and 2504 | Time to Form A Water Continuous Emulsion | Emulsion Shear Stability |
|---|---|---|---|---|---|---|---|
| NP 5 | NP 10.5 | NP 20 | | | | | |
| 20% | 20% | 60% | 1010 | 1.16 | 77.6% | 5 secs. | 42 mins. |
| 20% | 60% | 20% | 750 | 1.24 | 45.0% | 11 secs. | 36 mins. |
| 60% | 20% | 20% | 744 | 1.25 | 39.1% | 16 secs | 30 mins |

*Molecular weights, dispersity and estimated quantity in % by wt. of NP compounds in mixture having a M.W. between 558 and 2504 are obtained by structural considerations based on a Gaussian (normal) distribution specified for each designated emulsifying agent.

Assuming that for commercial purposes a period of time greater than about 20 secs. to form a water continuous emulsion is unacceptable and a water continuous emulsion shear stability of less than 40 mins. is unacceptable, the only emulsifying mixture in Table XIII producing an oil-in-water emulsion within an acceptable period of time and with an acceptable (i.e. commercially acceptable) emulsion shear stability is the 20/20/60 mixture of NP 5/NP 10.5/NP 20. The weight average molecular weight for this mixture is 1010 (which is between 558 and 2504) and the dispersity of 1.16 is between 1.0 and 5.0. Furthermore, the estimated quantity in percent by weight of NP compounds in the 20/20/60 surfactant mixture having a molecular weight of between 558 and 2504 is 77.6% by weight (which is greater than at least 50% by weight). The 60/20/20 mixture did not produce an acceptable oil-in-water emulsion having an emulsion shear stability greater than or equal to 40 mins. because the estimated quantity in percent by weight of NP compounds in the 60/20/20 surfactant mixture having a molecular weight of 558 to 2504 is 39.1% by weight (which is less than at least 50% by weight). The 20/60/20 mixture also did not produce an acceptable oil-in-water emulsion because the estimated quantity in percent by weight of NP compounds in the 20/60/20 surfactant mixture having a molecular weight of 558 to 2504 is 45% by weight, which is less than 50% by weight. If this estimated quantity in percent by weight is 50% by weight or greater, an acceptable oil-in-water emulsion would be formed.

EXAMPLE XXXIV

Repeat Example XXXI with the emulsifying composition(s) mixed with the Manatokan crude at a temperature of about 185° F., and find that the 20/60/20 mixture of NP 10.5/NP 20/NP 30 did not produce an oil-in-water emulsion within a commercially acceptable period of time and with a commercially acceptable emulsion shear stability because the emulsifying composition(s)-Mantokan crude had a temperature above about 170° F.

EXAMPLE XXXV

Repeat Example XXXII with the emulsifying composition(s) mixed with the Manatokan crude at a temperature of about 180° F., and find that the 60/20/20 mixture of NP 20/NP 40/NP 70 did not produce an oil-in-water emulsion within a commercially acceptable period of time and with a commercially acceptable emulsion shear stability because the emulsifying compositions-Manatokan crude had a temperature above about 170° F.

EXAMPLE XXXVI

Repeat Example XXXIII with the emulsifying composition(s) mixed with the Manatokan crude at a temperature of about 195° F., and find that the 20/20/60 mixture of NP 5/NP 10.5/NP 20 did not produce an oil-in-water emulsion within a commercially acceptable period of time and with a commercially acceptable emulsion shear stability because the emulsifying composition(s)-Manatokan crude had a temperature above about 170° F.

EXAMPLE XXXVII

The oil samples are Manatokan crude. The aqueous phase is brine with a pH above 4.0. The emulsifying agent(s) comprise 75% by weight ethoxylated nonyl phenols (NP) agents and 25% by weight of at least one ethoxylated alkylphenol (EA) agent having the general formula:

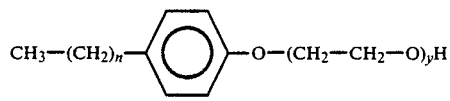

where n is an integer having a value of from 9 to 14 (inclusive) and y is an integer having a value of from 4 to 300 (inclusive). The EA agent has a molecular weight distribution with a dispersity of from about 1.0 to about 5.0 and with a weight average molecular weight of from about 2434 to about 4264; and at least about 50% by weight of the EA agent comprises at least one ethoxylated alkylphenol compound having a molecular weight of from about 2434 to about 4264. The NP agents are the following: T-DET-N 20 (i.e. NP 20), T-DET-N 40 (i.e. NP 40), and T-DET-N 100 (i.e. NP 100). Each of the ethoxylated NP agents includes a collection of ethoxylated NP compounds wherein the number of $(CH_2-CH_2-O)_x$ repeat units or segments can vary from where x may have a value ranging from about 4 to about 200. All of the respective emulsifying agents are purified of glycols by polyglycol separation. From about 100 ppm to about 5,000 ppm (typically about 750 ppm) of the emulsifying agent(s) by weight of Manatokan crude are mixed with each other in various proportions by weight and with the aqueous phase brine to form emulsifying composition(s). The Manatokan crude is mixed with the emulsifying composition(s) at a temperature of 190° F.±5° F. oil-in-water (or oil-in-aqueous phase) emulsion is formed with the emulsifying composition-crude mixture by positioning the mixture in a rotor stator mixer. Mixing energies are 2,000 rpm to 4,000 rpm (typically 3,000 rpm) for 30 secs. to 90 secs.

The oil-in-water emulsion(s) that are produced contain from about 15% to about 60% by weight aqueous phase (i.e. brine). The following Table XIV discloses time to form a water continuous emulsion and shear life (or emulsion stability) that is measured or discovered for the various mixtures of NP 20/NP 40/NP 100 in combination with the 25% by weight of the EA agent:

TABLE XIV

| EA AGENT (in % by wt. in NP/EA agent mixture) | Mixture of NP 20/NP 40/NP 100 (in % by wt. in NP/EA agent mixture) | | | Weight Average Molecular Weight Of NP Mixture* | Dispersity of NP Mixture* | Estimated Quantity In % by Wt. of NP Compounds In NP Mixture Having A M.W. Between 558 and 1582 | Time to Form Water Continuous Emulsion | Emulsion Shear Stability |
| --- | --- | --- | --- | --- | --- | --- | --- | --- |
| | NP 20 | NP 40 | NP 100 | | | | | |
| 25% | 45% | 15% | 15% | 1284 | 1.52 | 67.0% | 7 secs. | 73 mins. |
| 25% | 15% | 45% | 15% | 1814 | 1.32 | 37.0% | 34 secs. | 28 mins. |
| 25% | 15% | 15% | 45% | 2753 | 1.25 | 22.1% | 48 secs. | 18 mins. |

*Molecular weights, weight average molecular weight, and dispersity of mixture of NP emulsifying agent(s) are obtained by structure. Each ethoxylated NP emulsifying agent comprises a collection of ethoxylated nonyl phenol compounds wherein the number of $(\text{-CH}_2\text{CH}_2\text{-O-})$ repeat units or segments may vary from about 4 to about 200. A molecular weight distribution for the total collection of all ethoxylated nonyl phenol compounds within the mixture of ethoxylated NP emulsifying agent(s) is obtained by structure. From this molecular weight distribution, the following parameters are determined: (a) weight average molecular weight of mixture, (b) estimated quantity in % by weight of NP compounds in mixture having a molecular weight between 558 and 1582, and (c) dispersity of the mixture of ethoxylated NP emulsifying agent(s).

Assuming that for commercial purposes a period of time greater than about 20 secs. to form a water continuous emulsion is unacceptable and a water continuous emulsion shear stability of less than 40 mins. is unacceptable, the only emulsifying NP/EA agent mixture in Table XIV producing an oil-in-water emulsion within an acceptable period of time and with a commercially acceptable emulsion shear stability is the 45/15/15 mixture of NP 20/NP 40/NP 100 in combination with 25% by weight EA agent. The weight average molecular weight for the NP mixture is 1284 (which is between 558 and 1582) and the dispersity of 1.52 is between 1.0 and 5.0. Furthermore, the estimated quantity in % by weight of NP compounds in the NP mixture having a molecular weight of between 558 and 1582 is 67% by weight (which is greater than at least 50% by weight). The 15/45/15 mixture of NP 20/NP 40/NP 100 in combination with 25% by weight of the EA agent did not produce within an acceptable period of time of less than about 20 secs. an acceptable oil-in-water emulsion having an emulsion shear stability greater than or equal to 40 mins. because the estimated quantity in percent by weight of NP compounds in the NP mixture having a molecular weight of 558 to 1582 is 37% by weight (which is less than at least 50% by weight). If this estimated quantity in percent by weight is 50% by weight or greater, an acceptable oil-in-water emulsion would be formed within an acceptable period of time. The 15/15/45 mixture of NP 20/NP 40/NP 100 in combination with 25% by weight of the EA agent did not produce an acceptable oil-in-water emulsion because the estimated quantity in percent by weight of NP compounds in the 15/15/45 NP mixture having a molecular weight of 558 to 1582 is 22.1% by weight (which is less than at least 50% by weight), and further because the weight average molecular weight of the mixture is 2753 (which is not between 558 and 1582). If this estimated quantity in percent by weight is 50% by weight or greater and if the weight average molecular weight is between 558 and 1582, an acceptable oil-in-water emulsion would be formed within an acceptable period of time.

EXAMPLE XXXVIII

Repeat Example XXXVII where n in the general formula:

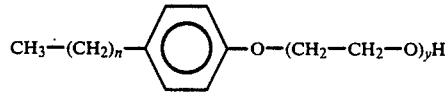

is 8 or less and find that an acceptable oil-in-water emulsion is not formed and/or is not formed within an acceptable period of time.

EXAMPLE XXXIX

Repeat Example XXXVII where n in the general formula:

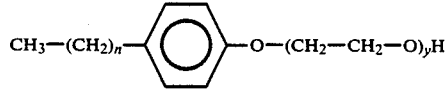

is 15 or greater and find that an acceptable oil-in-water emulsion is not formed and/or is not formed within an acceptable period of time.

EXAMPLE XXXX

Repeat Example XXXVII where the percent by weight of the EA agent in the NP/EA agent mixture is decreased to below 15% by weight and the percent by weight of the respective NP compounds (i.e. NP 20, NP 40, and NP 100) in the NP/EA agent mixture is varied and/or adjusted accordingly such that the weight average molecular weight of the NP mixture is 558 to 1582, dispersity of the NP mixture is 1.0 to 5.0, and the estimated quantity in percent by weight of NP compounds in the NP mixture having a molecular weight between 558 and 1582 is at least 50% by weight, and find that an acceptable oil-in-water emulsion is not formed and/or is not formed within an acceptable period of time.

EXAMPLE XXXXI

Repeat Example XXXX where the percent by weight of the EA agent in the NP/EA agent mixture is increased above 40% by weight and find similar results.

EXAMPLE XXXXII

The oil samples are PCEJ crude. The aqueous phase is brine with a pH above 4.5. The emulsifying agent(s) comprise 75% by 20 weight of an NP 20 agent and 25% of three ethoxylated alkylphenol agents with each of the agents having the general formula:

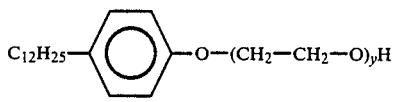

wherein for one agent (hereafter identified as DD 20) y equals 20 and is a mean of a normal (Gaussian) distribution curve; for a second agent (hereinafter identified as DD 70) y equals 70 and is a mean of a normal (Gaussian) distribution curve; and for the third agent (hereinafter identified as DD 150) y equals 150 and is also a mean of a normal (Gaussian) distribution curve. The mixture of DD 20/DD 70/DD 100 will be referred to collectively hereafter as the DD mixture. Each of the DD agents includes a collection of ethoxylated dodecyl compounds wherein the number of $(CH_2-CH_2-O)_x$ repeat units or segments can vary from where x may have a value ranging from about 4 to about 300. The NP 20 agent has a molecular weight distribution with a dispersity of from about 1.0 to about 5.0 and with a weight average molecular weight of from about 558 to about 1582; and at least about 50% by weight of the NP 20 agent comprises at least one ethoxylated nonyl phenol compound having a molecular weight of from about 558 to about 1582. All of the respective emulsifying agents are purified of polyethylene glycols by polyethylene glycol separation. From about 100 ppm to about 5,000 ppm (typically about 750 ppm) of the emulsifying agent(s) by weight of PCEJ crude are mixed with each other in various proportions by weight and with the aqueous phase brine to form emulsifying composition(s). The PCEJ crude is mixed wih the emulsifying composition(s) at a temperature of 200° F.±5° F. An oil-in-water (or oil-in-aqueous phase) emulsion is formed with the emulsifying composition-crude mixture by positioning, placing or passing the mixture through a rotor stator mixer. Mixing energies are 2,000 rpm to 4,000 rpm (typically 3,000 rpm) for 30 secs. to 90 secs. The oil-in-water emulsion(s) that are produced contain from about 15 percent to about 60 percent by weight aqueous phase (i.e. brine). The following Table XV discloses time to form a water continuous emulsion and shear life (or emulsion stability) that is measured or discovered for the various mixtures of DD 20/DD 70/DD 150 in combination with the 75% by weight of the NP 20 agent:

XV producing an oil-in-water emulsion within an acceptable period of time and with a commercially acceptable emulsion shear stability is the 5/15/5 mixture of DD 20/DD 70/DD 150 in combination with 75% by weight NP 20 agent. The weight average molecular weight for the DD mixture is 4171 (which is between 2434 and 4264) and the dispersity of 1.30 is between 1.0 and 5.0. Furthermore, the estimated quantity in percent by weight of DD compounds in the DD mixture having a molecular weight of between 2434 and 4264 is 55% by weight (which is greater than at least 50% by weight). The 15/5/5 mixture of DD 20/DD 70/DD 150 in combination with 75% by weight percent of the NP 20 agent did not produce within an acceptable period of time of less than about 20 secs. an acceptable oil-in-water emulsion having an emulsion shear stability greater than or equal to 40 mins. because the estimated quantity in percent by weight of DD compounds in the DD mixture having a molecular weight of 2434 to 4264 is 16.4% by weight (which is less than at least 50% by weight). If this estimated quantity in percent by weight is 50% by weight greater, an acceptable oil-in-water emulsion would be formed within an acceptable period of time. The 5/5/15 mixture of DD 20/DD 70/DD 150 in combination with 25% by weight of the NP 20 agent did not produce an acceptable oil-in-water emulsion because the estimated quantity in percent by weight of DD compounds in the 5/5/15 DD mixture having a molecular weight of 2434 to 4264 is 24% by weight (which is less than at least 50% by weight), and further because the weight average molecular weight of the mixture is 6281 (which is not between 2434 and 4264). If this estimated quantity in percent by weight is 50% by weight or greater and if the weight average molecular weight is between 2434 and 4264, an acceptable oil-in-water emulsion would be formed within an acceptable period of time.

EXAMPLE XXXXIII

Repeat Example XXXXII where the percent by weight of the NP 20 agent in the DD/NP 20 agent mixture is decreased to below about 60% by weight and the percent by weight of the respective DD compounds (i.e. DD 20, DD 70, and DD 100) in the DD/NP 20 agent mixture is varied and/or adjusted accordingly such that the weight average molecular weight of the DD mixture is 2434 and 4264, dispersity of the NP mixture is 1.0 to 5.0, and the estimated quantity in percent by weight of DD compounds in the DD mixture having a molecular weight between 2434 and 4264 is at least 50% by weight, and find that an acceptable oil-in-

TABLE XV

| NP 20 AGENT (in % by wt. in DD/ NP 20 agent mixture) | Mixture of DD 20/DD 40/DD 150 (in % by wt. in DD/ NP 20 agent mixture) | | | Weight Average Molecular Weight Of DD Mixture* | Dispersity of DD Mixture* | Estimated Quantity In % by Wt. of NP Compounds In NP Mixture Having A M.W. Between 2434 and 4264 | Time to Form Water Continuous Emulsion | Emulsion Shear Stability |
|---|---|---|---|---|---|---|---|---|
| | DD 20 | DD 70 | DD 150 | | | | | |
| 75% | 15% | 5% | 5% | 3912 | 1.71 | 16.4% | 24 secs. | 35 mins. |
| 75% | 5% | 15% | 5% | 4171 | 1.30 | 55.0% | 5 secs. | 71 mins. |
| 75% | 5% | 5% | 15% | 6281 | 1.25 | 24.0% | 42 secs. | 16 mins. |

*Molecular weights, weight average molecular weight, and dispersity of mixture of DD emulsifying agent(s) are obtained by structure. Each ethoxylated DD emulsifying agent comprises a collection of ethoxylated DD phenol compounds wherein the number of $(-CH_2-CH_2-O-)$ repeat units or segments may vary from about 4 to about 300. A molecular weight distribution for the total collection of all ethoxylated DD phenol compounds within the mixture of ethoxylated DD emulsifying agent(s) is obtained by structure. From this molecular weight distribution, the following parameters are determined: (a) weight average molecular weight estimated quantity in % weight of DD compounds in mixture having a molecular weight between 2434 and 4264, and (c) dispersity of the mixture of ethoxylated DD emulsifying agent(s).

Assuming that for commercial purposes a period of time greater than about 20 secs. to form a water continuous emulsion is unacceptable and a water continuous emulsion shear stability of less than 40 mins. is unacceptable, the only emulsifying DD/NP 20 mixture in Table water emulsion is not formed and/or is not formed within an acceptable period of time.

EXAMPLE XXXXIV

Repeat Example XXXXIII where the percent by weight of the NP 20 agent in the DD/NP 20 agent mixture is increased above 85% by weight and find similar results.

While the present invention has been described herein with reference to particular embodiments thereof and examples therefor, a latitude of modification, various changes and substitutions are intended in the foregoing disclosure and it will be appreciated that in some instances some features of the invention will be employed without a corresponding use of other features without departing from the scope of the invention as set forth. For example, while mixing of hydrocarbon crude with the emulsifying composition has been described as taking place above the surface of the earth, it is to be understood that mixing of hydrocarbon crude with the emulsifying composition below the surface of the earth, such as in a tubing of a producing well, is within the spirit and scope of this invention. Similarly, while the production of an oil-in-water emulsion has been described for purposes of transmission through a pipeline, it is to be understood that the spirit and scope of this invention include the production of an oil-in-water emulsion for any suitable purpose including, but not limited to, burning in a burner/boiler, and purposes of transmission through any pipe means. Thus, by way of example only, whenever "pipeline" is referred to in the specification and the claims, it is to be construed to be any pipe means, such as tubing of a producing well.

We claim:

1. A process for preparing an oil-in-aqueous phase emulsion comprising:

agitating a hydrocarbon with an emulsifying composition having a temperature of from about 35 degrees F. to about 170 degrees F. and comprising an aqueous phase and a minor amount of an emulsifying agent to form an oil-in-aqueous phase emulsion within about 20 seconds, wherein the amount of aqueous phase in said oil-in-aqueous phase emulsion is from about 10% to about 60% by weight, wherein the emulsifying agent is used in an amount sufficient to assist in the formation of said oil-in-aqueous phase emulsion, and wherein said emulsifying agent comprises at least one ethoxylated alkylphenol compound having the general formula:

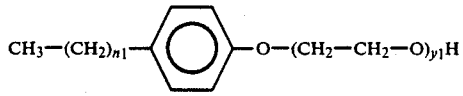

wherein $n_1$ is an integer having a value of from about 7 to about 14, and $y_1$ is an integer having a value of from about 4 to about 200; and said at least one ethoxylated alkylphenol compound has a molecular weight distribution with a dispersity of from about 1.0 to about 5.0 and with a weight average molecular weight of from about 558 to about 2504; and wherein at least about 50% by weight of the emulsifying agent comprises said at least one ethoxylated alkylphenol compound having a molecular weight of from about 558 to about 2504; and from about 1% by weight to about 10% by weight of the emulsifying agent comprises said at least one ethoxylated alkylphenol compound wherein $y_1$ has a value greater than 100; and said agitating comprises positioning said hydrocarbon and emulsifying composition in at least one dynamic shearing and mixing means for shearing and mixing said hydrocarbon and emulsifying composition.

2. The process of claim 1 wherein said agitating comprises mixing the hydrocarbon with the emulsifying composition in a shear field with an intensity ranging from 50 sec.$^{-1}$ to about 10,000 sec.$^{-1}$ for a period of time ranging from about 0.10 sec. to about 20 secs.

3. The process of claim 1 wherein at least about 70% by weight of the emulsifying agent comprises said at least one ethoxylated alkylphenol compound having a molecular weight of from about 558 to about 2504.

4. The process of claim 1 wherein at least about 85% by weight of the emulsifying agent comprises said at least one ethoxylated alkylphenol compound having a molecular weight of from about 558 to about 2504.

5. The process of claim 1 wherein said dispersity in from about 1.0 to about 3.0 and said weight average molecular weight has a value of from about 646 to about 1844.

6. The process of claim 1 wherein said dispersity is from about 1.0 to about 2.0 and said weight average molecular weight has a value of from about 866 to about 1404.

7. The process of claim 1 wherein said agitating additionally comprises shearing and mixing the hydrocarbon and the emulsifying composition with said at least one dynamic shearing and mixing means at a first predetermined shear rate for a first predetermined period of time, and subsequently shearing and mixing the hydrocarbon and the emulsifying composition with said at least one dynamic shearing and mixing means at a second predetermined shear rate for a second predetermined period of time.

8. A process for preparing an oil-in-aqueous phase emulsion comprising:

agitating a hydrocarbon with an emulsifying composition having a temperature of from about 35 degrees F. to about the boiling point temperature of the emulsifying composition and comprising an aqueous phase and a minor amount of emulsifying agent to form an oil-in-aqueous phase emulsion within about 20 seconds, wherein the amount of aqueous phase in said oil-in-aqueous phase emulsion is from about 10% to about 60% by weight, wherein the emulsifying agent is used in an amount sufficient to assist in the formation of said oil-in-aqueous phase emulsion, and wherein said emulsifying agent comprises a first agent having at least one first ethoxylated alkylphenol compound and a second agent having at least one second ethoxylated alkylphenol compound, said at least one first ethoxylated alkylphenol compound having a first general formula:

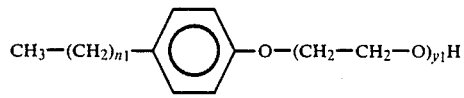

wherein $n_1$ is an integer having a value of from about 7 to about 11, and $y_1$ is an integer having a value of from about 4 to about 200; and said at least one first ethoxylated alkylphenol compound has a molecular weight distribution with a dispersity of from about 1.0 to about 5.0 and weight average molecular weight of from about 558 to about 1582; and wherein at least about 50% by weight of said first agent comprises said at least one first ethoxylated alkylphenol compound having a molecular weight of from about 558 to about 1582; and said at least one second ethoxylated alkylphenol compound having a second general formula:

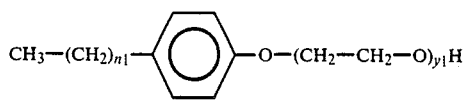

wherein $n_2$ is an integer having a value of from about 9 to about 14, and $y_2$ is an integer having a value of from about 4 to about 300; and said at least one second ethoxylated alkylphenol compound has a molecular weight distribution with a dispersity of from about 1.0 to about 5.0 and with a weight average molecular weight of from about 2434 to about 4264; and wherein at least about 50% by weight of said second agent comprises said at least one second ethoxylated alkylphenol compound having a molecular weight of from about 2434 to about 4264; and from about 1% by weight to about 75% by weight of the emulsifying agent comprises said at least one second ethoxylated alkylphenol compound wherein $y_2$ has a value greater than 100; and said agitating comprises positioning said hydrocarbon and emulsifying composition in at least one dynamic shearing and mixing means for shearing and mixing said hydrocarbon and emulsifying composition.

9. The process of claim 8 wherein said emulsifying agent comprises at least one first ethoxylated alkylphenol compound having said first general formula wherein $y_1$ has a value greater than 100.

10. The process of claim 9 wherein at least about 1% by weight of said emulsifying agent comprises said first ethoxylated alkylphenol compound having said first general formula wherein $y_1$ has a value greater than 100.

11. The process of claim 8 or 9 wherein said agitating comprises mixing the hydrocarbon with the emulsifying composition in a shear field with an intensity ranging from 50 sec.$^{-1}$ to about 10,000 sec.$^{-1}$ and for a period of time ranging from about 0.10 sec. to about 20 secs.

12. The process of claim 8 or 9 wherein at least about 70% by weight of said first agent comprises said at least one first ethoxylated alkylphenol compound having a molecular weight of from about 558 to about 1582.

13. The process of claim 8 or 9 wherein said dispersity of said at least one first ethoxylated alkylphenol compound is from about 1.0 to about 3.0 and said weight average molecular weight of said at least one first ethoxylated alkylphenol compound has a value of from about 646 to about 1582.

14. The process of claim 8 or 9 wherein at least about 70% by weight of said second agent comprises said at least one second ethoxylated alkylphenol compound having a molecular weight of from about 2434 to about 4264.

15. The process of claim 8 or 9 wherein said dispersity of said at least one second ethoxylated alkylphenol compound is from about 1.0 to about 3.0 and said weight average molecular weight of said at least one second ethoxylated alkylphenol compound has a value of from about 2874 to about 3824.

16. The process of claim 1 or 8 wherein said oil-in-aqueous phase emulsion formed within about 20 seconds has an emulsion shear stability of more than about 40 mins. when the emulsion shear stability of the formed oil-in-aqueous phase emulsion is measured with a rotor stator at 2,000 r.p.m. until the formed oil-in-aqueous phase emulsion fails.

17. The process of claim 8 wherein said emulsifying agent comprises from about 60% by weight to about 85% by weight of the first agent and from about 15% by weight to about 40% by weight of the second agent.

18. The process of claim 8 wherein said agitating additionally comprises shearing and mixing the hydrocarbon and the emulsifying composition with said at least one dynamic shearing and mixing means at a first predetermined shear rate for a first predetermined period of time, and subsequently shearing and mixing the hydrocarbon and the emulsifying composition with said at least one dynamic shearing and mixing means at a second predetermined shear rate for a second predetermined period of time.

19. A process for preparing an oil-in-aqueous phase emulsion comprising:
(a) positioning a portion of a mixture comprising a hydrocarbon and an emulsifying composition in a first dynamic shearing and mixing means having a first predetermined shear rate to produce a first oil-in-aqueous phase emulsion having a first viscosity, leaving a remaining portion of said mixture comprising the hydrocarbon and the emulsifying composition that is not positioned in the first dynamic shearing and mixing means;
(b) positioning said remaining portion of said mixture comprising the hydrocarbon and the emulsifying composition in a second dynamic shearing and mixing means having a second predetermined shear rate which is different from said first shear rate to produce a second oil-in-aqueous phase emulsion having a second viscosity; and
(c) mixing the first oil-in-aqueous phase emulsion with the second oil-in-aqueous phase emulsion to form an oil-in-aqueous phase emulsion that has a viscosity lower than the first viscosity and lower than the second viscosity.

20. The process of claim 19 wherein said mixture is at a temperature of from about 35° F. to about 170° F.; and said remaining portion of said mixture is at a temperature of from about 35° F. to about 170° F.

21. The process of claim 20 wherein said emulsifying composition comprises an aqueous phase and a minor amount of an emulsifying agent comprising at least one ethoxylated alkylphenol compound having the general formula:

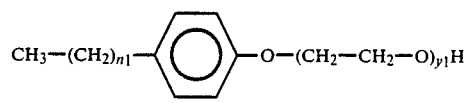

wherein $n_1$ is an integer having a value of from about 7 to about 14, and $y_1$ is an integer having a value of from about 4 to about 200; and said at least one ethoxylated alkylphenol compound has a molecular weight distribution with a dispersity of from about 1.0 to about 5.0 and with a weight average molecular weight of from about 558 to about 2504; and wherein at least about 50% by weight of the emulsifying agent comprises said at least one ethoxylated alkylphenol compound having a molecular weight of from about 558 to about 2504.

22. The process of claim 21 wherein said emulsifying agent comprises at least one ethoxylated alkylphenol compound having said general formula wherein $y_1$ has a value greater than 100.

23. The process of claim 22 wherein said ethoxylated alkylphenol compound having said general formula wherein $y_1$ has a value greater than 100 comprises at least about 1% by weight of said emulsifying agent.

24. The process of claim 19 wherein said emulsifying composition comprises an aqueous phase and a minor amount of an emulsifying agent comprising a first agent having at least one first ethoxylated alkylphenol compound and a second agent having at least one second ethoxylated alkylphenol compound, said at least one first ethoxylated alkylphenol compound having a first general formula:

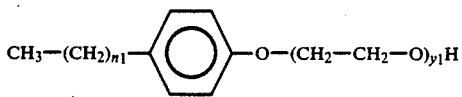

wherein $n_1$ is an integer having a value of from about 7 to about 11, and $y_1$ is an integer having a value of from about 4 to about 200; and said at least one first ethoxylated alkylphenol compound has a molecular weight distribution with a dispersity of from about 1.0 to about 5.0 and with a weight average molecular weight of from about 558 to about 1582; and wherein at least about 50% by weight of said first agent comprises said at least one first ethoxylated alkylphenol compound having a molecular weight of from about 558 to about 1582; and said at least one second ethoxylated alkylphenol compound having a second general formula:

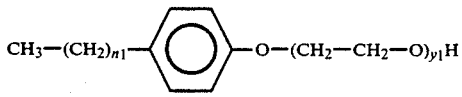

wherein $n_2$ is an integer having a value of from about 9 to about 14, and $y_2$ is an integer having a value of from about 4 to about 300; and said at least one second ethoxylated alkylphenol compound has a molecular weight distribution with a dispersity of from about 1.0 to about 5.0 and with a weight average molecular weight of from about 2434 to about 4264; and wherein at least about 50% by weight of said second agent comprises said at least one second ethoxylated alkylphenol compound having a molecular weight of from about 2434 to about 4264.

25. The process of claim 24 wherein said emulsifying agent comprises at least one first ethoxylated alkylphenol compound having said first general formula wherein $y_1$ has a value greater than 100.

26. The process of claim 25 wherein at least about 1% weight of said emulsifying agent comprises said first ethoxylated alkylphenol compound having said first general formula wherein $y_1$ has a value greater than 100.

27. The process of claim 25 or 26 wherein said emulsifying agent comprises at least one second ethoxylated alkylphenol compound having said second general formula wherein $y_2$ has a value greater than 100.

28. The process of claim 27 wherein at least about 1% by weight of said emulsifying agent comprises said second ethoxylated alkylphenol compound having said second general formula wherein $y_2$ has a value greater than 100.

29. A process for preparing an oil-in-aqueous phase emulsion comprising:
(a) positioning a portion of a mixture comprising a hydrocarbon and an emulsifying composition in a first dynamic shearing and mixing means having a first predetermined shear rate to produce a first oil-in-aqueous phase emulsion having a first viscosity, leaving a remaining portion of said mixture comprising the hydrocarbon and the emulsifying composition that is not positioned in the first dynamic shearing and mixing means;
(b) passing said remaining portion of said mixture comprising the hydrocarbon and the emulsifying composition through a static shearing and static mixing means to produce a second oil-in-aqueous phase emulsion having a second viscosity; and
(c) mixing the first oil-in-aqueous phase emulsion with the second oil-in-aqueous phase emulsion to form an oil-in-aqueous phase emulsion that has a viscosity lower than the first viscosity and lower than the second viscosity.

* * * * *